US012641108B2

(12) United States Patent
Viswanathan et al.

(10) Patent No.: US 12,641,108 B2
(45) Date of Patent: *May 26, 2026

(54) SYSTEMS AND METHODS FOR MITIGATING RISKS OF THIRD-PARTY COMPUTING SYSTEM FUNCTIONALITY INTEGRATION INTO A FIRST-PARTY COMPUTING SYSTEM

(71) Applicant: OneTrust, LLC, Atlanta, GA (US)

(72) Inventors: Subramanian Viswanathan, San Ramon, CA (US); Milap Shah, Bengaluru (IN)

(73) Assignee: OneTrust, LLC, Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/275,910

(22) PCT Filed: Feb. 10, 2022

(86) PCT No.: PCT/US2022/015929
§ 371 (c)(1),
(2) Date: Aug. 4, 2023

(87) PCT Pub. No.: WO2022/173912
PCT Pub. Date: Aug. 18, 2022

(65) Prior Publication Data
US 2024/0098109 A1     Mar. 21, 2024

Related U.S. Application Data

(60) Provisional application No. 63/148,036, filed on Feb. 10, 2021.

(51) Int. Cl.
*H04L 9/40*          (2022.01)
*G06F 21/60*        (2013.01)

(52) U.S. Cl.
CPC .......... *H04L 63/1433* (2013.01); *G06F 21/60* (2013.01)

(58) Field of Classification Search
CPC ............. H04L 63/1433; H04L 63/1425; H04L 63/1408; H04L 63/1416; H04L 63/1441;
(Continued)

(56) References Cited

U.S. PATENT DOCUMENTS 4,536,866 A     8/1985   Jerome et al.
4,574,350 A     3/1986   Starr
(Continued)

FOREIGN PATENT DOCUMENTS

CA       2875255 A1     12/2013
CA       3056394 A1      3/2021
(Continued)

OTHER PUBLICATIONS

Office Action, dated Mar. 30, 2018, from corresponding U.S. Appl. No. 15/894,890.
(Continued)

*Primary Examiner* — Tae K Kim
(74) *Attorney, Agent, or Firm* — Ballard Spahr LLP

(57)          ABSTRACT

In general, various aspects of the present invention provide methods, apparatuses, systems, computing devices, computing entities, and/or the like for integrating third party computing system functionality into a first party computing system by providing a risk management and mitigation computing system configured to analyze a risk of integrating the functionality provided by the third party computing system and facilitating implementation of one or more data-related controls that include performing computer-specific operations to mitigate and/or eliminate the identified risks. For example, the risk management and mitigation computing system can access risk data in tenant computing
(Continued)

systems to determine a risk score related to the integration of the third party computing system functionality based on risks determined during prior integrations of the third party computing system functionality by other tenant computing systems. The risk management and mitigation computing system can generate a recommended control when integrating the third party computing system functionality.

20 Claims, 7 Drawing Sheets

(58) Field of Classification Search
    CPC ....... H04L 63/20; H04L 63/168; H04L 63/16;
        G06F 21/577; G06F 21/554; G06F 21/55;
                        G06F 21/566; G06N 20/00
    See application file for complete search history.

(56) References Cited

U.S. PATENT DOCUMENTS

| | | | |
|---|---|---|---|
| 5,193,162 A | 3/1993 | Bordsen et al. |
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,003,040 A | 12/1999 | Mital et al. |
| 6,009,429 A | 12/1999 | Greer et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,240,422 B1 | 5/2001 | Atkins et al. |
| 6,243,816 B1 | 6/2001 | Fang et al. |
| 6,253,203 B1 | 6/2001 | Oflaherty et al. |
| 6,263,335 B1 | 7/2001 | Paik et al. |
| 6,272,631 B1 | 8/2001 | Thomlinson et al. |
| 6,275,824 B1 | 8/2001 | Oflaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,430,556 B1 | 8/2002 | Goldberg et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,519,763 B1 | 2/2003 | Kaufer et al. |
| 6,574,631 B1 | 6/2003 | Subramanian et al. |
| 6,587,668 B1 | 7/2003 | Miller et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,701,514 B1 | 3/2004 | Haswell et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,779,095 B2 | 8/2004 | Selkirk et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,912,676 B1 | 6/2005 | Gusler et al. |
| 6,925,443 B1 | 8/2005 | Baggett, Jr. et al. |
| 6,938,041 B1 | 8/2005 | Brandow et al. |
| 6,956,845 B2 | 10/2005 | Baker et al. |
| 6,957,261 B2 | 10/2005 | Lortz |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,093,200 B2 | 8/2006 | Schreiber et al. |
| 7,093,283 B1 | 8/2006 | Chen et al. |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |
| 7,133,845 B1 | 11/2006 | Ginter et al. |
| 7,133,906 B2 | 11/2006 | Price et al. |
| 7,139,999 B2 | 11/2006 | Bowman-Amuah |
| 7,143,091 B2 | 11/2006 | Charnock et al. |
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Menninger et al. |
| 7,181,438 B1 | 2/2007 | Szabo |
| 7,188,252 B1 | 3/2007 | Dunn |
| 7,203,929 B1 | 4/2007 | Vinodkrishnan et al. |
| 7,213,233 B1 | 5/2007 | Vinodkrish et al. |
| 7,216,155 B2 | 5/2007 | Stuckman et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |

(56) References Cited

U.S. PATENT DOCUMENTS

| | | | |
|---|---|---|---|
| 7,275,063 | B2 | 9/2007 | Horn |
| 7,281,020 | B2 | 10/2007 | Fine |
| 7,284,232 | B1 | 10/2007 | Bates et al. |
| 7,284,271 | B2 | 10/2007 | Lucovsky et al. |
| 7,287,280 | B2 | 10/2007 | Young |
| 7,290,275 | B2 | 10/2007 | Baudoin et al. |
| 7,293,119 | B2 | 11/2007 | Beale |
| 7,299,299 | B2 | 11/2007 | Hollenbeck et al. |
| 7,302,569 | B2 | 11/2007 | Betz et al. |
| 7,313,575 | B2 | 12/2007 | Carr et al. |
| 7,313,699 | B2 | 12/2007 | Koga |
| 7,313,825 | B2 | 12/2007 | Redlich et al. |
| 7,315,826 | B1 | 1/2008 | Guheen et al. |
| 7,315,849 | B2 | 1/2008 | Bakalash et al. |
| 7,322,047 | B2 | 1/2008 | Redlich et al. |
| 7,330,850 | B1 | 2/2008 | Seibel et al. |
| 7,340,447 | B2 | 3/2008 | Ghatare |
| 7,340,776 | B2 | 3/2008 | Zobel et al. |
| 7,343,434 | B2 | 3/2008 | Kapoor et al. |
| 7,346,518 | B1 | 3/2008 | Frank et al. |
| 7,349,913 | B2 | 3/2008 | Clark et al. |
| 7,353,204 | B2 | 4/2008 | Liu |
| 7,353,281 | B2 | 4/2008 | New, Jr. et al. |
| 7,353,283 | B2 | 4/2008 | Henaff et al. |
| 7,356,559 | B1 | 4/2008 | Jacobs et al. |
| 7,367,014 | B2 | 4/2008 | Griffin |
| 7,370,025 | B1 | 5/2008 | Pandit |
| 7,376,835 | B2 | 5/2008 | Olkin et al. |
| 7,380,120 | B1 | 5/2008 | Garcia |
| 7,382,903 | B2 | 6/2008 | Ray |
| 7,383,570 | B2 | 6/2008 | Pinkas et al. |
| 7,391,854 | B2 | 6/2008 | Salonen et al. |
| 7,392,546 | B2 | 6/2008 | Patrick |
| 7,398,393 | B2 | 7/2008 | Mont et al. |
| 7,401,235 | B2 | 7/2008 | Mowers et al. |
| 7,403,942 | B1 | 7/2008 | Bayliss |
| 7,409,354 | B2 | 8/2008 | Putnam et al. |
| 7,412,402 | B2 | 8/2008 | Cooper |
| 7,424,680 | B2 | 9/2008 | Carpenter |
| 7,428,546 | B2 | 9/2008 | Nori et al. |
| 7,428,707 | B2 | 9/2008 | Quimby |
| 7,430,585 | B2 | 9/2008 | Sibert |
| 7,454,457 | B1 | 11/2008 | Lowery et al. |
| 7,454,508 | B2 | 11/2008 | Mathew et al. |
| 7,478,157 | B2 | 1/2009 | Bohrer et al. |
| 7,480,694 | B2 | 1/2009 | Blennerhassett et al. |
| 7,480,755 | B2 | 1/2009 | Herrell et al. |
| 7,487,170 | B2 | 2/2009 | Stevens |
| 7,493,282 | B2 | 2/2009 | Manly et al. |
| 7,500,607 | B2 | 3/2009 | Williams |
| 7,506,248 | B2 | 3/2009 | Xu et al. |
| 7,512,987 | B2 | 3/2009 | Williams |
| 7,516,882 | B2 | 4/2009 | Cucinotta |
| 7,523,053 | B2 | 4/2009 | Pudhukottai et al. |
| 7,529,836 | B1 | 5/2009 | Bolen |
| 7,533,113 | B1 | 5/2009 | Haddad |
| 7,548,968 | B1 | 6/2009 | Bura et al. |
| 7,552,480 | B1 | 6/2009 | Voss |
| 7,562,339 | B2 | 7/2009 | Racca et al. |
| 7,565,685 | B2 | 7/2009 | Ross et al. |
| 7,567,541 | B2 | 7/2009 | Karimi et al. |
| 7,584,505 | B2 | 9/2009 | Mondri et al. |
| 7,584,508 | B1 | 9/2009 | Kashchenko et al. |
| 7,587,749 | B2 | 9/2009 | Leser et al. |
| 7,590,705 | B2 | 9/2009 | Mathew et al. |
| 7,590,972 | B2 | 9/2009 | Axelrod et al. |
| 7,603,356 | B2 | 10/2009 | Schran et al. |
| 7,606,783 | B1 | 10/2009 | Carter |
| 7,606,790 | B2 | 10/2009 | Levy |
| 7,607,120 | B2 | 10/2009 | Sanyal et al. |
| 7,610,391 | B2 | 10/2009 | Dunn |
| 7,613,700 | B1 | 11/2009 | Lobo et al. |
| 7,617,136 | B1 | 11/2009 | Lessing et al. |
| 7,617,167 | B2 | 11/2009 | Griffis et al. |
| 7,620,644 | B2 | 11/2009 | Cote et al. |
| 7,627,666 | B1 | 12/2009 | Degiulio et al. |
| 7,630,874 | B2 | 12/2009 | Fables et al. |
| 7,630,998 | B2 | 12/2009 | Zhou et al. |
| 7,636,742 | B1 | 12/2009 | Olavarrieta et al. |
| 7,640,322 | B2 | 12/2009 | Wendkos et al. |
| 7,650,497 | B2 | 1/2010 | Thornton et al. |
| 7,653,592 | B1 | 1/2010 | Flaxman et al. |
| 7,657,476 | B2 | 2/2010 | Barney |
| 7,657,694 | B2 | 2/2010 | Mansell et al. |
| 7,665,073 | B2 | 2/2010 | Meijer et al. |
| 7,665,125 | B2 | 2/2010 | Heard et al. |
| 7,668,947 | B2 | 2/2010 | Hutchinson et al. |
| 7,673,282 | B2 | 3/2010 | Amaru et al. |
| 7,676,034 | B1 | 3/2010 | Wu et al. |
| 7,681,034 | B1 | 3/2010 | Lee et al. |
| 7,681,140 | B2 | 3/2010 | Ebert |
| 7,685,561 | B2 | 3/2010 | Deem et al. |
| 7,685,577 | B2 | 3/2010 | Pace et al. |
| 7,693,593 | B2 | 4/2010 | Ishibashi et al. |
| 7,698,398 | B1 | 4/2010 | Lai |
| 7,702,639 | B2 | 4/2010 | Stanley et al. |
| 7,707,224 | B2 | 4/2010 | Chastagnol et al. |
| 7,711,995 | B1 | 5/2010 | Morris |
| 7,712,029 | B2 | 5/2010 | Ferreira et al. |
| 7,716,242 | B2 | 5/2010 | Pae et al. |
| 7,725,474 | B2 | 5/2010 | Tamai et al. |
| 7,725,875 | B2 | 5/2010 | Waldrep |
| 7,729,940 | B2 | 6/2010 | Harvey et al. |
| 7,730,142 | B2 | 6/2010 | Levasseur et al. |
| 7,735,036 | B2 | 6/2010 | Dennison et al. |
| 7,752,124 | B2 | 7/2010 | Green et al. |
| 7,756,826 | B2 | 7/2010 | Bots et al. |
| 7,756,987 | B2 | 7/2010 | Wang et al. |
| 7,761,586 | B2 | 7/2010 | Olenick et al. |
| 7,774,745 | B2 | 8/2010 | Fildebrandt et al. |
| 7,788,212 | B2 | 8/2010 | Beckmann et al. |
| 7,788,222 | B2 | 8/2010 | Shah et al. |
| 7,788,632 | B2 | 8/2010 | Kuester et al. |
| 7,788,726 | B2 | 8/2010 | Teixeira |
| 7,797,726 | B2 | 9/2010 | Ashley et al. |
| 7,801,758 | B2 | 9/2010 | Gracie et al. |
| 7,801,765 | B2 | 9/2010 | Denny |
| 7,801,826 | B2 | 9/2010 | Labrou et al. |
| 7,801,912 | B2 | 9/2010 | Ransil et al. |
| 7,802,305 | B1 | 9/2010 | Leeds |
| 7,805,349 | B2 | 9/2010 | Yu et al. |
| 7,805,451 | B2 | 9/2010 | Hosokawa |
| 7,813,947 | B2 | 10/2010 | Deangelis et al. |
| 7,822,620 | B2 | 10/2010 | Dixon et al. |
| 7,827,523 | B2 | 11/2010 | Ahmed et al. |
| 7,836,078 | B2 | 11/2010 | Dettinger et al. |
| 7,844,640 | B2 | 11/2010 | Bender et al. |
| 7,849,143 | B2 | 12/2010 | Vuong |
| 7,853,468 | B2 | 12/2010 | Callahan et al. |
| 7,853,470 | B2 | 12/2010 | Sonnleithner et al. |
| 7,853,925 | B2 | 12/2010 | Kemmler |
| 7,860,816 | B2 | 12/2010 | Fokoue-Nkoutche et al. |
| 7,870,540 | B2 | 1/2011 | Zare et al. |
| 7,870,608 | B2 | 1/2011 | Shraim et al. |
| 7,873,541 | B1 | 1/2011 | Klar et al. |
| 7,877,327 | B2 | 1/2011 | Gwiazda et al. |
| 7,877,812 | B2 | 1/2011 | Koved et al. |
| 7,885,841 | B2 | 2/2011 | King |
| 7,890,461 | B2 | 2/2011 | Oeda et al. |
| 7,895,260 | B2 | 2/2011 | Archer et al. |
| 7,904,360 | B2 | 3/2011 | Evans |
| 7,904,478 | B2 | 3/2011 | Yu et al. |
| 7,904,487 | B2 | 3/2011 | Ghatare |
| 7,917,888 | B2 | 3/2011 | Chong et al. |
| 7,917,963 | B2 | 3/2011 | Goyal et al. |
| 7,921,152 | B2 | 4/2011 | Ashley et al. |
| 7,930,197 | B2 | 4/2011 | Ozzie et al. |
| 7,930,753 | B2 | 4/2011 | Mellinger et al. |
| 7,941,443 | B1 | 5/2011 | Sobel et al. |
| 7,953,725 | B2 | 5/2011 | Burris et al. |
| 7,954,150 | B2 | 5/2011 | Croft et al. |
| 7,958,087 | B2 | 6/2011 | Blumenau |
| 7,958,494 | B2 | 6/2011 | Chaar et al. |
| 7,962,900 | B2 | 6/2011 | Barraclough et al. |

(56)　　　　References Cited

U.S. PATENT DOCUMENTS

| | | | |
|---|---|---|---|
| 7,966,310 | B2 | 6/2011 | Sullivan et al. |
| 7,966,599 | B1 | 6/2011 | Malasky et al. |
| 7,966,663 | B2 | 6/2011 | Strickland et al. |
| 7,974,992 | B2 | 7/2011 | Fastabend et al. |
| 7,975,000 | B2 | 7/2011 | Dixon et al. |
| 7,991,559 | B2 | 8/2011 | Dzekunov et al. |
| 7,991,747 | B1 | 8/2011 | Upadhyay et al. |
| 7,996,372 | B2 | 8/2011 | Rubel, Jr. |
| 8,005,891 | B2 | 8/2011 | Knowles et al. |
| 8,010,612 | B2 | 8/2011 | Costea et al. |
| 8,010,720 | B2 | 8/2011 | Iwaoka et al. |
| 8,019,881 | B2 | 9/2011 | Sandhu et al. |
| 8,020,206 | B2 | 9/2011 | Hubbard et al. |
| 8,024,384 | B2 | 9/2011 | Prabhakar et al. |
| 8,032,721 | B2 | 10/2011 | Murai |
| 8,036,374 | B2 | 10/2011 | Noble, Jr. |
| 8,037,409 | B2 | 10/2011 | Jacob et al. |
| 8,041,749 | B2 | 10/2011 | Beck |
| 8,041,763 | B2 | 10/2011 | Kordun et al. |
| 8,041,913 | B2 | 10/2011 | Wang |
| 8,069,161 | B2 | 11/2011 | Bugir et al. |
| 8,069,471 | B2 | 11/2011 | Boren |
| 8,082,539 | B1 | 12/2011 | Schelkogonov |
| 8,090,754 | B2 | 1/2012 | Schmidt et al. |
| 8,095,923 | B2 | 1/2012 | Harvey et al. |
| 8,099,709 | B2 | 1/2012 | Baikov et al. |
| 8,099,765 | B2 | 1/2012 | Parkinson |
| 8,103,962 | B2 | 1/2012 | Embley et al. |
| 8,117,441 | B2 | 2/2012 | Kurien et al. |
| 8,126,926 | B2 | 2/2012 | Atre et al. |
| 8,135,815 | B2 | 3/2012 | Mayer |
| 8,146,054 | B2 | 3/2012 | Baker et al. |
| 8,146,074 | B2 | 3/2012 | Ito et al. |
| 8,150,717 | B2 | 4/2012 | Whitmore |
| 8,156,105 | B2 | 4/2012 | Altounian et al. |
| 8,156,158 | B2 | 4/2012 | Rolls et al. |
| 8,156,159 | B2 | 4/2012 | Ebrahimi et al. |
| 8,166,406 | B1 | 4/2012 | Goldfeder et al. |
| 8,176,061 | B2 | 5/2012 | Swanbeck et al. |
| 8,176,177 | B2 | 5/2012 | Sussman et al. |
| 8,176,334 | B2 | 5/2012 | Vainstein |
| 8,176,470 | B2 | 5/2012 | Klumpp et al. |
| 8,180,759 | B2 | 5/2012 | Hamzy |
| 8,181,151 | B2 | 5/2012 | Sedukhin et al. |
| 8,185,409 | B2 | 5/2012 | Putnam et al. |
| 8,185,497 | B2 | 5/2012 | Vermeulen et al. |
| 8,196,176 | B2 | 6/2012 | Berteau et al. |
| 8,205,093 | B2 | 6/2012 | Argott |
| 8,205,140 | B2 | 6/2012 | Hafeez et al. |
| 8,214,362 | B1 | 7/2012 | Djabarov |
| 8,214,803 | B2 | 7/2012 | Horii et al. |
| 8,225,061 | B2 | 7/2012 | Greenebaum |
| 8,234,377 | B2 | 7/2012 | Cohn |
| 8,239,244 | B2 | 8/2012 | Ginsberg et al. |
| 8,250,051 | B2 | 8/2012 | Bugir et al. |
| 8,255,468 | B2 | 8/2012 | Mtaldevara et al. |
| 8,260,262 | B2 | 9/2012 | Ben Ayed |
| 8,261,362 | B2 | 9/2012 | Goodwin et al. |
| 8,266,231 | B1 | 9/2012 | Golovin et al. |
| 8,275,632 | B2 | 9/2012 | Awaraji et al. |
| 8,275,793 | B2 | 9/2012 | Ahmad et al. |
| 8,286,239 | B1 | 10/2012 | Sutton |
| 8,312,549 | B2 | 11/2012 | Goldberg et al. |
| 8,316,237 | B1 | 11/2012 | Felsher et al. |
| 8,332,908 | B2 | 12/2012 | Hatakeyama et al. |
| 8,340,999 | B2 | 12/2012 | Kumaran et al. |
| 8,341,405 | B2 | 12/2012 | Meijer et al. |
| 8,346,929 | B1 | 1/2013 | Lai |
| 8,364,713 | B2 | 1/2013 | Pollard |
| 8,370,224 | B2 | 2/2013 | Grewal |
| 8,370,233 | B2 | 2/2013 | Kaisermayr et al. |
| 8,370,794 | B2 | 2/2013 | Moosmann et al. |
| 8,380,630 | B2 | 2/2013 | Felsher |
| 8,380,743 | B2 | 2/2013 | Convertino et al. |
| 8,381,180 | B2 | 2/2013 | Rostoker |
| 8,381,297 | B2 | 2/2013 | Touboul |
| 8,386,314 | B2 | 2/2013 | Kirkby et al. |
| 8,392,982 | B2 | 3/2013 | Harris et al. |
| 8,418,226 | B2 | 4/2013 | Gardner |
| 8,423,954 | B2 | 4/2013 | Ronen et al. |
| 8,429,179 | B1 | 4/2013 | Mirhaji |
| 8,429,597 | B2 | 4/2013 | Prigge |
| 8,429,630 | B2 | 4/2013 | Nickolov et al. |
| 8,429,758 | B2 | 4/2013 | Chen et al. |
| 8,438,644 | B2 | 5/2013 | Watters et al. |
| 8,448,252 | B1 | 5/2013 | King et al. |
| 8,452,693 | B2 | 5/2013 | Shah et al. |
| 8,463,247 | B2 | 6/2013 | Misiag |
| 8,464,311 | B2 | 6/2013 | Ashley et al. |
| 8,468,244 | B2 | 6/2013 | Redlich et al. |
| 8,473,324 | B2 | 6/2013 | Alvarez et al. |
| 8,474,012 | B2 | 6/2013 | Ahmed et al. |
| 8,494,894 | B2 | 7/2013 | Jaster et al. |
| 8,504,481 | B2 | 8/2013 | Motahari et al. |
| 8,510,199 | B1 | 8/2013 | Erlanger |
| 8,515,988 | B2 | 8/2013 | Jones et al. |
| 8,516,076 | B2 | 8/2013 | Thomas |
| 8,527,337 | B1 | 9/2013 | Lim et al. |
| 8,533,746 | B2 | 9/2013 | Nolan et al. |
| 8,533,844 | B2 | 9/2013 | Mahaffey et al. |
| 8,538,817 | B2 | 9/2013 | Wilson |
| 8,539,359 | B2 | 9/2013 | Rapaport et al. |
| 8,539,437 | B2 | 9/2013 | Finlayson et al. |
| 8,560,645 | B2 | 10/2013 | Linden et al. |
| 8,560,841 | B2 | 10/2013 | Chin et al. |
| 8,560,956 | B2 | 10/2013 | Curtis et al. |
| 8,561,100 | B2 | 10/2013 | Hu et al. |
| 8,561,153 | B2 | 10/2013 | Grason et al. |
| 8,565,729 | B2 | 10/2013 | Moseler et al. |
| 8,566,726 | B2 | 10/2013 | Dixon et al. |
| 8,566,938 | B1 | 10/2013 | Prakash et al. |
| 8,571,909 | B2 | 10/2013 | Miller et al. |
| 8,572,717 | B2 | 10/2013 | Narayanaswamy |
| 8,578,036 | B1 | 11/2013 | Holfelder et al. |
| 8,578,166 | B2 | 11/2013 | De Monseignat et al. |
| 8,578,481 | B2 | 11/2013 | Rowley |
| 8,578,501 | B1 | 11/2013 | Ogilvie |
| 8,583,694 | B2 | 11/2013 | Siegel et al. |
| 8,583,766 | B2 | 11/2013 | Dixon et al. |
| 8,589,183 | B2 | 11/2013 | Awaraji et al. |
| 8,589,372 | B2 | 11/2013 | Krislov |
| 8,601,467 | B2 | 12/2013 | Hofhansl et al. |
| 8,601,490 | B2 | 12/2013 | Sureshan et al. |
| 8,601,591 | B2 | 12/2013 | Krishnamurthy et al. |
| 8,606,746 | B2 | 12/2013 | Yeap et al. |
| 8,612,420 | B2 | 12/2013 | Sun et al. |
| 8,612,993 | B2 | 12/2013 | Grant et al. |
| 8,615,549 | B2 | 12/2013 | Knowles et al. |
| 8,615,731 | B2 | 12/2013 | Doshi |
| 8,620,952 | B2 | 12/2013 | Bennett et al. |
| 8,621,637 | B2 | 12/2013 | Al-Harbi et al. |
| 8,626,671 | B2 | 1/2014 | Federgreen |
| 8,627,114 | B2 | 1/2014 | Resch et al. |
| 8,630,961 | B2 | 1/2014 | Beilby et al. |
| 8,631,048 | B1 | 1/2014 | Davis et al. |
| 8,636,625 | B2 | 1/2014 | Johnson |
| 8,640,110 | B2 | 1/2014 | Kopp et al. |
| 8,646,072 | B1 | 2/2014 | Savant |
| 8,650,399 | B2 | 2/2014 | Le Bihan et al. |
| 8,655,939 | B2 | 2/2014 | Redlich et al. |
| 8,656,265 | B1 | 2/2014 | Paulin et al. |
| 8,656,456 | B2 | 2/2014 | Maxson et al. |
| 8,661,036 | B2 | 2/2014 | Turski et al. |
| 8,667,074 | B1 | 3/2014 | Farkas |
| 8,667,487 | B1 | 3/2014 | Boodman et al. |
| 8,677,472 | B1 | 3/2014 | Dotan et al. |
| 8,681,984 | B2 | 3/2014 | Lee et al. |
| 8,682,698 | B2 | 3/2014 | Cashman et al. |
| 8,683,201 | B2 | 3/2014 | Shaty |
| 8,683,502 | B2 | 3/2014 | Shkedi et al. |
| 8,688,601 | B2 | 4/2014 | Jaiswal |
| 8,689,292 | B2 | 4/2014 | Williams et al. |
| 8,693,689 | B2 | 4/2014 | Belenkiy et al. |
| 8,700,524 | B2 | 4/2014 | Williams et al. |

(56) References Cited

U.S. PATENT DOCUMENTS

| | | | |
|---|---|---|---|
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,762,406 B2 | 6/2014 | Ho et al. |
| 8,762,413 B2 | 6/2014 | Graham, Jr. et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,813,028 B2 | 8/2014 | Farooqi |
| 8,813,177 B2 | 8/2014 | Srour et al. |
| 8,813,214 B1 | 8/2014 | McNair et al. |
| 8,819,253 B2 | 8/2014 | Simeloff et al. |
| 8,819,617 B1 | 8/2014 | Koenig et al. |
| 8,819,800 B2 | 8/2014 | Gao et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,839,346 B2 | 9/2014 | Murgia et al. |
| 8,843,487 B2 | 9/2014 | McGraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,856,936 B2 | 10/2014 | Datta Ray et al. |
| 8,862,507 B2 | 10/2014 | Sandhu et al. |
| 8,863,261 B2 | 10/2014 | Yang |
| 8,875,232 B2 | 10/2014 | Blom et al. |
| 8,887,047 B2 | 11/2014 | Digiantomasso et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,888 B1 | 12/2014 | Satish et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,924,388 B2 | 12/2014 | Elliot et al. |
| 8,930,364 B1 | 1/2015 | Brooker et al. |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,943,602 B2 | 1/2015 | Roy et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,001,673 B2 | 4/2015 | Birdsall et al. |
| 9,002,939 B2 | 4/2015 | Laden et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | Decharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,583 B2 | 6/2015 | Patton et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,478 B2 | 7/2015 | Vaitheeswaran et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,337 B1 | 8/2015 | Battréet al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,110,918 B1 | 8/2015 | Rajaa et al. |
| 9,111,105 B2 | 8/2015 | Barton et al. |
| 9,111,295 B2 | 8/2015 | Tietzen et al. |
| 9,123,330 B1 | 9/2015 | Sharifi et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,141,911 B2 | 9/2015 | Zhao et al. |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |

(56) References Cited

U.S. PATENT DOCUMENTS

| | | | |
|---|---|---|---|
| 9,215,252 B2 | 12/2015 | Smith et al. | |
| 9,218,596 B2 | 12/2015 | Ronca et al. | |
| 9,224,009 B1 | 12/2015 | Liu et al. | |
| 9,230,036 B2 | 1/2016 | Davis | |
| 9,231,935 B1 | 1/2016 | Bridge et al. | |
| 9,232,040 B2 | 1/2016 | Barash et al. | |
| 9,235,476 B2 | 1/2016 | McHugh et al. | |
| 9,240,987 B2 | 1/2016 | Barrett-Bowen et al. | |
| 9,241,259 B2 | 1/2016 | Daniela et al. | |
| 9,245,126 B2 | 1/2016 | Christodorescu et al. | |
| 9,245,266 B2 | 1/2016 | Hardt | |
| 9,253,609 B2 | 2/2016 | Hosier, Jr. | |
| 9,258,116 B2 | 2/2016 | Moskowitz et al. | |
| 9,264,443 B2 | 2/2016 | Weisman | |
| 9,274,858 B2 | 3/2016 | Milliron et al. | |
| 9,280,581 B1 | 3/2016 | Grimes et al. | |
| 9,286,149 B2 | 3/2016 | Sampson et al. | |
| 9,286,282 B2 | 3/2016 | Ling, III et al. | |
| 9,288,118 B1 | 3/2016 | Pattan | |
| 9,288,556 B2 | 3/2016 | Kim et al. | |
| 9,294,498 B1 | 3/2016 | Yampolskiy et al. | |
| 9,299,050 B2 | 3/2016 | Stiffler et al. | |
| 9,306,939 B2 | 4/2016 | Chan et al. | |
| 9,317,697 B2 | 4/2016 | Maier et al. | |
| 9,317,715 B2 | 4/2016 | Schuette et al. | |
| 9,325,731 B2 | 4/2016 | McGeehan | |
| 9,336,184 B2 | 5/2016 | Mital et al. | |
| 9,336,220 B2 | 5/2016 | Li et al. | |
| 9,336,324 B2 | 5/2016 | Lomme et al. | |
| 9,336,332 B2 | 5/2016 | Davis et al. | |
| 9,336,400 B2 | 5/2016 | Milman et al. | |
| 9,338,188 B1 | 5/2016 | Ahn | |
| 9,342,623 B2 | 5/2016 | Narayanan et al. | |
| 9,342,706 B2 | 5/2016 | Chawla et al. | |
| 9,344,297 B2 | 5/2016 | Shah et al. | |
| 9,344,424 B2 | 5/2016 | Tenenboym et al. | |
| 9,344,484 B2 | 5/2016 | Ferris | |
| 9,348,802 B2 | 5/2016 | Massand | |
| 9,348,862 B2 | 5/2016 | Kawecki, III | |
| 9,348,929 B2 | 5/2016 | Eberlein | |
| 9,349,016 B1 | 5/2016 | Brisebois et al. | |
| 9,350,718 B2 | 5/2016 | Sondhi et al. | |
| 9,355,157 B2 | 5/2016 | Mohammed et al. | |
| 9,356,961 B1 | 5/2016 | Todd et al. | |
| 9,361,446 B1 | 6/2016 | Demirjian et al. | |
| 9,369,488 B2 | 6/2016 | Woods et al. | |
| 9,372,869 B2 | 6/2016 | Joseph et al. | |
| 9,374,693 B1 | 6/2016 | Olincy et al. | |
| 9,384,199 B2 | 7/2016 | Thereska et al. | |
| 9,384,357 B2 | 7/2016 | Patil et al. | |
| 9,386,078 B2 | 7/2016 | Reno et al. | |
| 9,386,104 B2 | 7/2016 | Adams et al. | |
| 9,395,959 B2 | 7/2016 | Hatfield et al. | |
| 9,396,332 B2 | 7/2016 | Abrams et al. | |
| 9,401,900 B2 | 7/2016 | Levasseur et al. | |
| 9,411,967 B2 | 8/2016 | Parecki et al. | |
| 9,411,982 B1 | 8/2016 | Dippenaar et al. | |
| 9,417,859 B2 | 8/2016 | Gounares et al. | |
| 9,418,221 B2 | 8/2016 | Turgeman | |
| 9,424,021 B2 | 8/2016 | Zamir | |
| 9,424,414 B1 | 8/2016 | Demirjian et al. | |
| 9,426,177 B2 | 8/2016 | Wang et al. | |
| 9,450,940 B2 | 9/2016 | Belov et al. | |
| 9,460,136 B1 | 10/2016 | Todd et al. | |
| 9,460,171 B2 | 10/2016 | Marrelli et al. | |
| 9,460,307 B2 | 10/2016 | Breslau et al. | |
| 9,461,876 B2 | 10/2016 | Van Dusen et al. | |
| 9,462,009 B1 | 10/2016 | Kolman et al. | |
| 9,465,702 B2 | 10/2016 | Gventer et al. | |
| 9,465,800 B2 | 10/2016 | Lacey | |
| 9,473,446 B2 | 10/2016 | Mjay et al. | |
| 9,473,505 B1 | 10/2016 | Asano et al. | |
| 9,473,535 B2 | 10/2016 | Sartor | |
| 9,477,523 B1 | 10/2016 | Warman et al. | |
| 9,477,660 B2 | 10/2016 | Scott et al. | |
| 9,477,685 B1 | 10/2016 | Leung et al. | |
| 9,477,942 B2 | 10/2016 | Adachi et al. | |
| 9,483,659 B2 | 11/2016 | Bao et al. | |
| 9,489,366 B2 | 11/2016 | Scott et al. | |
| 9,495,547 B1 | 11/2016 | Schepis et al. | |
| 9,501,523 B2 | 11/2016 | Hyatt et al. | |
| 9,507,960 B2 | 11/2016 | Bell et al. | |
| 9,509,674 B1 | 11/2016 | Nasserbakht et al. | |
| 9,509,702 B2 | 11/2016 | Grigg et al. | |
| 9,514,231 B2 | 12/2016 | Eden | |
| 9,516,012 B2 | 12/2016 | Chochois et al. | |
| 9,521,166 B2 | 12/2016 | Wilson | |
| 9,524,500 B2 | 12/2016 | Dave et al. | |
| 9,529,989 B2 | 12/2016 | Kling et al. | |
| 9,536,108 B2 | 1/2017 | Powell et al. | |
| 9,537,546 B2 | 1/2017 | Cordeiro et al. | |
| 9,542,568 B2 | 1/2017 | Francis et al. | |
| 9,549,047 B1 | 1/2017 | Fredinburg et al. | |
| 9,552,395 B2 | 1/2017 | Bayer et al. | |
| 9,552,470 B2 | 1/2017 | Turgeman et al. | |
| 9,553,918 B1 | 1/2017 | Manion et al. | |
| 9,558,497 B2 | 1/2017 | Carvalho | |
| 9,569,752 B2 | 2/2017 | Deering et al. | |
| 9,571,506 B2 | 2/2017 | Boss et al. | |
| 9,571,509 B1 | 2/2017 | Satish et al. | |
| 9,571,526 B2 | 2/2017 | Sartor | |
| 9,571,559 B2 | 2/2017 | Raleigh et al. | |
| 9,571,991 B1 | 2/2017 | Brizendine et al. | |
| 9,576,289 B2 | 2/2017 | Henderson et al. | |
| 9,578,060 B1 | 2/2017 | Brisebois et al. | |
| 9,578,173 B2 | 2/2017 | Sanghavi et al. | |
| 9,582,681 B2 | 2/2017 | Mishra | |
| 9,584,964 B2 | 2/2017 | Pelkey | |
| 9,589,110 B2 | 3/2017 | Carey et al. | |
| 9,600,181 B2 | 3/2017 | Patel et al. | |
| 9,602,529 B2 | 3/2017 | Jones et al. | |
| 9,606,971 B2 | 3/2017 | Seolas et al. | |
| 9,607,041 B2 | 3/2017 | Himmelstein | |
| 9,619,652 B2 | 4/2017 | Slater | |
| 9,619,661 B1 | 4/2017 | Finkelstein | |
| 9,621,357 B2 | 4/2017 | Williams et al. | |
| 9,621,566 B2 | 4/2017 | Gupta et al. | |
| 9,626,124 B2 | 4/2017 | Lipinski et al. | |
| 9,626,680 B1 | 4/2017 | Ryan et al. | |
| 9,629,064 B2 | 4/2017 | Graves et al. | |
| 9,642,008 B2 | 5/2017 | Wyatt et al. | |
| 9,646,095 B1 | 5/2017 | Gottlieb et al. | |
| 9,647,949 B2 | 5/2017 | Varki et al. | |
| 9,648,036 B2 | 5/2017 | Seiver et al. | |
| 9,652,314 B2 | 5/2017 | Mahiddini | |
| 9,654,506 B2 | 5/2017 | Barrett | |
| 9,654,541 B1 | 5/2017 | Kapczynski et al. | |
| 9,665,722 B2 | 5/2017 | Nagasundaram et al. | |
| 9,665,733 B1 | 5/2017 | Sills et al. | |
| 9,665,883 B2 | 5/2017 | Roullier et al. | |
| 9,672,053 B2 | 6/2017 | Tang et al. | |
| 9,672,355 B2 | 6/2017 | Titonis et al. | |
| 9,678,794 B1 | 6/2017 | Barrett et al. | |
| 9,691,090 B1 | 6/2017 | Barday | |
| 9,697,368 B2 | 7/2017 | Dharawat | |
| 9,699,209 B2 | 7/2017 | Ng et al. | |
| 9,703,549 B2 | 7/2017 | Dufresne | |
| 9,704,103 B2 | 7/2017 | Suskind et al. | |
| 9,705,840 B2 | 7/2017 | Pujare et al. | |
| 9,705,880 B2 | 7/2017 | Siris | |
| 9,721,078 B2 | 8/2017 | Cornick et al. | |
| 9,721,108 B2 | 8/2017 | Krishnamurthy et al. | |
| 9,727,751 B2 | 8/2017 | Oliver et al. | |
| 9,729,583 B1 | 8/2017 | Barday | |
| 9,734,148 B2 | 8/2017 | Bendersky et al. | |
| 9,734,255 B2 | 8/2017 | Jiang | |
| 9,736,004 B2 | 8/2017 | Jung et al. | |
| 9,740,985 B2 | 8/2017 | Byron et al. | |
| 9,740,987 B2 | 8/2017 | Dolan | |
| 9,749,408 B2 | 8/2017 | Subramani et al. | |
| 9,753,703 B2 | 9/2017 | Jemiolo | |
| 9,753,796 B2 | 9/2017 | Mahaffey et al. | |
| 9,754,091 B2 | 9/2017 | Kode et al. | |
| 9,756,059 B2 | 9/2017 | Demirjian et al. | |

(56) References Cited

U.S. PATENT DOCUMENTS

| | | | |
|---|---|---|---|
| 9,760,620 | B2 | 9/2017 | Nachnani et al. |
| 9,760,635 | B2 | 9/2017 | Bliss et al. |
| 9,760,697 | B1 | 9/2017 | Walker |
| 9,760,849 | B2 | 9/2017 | Mnnakota et al. |
| 9,762,553 | B2 | 9/2017 | Ford et al. |
| 9,767,202 | B2 | 9/2017 | Darby et al. |
| 9,767,309 | B1 | 9/2017 | Patel et al. |
| 9,769,124 | B2 | 9/2017 | Yan |
| 9,773,269 | B1 | 9/2017 | Lazarus |
| 9,785,795 | B2 | 10/2017 | Grondin et al. |
| 9,787,671 | B1 | 10/2017 | Bogrett |
| 9,798,749 | B2 | 10/2017 | Saner |
| 9,798,826 | B2 | 10/2017 | Wilson et al. |
| 9,798,896 | B2 | 10/2017 | Jakobsson |
| 9,800,605 | B2 | 10/2017 | Baikalov et al. |
| 9,800,606 | B1 | 10/2017 | Yumer |
| 9,804,649 | B2 | 10/2017 | Cohen et al. |
| 9,804,928 | B2 | 10/2017 | Davis et al. |
| 9,805,381 | B2 | 10/2017 | Frank et al. |
| 9,811,532 | B2 | 11/2017 | Parkison et al. |
| 9,817,850 | B2 | 11/2017 | Dubbels et al. |
| 9,817,978 | B2 | 11/2017 | Marsh et al. |
| 9,819,684 | B2 | 11/2017 | Cernoch et al. |
| 9,825,928 | B2 | 11/2017 | Lelcuk et al. |
| 9,830,563 | B2 | 11/2017 | Paknad |
| 9,832,633 | B2 | 11/2017 | Gerber, Jr. et al. |
| 9,836,598 | B2 | 12/2017 | Iyer et al. |
| 9,838,407 | B1 | 12/2017 | Oprea et al. |
| 9,838,839 | B2 | 12/2017 | Vudali et al. |
| 9,841,969 | B2 | 12/2017 | Seibert, Jr. et al. |
| 9,842,042 | B2 | 12/2017 | Chhatwal et al. |
| 9,842,349 | B2 | 12/2017 | Sawczuk et al. |
| 9,848,005 | B2 | 12/2017 | Ardeli et al. |
| 9,848,061 | B1 | 12/2017 | Jain et al. |
| 9,852,150 | B2 | 12/2017 | Sharpe et al. |
| 9,853,959 | B1 | 12/2017 | Kapczynski et al. |
| 9,860,226 | B2 | 1/2018 | Thormaehlen |
| 9,864,735 | B1 | 1/2018 | Lamprecht |
| 9,876,825 | B2 | 1/2018 | Amar et al. |
| 9,877,138 | B1 | 1/2018 | Franklin |
| 9,880,157 | B2 | 1/2018 | Levak et al. |
| 9,882,935 | B2 | 1/2018 | Barday |
| 9,887,965 | B2 | 2/2018 | Kay et al. |
| 9,888,377 | B1 | 2/2018 | McCorkendale et al. |
| 9,892,441 | B2 | 2/2018 | Barday |
| 9,892,442 | B2 | 2/2018 | Barday |
| 9,892,443 | B2 | 2/2018 | Barday |
| 9,892,444 | B2 | 2/2018 | Barday |
| 9,894,076 | B2 | 2/2018 | Li et al. |
| 9,898,613 | B1 | 2/2018 | Swerdlow et al. |
| 9,898,739 | B2 | 2/2018 | Monastyrsky et al. |
| 9,898,769 | B2 | 2/2018 | Barday |
| 9,912,625 | B2 | 3/2018 | Mutha et al. |
| 9,912,677 | B2 | 3/2018 | Chien |
| 9,912,810 | B2 | 3/2018 | Segre et al. |
| 9,916,703 | B2 | 3/2018 | Levinson et al. |
| 9,922,124 | B2 | 3/2018 | Rathod |
| 9,923,927 | B1 | 3/2018 | McClintock et al. |
| 9,928,379 | B1 | 3/2018 | Hoffer |
| 9,934,406 | B2 | 4/2018 | Khan et al. |
| 9,934,493 | B2 | 4/2018 | Castinado et al. |
| 9,934,544 | B1 | 4/2018 | Whitfield et al. |
| 9,936,127 | B2 | 4/2018 | Todasco |
| 9,942,214 | B1 | 4/2018 | Burciu et al. |
| 9,942,244 | B2 | 4/2018 | Lahoz et al. |
| 9,942,276 | B2 | 4/2018 | Sartor |
| 9,946,897 | B2 | 4/2018 | Lovin |
| 9,948,652 | B2 | 4/2018 | Yu et al. |
| 9,948,663 | B1 | 4/2018 | Wang et al. |
| 9,953,189 | B2 | 4/2018 | Cook et al. |
| 9,954,879 | B1 | 4/2018 | Sadaghiani et al. |
| 9,954,883 | B2 | 4/2018 | Ahuja et al. |
| 9,959,551 | B1 | 5/2018 | Schermerhorn et al. |
| 9,959,582 | B2 | 5/2018 | Sukman et al. |
| 9,961,070 | B2 | 5/2018 | Tang |
| 9,973,518 | B2 | 5/2018 | Lee et al. |
| 9,973,585 | B2 | 5/2018 | Ruback et al. |
| 9,977,904 | B2 | 5/2018 | Khan et al. |
| 9,977,920 | B2 | 5/2018 | Danielson et al. |
| 9,983,936 | B2 | 5/2018 | Dornemann et al. |
| 9,984,252 | B2 | 5/2018 | Pollard |
| 9,990,499 | B2 | 6/2018 | Chan et al. |
| 9,992,213 | B2 | 6/2018 | Sinnema |
| 10,001,975 | B2 | 6/2018 | Bharthulwar |
| 10,002,064 | B2 | 6/2018 | Muske |
| 10,007,895 | B2 | 6/2018 | Vanasco |
| 10,013,577 | B1 | 7/2018 | Beaumont et al. |
| 10,015,164 | B2 | 7/2018 | Hamburg et al. |
| 10,019,339 | B2 | 7/2018 | Von Hanxleden et al. |
| 10,019,588 | B2 | 7/2018 | Garcia et al. |
| 10,019,591 | B1 | 7/2018 | Beguin |
| 10,019,741 | B2 | 7/2018 | Hesselink |
| 10,021,143 | B2 | 7/2018 | Cabrera et al. |
| 10,025,804 | B2 | 7/2018 | Vranyes et al. |
| 10,025,836 | B2 | 7/2018 | Batchu et al. |
| 10,028,226 | B2 | 7/2018 | Ayyagari et al. |
| 10,032,172 | B2 | 7/2018 | Barday |
| 10,044,761 | B2 | 8/2018 | Ducatel et al. |
| 10,055,426 | B2 | 8/2018 | Arasan et al. |
| 10,055,869 | B2 | 8/2018 | Borrelli et al. |
| 10,061,847 | B2 | 8/2018 | Mohammed et al. |
| 10,069,858 | B2 | 9/2018 | Robinson et al. |
| 10,069,914 | B1 | 9/2018 | Smith |
| 10,073,924 | B2 | 9/2018 | Karp et al. |
| 10,075,437 | B1 | 9/2018 | Costigan et al. |
| 10,075,451 | B1 | 9/2018 | Hall et al. |
| 10,084,817 | B2 | 9/2018 | Saher et al. |
| 10,091,214 | B2 | 10/2018 | Godlewski et al. |
| 10,091,312 | B1 | 10/2018 | Khanwalkar et al. |
| 10,097,551 | B2 | 10/2018 | Chan et al. |
| 10,102,533 | B2 | 10/2018 | Barday |
| 10,108,409 | B2 | 10/2018 | Pirzadeh et al. |
| 10,122,663 | B2 | 11/2018 | Hu et al. |
| 10,122,760 | B2 | 11/2018 | Terrill et al. |
| 10,127,403 | B2 | 11/2018 | Kong et al. |
| 10,129,211 | B2 | 11/2018 | Heath |
| 10,140,666 | B1 | 11/2018 | Wang et al. |
| 10,142,113 | B2 | 11/2018 | Zaidi et al. |
| 10,152,560 | B2 | 12/2018 | Potiagalov et al. |
| 10,158,676 | B2 | 12/2018 | Barday |
| 10,165,011 | B2 | 12/2018 | Barday |
| 10,169,762 | B2 | 1/2019 | Ogawa |
| 10,176,503 | B2 | 1/2019 | Barday et al. |
| 10,181,043 | B1 | 1/2019 | Pauley, Jr. et al. |
| 10,181,051 | B2 | 1/2019 | Barday et al. |
| 10,187,363 | B2 | 1/2019 | Smirnoff et al. |
| 10,187,394 | B2 | 1/2019 | Bar et al. |
| 10,188,950 | B2 | 1/2019 | Biswas et al. |
| 10,204,154 | B2 | 2/2019 | Barday et al. |
| 10,205,994 | B2 | 2/2019 | Splaine et al. |
| 10,210,347 | B2 | 2/2019 | McCorkendale et al. |
| 10,212,134 | B2 | 2/2019 | Rai |
| 10,212,175 | B2 | 2/2019 | Seul et al. |
| 10,223,533 | B2 | 3/2019 | Dawson |
| 10,230,571 | B2 | 3/2019 | Rangasamy et al. |
| 10,230,711 | B2 | 3/2019 | Kohli |
| 10,242,228 | B2 | 3/2019 | Barday et al. |
| 10,250,594 | B2 | 4/2019 | Chathoth et al. |
| 10,255,602 | B2 | 4/2019 | Wang |
| 10,257,127 | B2 | 4/2019 | Dotan-Cohen et al. |
| 10,257,181 | B1 | 4/2019 | Sherif et al. |
| 10,268,838 | B2 | 4/2019 | Yadgiri et al. |
| 10,275,221 | B2 | 4/2019 | Thattai et al. |
| 10,275,614 | B2 | 4/2019 | Barday et al. |
| 10,282,370 | B1 | 5/2019 | Barday et al. |
| 10,282,559 | B2 | 5/2019 | Barday et al. |
| 10,284,604 | B2 | 5/2019 | Barday et al. |
| 10,289,584 | B2 | 5/2019 | Chiba |
| 10,289,857 | B1 | 5/2019 | Brinskelle |
| 10,289,866 | B2 | 5/2019 | Barday et al. |
| 10,289,867 | B2 | 5/2019 | Barday et al. |
| 10,289,870 | B2 | 5/2019 | Barday et al. |
| 10,291,731 | B2 | 5/2019 | Huang |
| 10,296,504 | B2 | 5/2019 | Hock et al. |

(56) References Cited

U.S. PATENT DOCUMENTS

| | | | |
|---|---|---|---|
| 10,304,442 B1 | 5/2019 | Rudden et al. |
| 10,310,723 B2 | 6/2019 | Rathod |
| 10,311,042 B1 | 6/2019 | Kumar |
| 10,311,249 B2 | 6/2019 | Sharifi et al. |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,798 B2 | 6/2019 | Lambert |
| 10,326,841 B2 | 6/2019 | Bradley et al. |
| 10,327,100 B1 | 6/2019 | Davis et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,339,470 B1 | 7/2019 | Dutta et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,366,241 B2 | 7/2019 | Sartor |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,577 B2 | 8/2019 | Hill et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,417,445 B2 | 9/2019 | Wouhaybi et al. |
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,439,831 B1 | 10/2019 | Governale et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,460,322 B2 | 10/2019 | Williamson et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,509,644 B2 | 12/2019 | Shoavi et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | McCorkle, Jr. et al. |
| 10,536,478 B2 | 1/2020 | Kirti et al. |
| 10,540,212 B2 | 1/2020 | Feng et al. |
| 10,541,938 B1 | 1/2020 | Timmerman et al. |
| 10,546,135 B1 | 1/2020 | Kassoumeh et al. |
| 10,552,462 B1 | 2/2020 | Hart |
| 10,558,809 B1 | 2/2020 | Joyce et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,572,778 B1 | 2/2020 | Robinson et al. |
| 10,574,705 B2 | 2/2020 | Barday et al. |
| 10,581,825 B2 | 3/2020 | Poschel et al. |
| 10,592,648 B2 | 3/2020 | Barday et al. |
| 10,592,692 B2 | 3/2020 | Brannon et al. |
| 10,599,456 B2 | 3/2020 | Lissack |
| 10,606,916 B2 | 3/2020 | Brannon et al. |
| 10,613,971 B1 | 4/2020 | Vasikarla |
| 10,614,365 B2 | 4/2020 | Sathish et al. |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,657,504 B1 | 5/2020 | Zimmerman et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,145 B2 | 7/2020 | Duminy et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,230 B2 | 9/2020 | Ancin et al. |
| 10,762,236 B2 | 9/2020 | Brannon et al. |
| 10,769,302 B2 | 9/2020 | Barday et al. |
| 10,769,303 B2 | 9/2020 | Brannon et al. |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,783,256 B2 | 9/2020 | Brannon et al. |
| 10,785,173 B2 | 9/2020 | Willett et al. |
| 10,785,299 B2 | 9/2020 | Gupta et al. |
| 10,789,594 B2 | 9/2020 | Moshir et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,803,196 B2 | 10/2020 | Bodegas Martinez et al. |
| 10,805,331 B2 | 10/2020 | Boyer et al. |
| 10,831,831 B2 | 11/2020 | Greene |
| 10,834,590 B2 | 11/2020 | Turgeman et al. |
| 10,839,100 B2 | 11/2020 | Hollinger et al. |
| 10,846,433 B2 | 11/2020 | Brannon et al. |
| 10,853,356 B1 | 12/2020 | McPherson et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,924,514 B1 | 2/2021 | Altman et al. |

(56) References Cited

U.S. PATENT DOCUMENTS

| | | | |
|---|---|---|---|
| 10,929,557 B2 * | 2/2021 | Chavez | G06Q 50/01 |
| 10,949,555 B2 | 3/2021 | Rattan et al. | |
| 10,949,565 B2 | 3/2021 | Barday et al. | |
| 10,956,213 B1 | 3/2021 | Chambers et al. | |
| 10,957,326 B2 | 3/2021 | Bhaya et al. | |
| 10,963,571 B2 | 3/2021 | Bar Joseph et al. | |
| 10,963,572 B2 | 3/2021 | Belfiore, Jr. et al. | |
| 10,965,547 B1 | 3/2021 | Esposito et al. | |
| 10,970,418 B2 | 4/2021 | Durvasula et al. | |
| 10,972,509 B2 | 4/2021 | Barday et al. | |
| 10,976,950 B1 | 4/2021 | Trezzo et al. | |
| 10,983,963 B1 | 4/2021 | Venkatasubramanian et al. | |
| 10,984,458 B1 | 4/2021 | Gutierrez | |
| 10,997,318 B2 | 5/2021 | Barday et al. | |
| 11,003,748 B2 | 5/2021 | Oliker et al. | |
| 11,012,475 B2 | 5/2021 | Patnala et al. | |
| 11,019,062 B2 | 5/2021 | Chittampally | |
| 11,023,528 B1 | 6/2021 | Lee et al. | |
| 11,023,921 B2 | 6/2021 | Wang et al. | |
| 11,037,168 B1 | 6/2021 | Lee et al. | |
| 11,057,356 B2 | 7/2021 | Malhotra et al. | |
| 11,057,427 B2 | 7/2021 | Wright et al. | |
| 11,062,051 B2 | 7/2021 | Barday et al. | |
| 11,068,318 B2 | 7/2021 | Kuesel et al. | |
| 11,068,584 B2 | 7/2021 | Burriesci et al. | |
| 11,068,618 B2 | 7/2021 | Brannon et al. | |
| 11,068,797 B2 | 7/2021 | Bhide et al. | |
| 11,068,847 B2 | 7/2021 | Boutros et al. | |
| 11,082,499 B2 | 8/2021 | Rivera | |
| 11,093,643 B2 | 8/2021 | Hennebert | |
| 11,093,950 B2 | 8/2021 | Hersh et al. | |
| 11,138,299 B2 | 10/2021 | Brannon et al. | |
| 11,144,622 B2 | 10/2021 | Brannon et al. | |
| 11,144,678 B2 | 10/2021 | Dondini et al. | |
| 11,144,862 B1 | 10/2021 | Jackson et al. | |
| 11,195,134 B2 | 12/2021 | Brannon et al. | |
| 11,201,929 B2 | 12/2021 | Dudmesh et al. | |
| 11,210,420 B2 | 12/2021 | Brannon et al. | |
| 11,222,139 B2 | 1/2022 | Jones et al. | |
| 11,222,142 B2 | 1/2022 | Jones et al. | |
| 11,238,390 B2 | 2/2022 | Brannon et al. | |
| 11,240,273 B2 | 2/2022 | Barday et al. | |
| 11,245,951 B2 | 2/2022 | Lim et al. | |
| 11,246,520 B2 | 2/2022 | Clifford et al. | |
| 11,252,159 B2 | 2/2022 | Kannan et al. | |
| 11,256,777 B2 | 2/2022 | Brannon et al. | |
| 11,263,262 B2 | 3/2022 | Chen | |
| 11,327,996 B2 | 5/2022 | Reynolds et al. | |
| 11,443,062 B2 | 9/2022 | Latka et al. | |
| 11,461,500 B2 | 10/2022 | Brannon et al. | |
| 11,636,213 B1 * | 4/2023 | Elgressy | H04L 63/0263 726/25 |
| 11,682,399 B2 | 6/2023 | Paulraj et al. | |
| 2002/0004736 A1 | 1/2002 | Roundtree et al. | |
| 2002/0049907 A1 | 4/2002 | Woods et al. | |
| 2002/0055932 A1 | 5/2002 | Wheeler et al. | |
| 2002/0073023 A1 | 6/2002 | Castro et al. | |
| 2002/0077941 A1 | 6/2002 | Halligan et al. | |
| 2002/0103854 A1 | 8/2002 | Okita | |
| 2002/0129216 A1 | 9/2002 | Collins | |
| 2002/0161594 A1 | 10/2002 | Bryan et al. | |
| 2002/0161733 A1 | 10/2002 | Grainger | |
| 2003/0041250 A1 | 2/2003 | Proudler | |
| 2003/0065641 A1 | 4/2003 | Chaloux | |
| 2003/0093680 A1 | 5/2003 | Astley et al. | |
| 2003/0097451 A1 | 5/2003 | Bjorksten et al. | |
| 2003/0097661 A1 | 5/2003 | Li et al. | |
| 2003/0115142 A1 | 6/2003 | Brickell et al. | |
| 2003/0130893 A1 | 7/2003 | Farmer | |
| 2003/0131001 A1 | 7/2003 | Matsuo | |
| 2003/0131093 A1 | 7/2003 | Aschen et al. | |
| 2003/0140150 A1 | 7/2003 | Kemp et al. | |
| 2003/0167216 A1 | 9/2003 | Brown et al. | |
| 2003/0212604 A1 | 11/2003 | Cullen | |
| 2004/0002818 A1 | 1/2004 | Kulp et al. | |
| 2004/0025053 A1 | 2/2004 | Hayward | |
| 2004/0088235 A1 | 5/2004 | Ziekle et al. | |
| 2004/0098366 A1 | 5/2004 | Sinclair et al. | |
| 2004/0098493 A1 | 5/2004 | Rees | |
| 2004/0111359 A1 | 6/2004 | Hudock | |
| 2004/0128508 A1 | 7/2004 | Wheeler et al. | |
| 2004/0186912 A1 | 9/2004 | Harlow et al. | |
| 2004/0193907 A1 | 9/2004 | Patanella | |
| 2005/0022198 A1 | 1/2005 | Olapurath et al. | |
| 2005/0033616 A1 | 2/2005 | Vavul et al. | |
| 2005/0076294 A1 | 4/2005 | Dehamer et al. | |
| 2005/0114343 A1 | 5/2005 | Wesinger et al. | |
| 2005/0144066 A1 | 6/2005 | Cope et al. | |
| 2005/0197884 A1 | 9/2005 | Mullen | |
| 2005/0198177 A1 | 9/2005 | Black | |
| 2005/0198646 A1 | 9/2005 | Kortela | |
| 2005/0246292 A1 | 11/2005 | Sarcanin | |
| 2005/0251865 A1 | 11/2005 | Mont et al. | |
| 2005/0278538 A1 | 12/2005 | Fowler | |
| 2006/0031078 A1 | 2/2006 | Pizzinger et al. | |
| 2006/0035204 A1 | 2/2006 | Lamarche et al. | |
| 2006/0041507 A1 | 2/2006 | Novack et al. | |
| 2006/0075122 A1 | 4/2006 | Lindskog et al. | |
| 2006/0149730 A1 | 7/2006 | Curtis | |
| 2006/0156052 A1 | 7/2006 | Bodnar et al. | |
| 2006/0190280 A1 | 8/2006 | Hoebel et al. | |
| 2006/0206375 A1 | 9/2006 | Scott et al. | |
| 2006/0224422 A1 | 10/2006 | Cohen | |
| 2006/0253597 A1 | 11/2006 | Mujica | |
| 2006/0259416 A1 | 11/2006 | Johnson | |
| 2007/0011058 A1 | 1/2007 | Dev | |
| 2007/0027715 A1 | 2/2007 | Gropper et al. | |
| 2007/0061125 A1 | 3/2007 | Bhatt et al. | |
| 2007/0061393 A1 | 3/2007 | Moore | |
| 2007/0130101 A1 | 6/2007 | Anderson et al. | |
| 2007/0130323 A1 | 6/2007 | Landsman et al. | |
| 2007/0157311 A1 | 7/2007 | Meier et al. | |
| 2007/0173355 A1 | 7/2007 | Klein | |
| 2007/0179793 A1 | 8/2007 | Bagchi et al. | |
| 2007/0180490 A1 | 8/2007 | Renzi et al. | |
| 2007/0192438 A1 | 8/2007 | Goei | |
| 2007/0266420 A1 | 11/2007 | Hawkins et al. | |
| 2007/0283171 A1 | 12/2007 | Breslin et al. | |
| 2008/0005194 A1 | 1/2008 | Smolen et al. | |
| 2008/0015927 A1 | 1/2008 | Ramirez | |
| 2008/0028065 A1 | 1/2008 | Caso et al. | |
| 2008/0028435 A1 | 1/2008 | Strickland et al. | |
| 2008/0047016 A1 | 2/2008 | Spoonamore | |
| 2008/0120699 A1 | 5/2008 | Spear | |
| 2008/0140696 A1 | 6/2008 | Mathuria | |
| 2008/0189306 A1 | 8/2008 | Hewett et al. | |
| 2008/0195436 A1 | 8/2008 | Whyte | |
| 2008/0222271 A1 | 9/2008 | Spires | |
| 2008/0235177 A1 | 9/2008 | Kim et al. | |
| 2008/0270203 A1 | 10/2008 | Holmes et al. | |
| 2008/0270351 A1 | 10/2008 | Thomsen | |
| 2008/0270381 A1 | 10/2008 | Thomsen | |
| 2008/0270382 A1 | 10/2008 | Thomsen et al. | |
| 2008/0270451 A1 | 10/2008 | Thomsen et al. | |
| 2008/0270462 A1 | 10/2008 | Thomsen | |
| 2008/0281649 A1 | 11/2008 | Morris | |
| 2008/0282320 A1 | 11/2008 | Denovo et al. | |
| 2008/0288271 A1 | 11/2008 | Faust | |
| 2008/0288299 A1 | 11/2008 | Schultz | |
| 2009/0012896 A1 | 1/2009 | Arnold | |
| 2009/0022301 A1 | 1/2009 | Mudaliar | |
| 2009/0037975 A1 | 2/2009 | Ishikawa et al. | |
| 2009/0119500 A1 | 5/2009 | Roth et al. | |
| 2009/0132419 A1 | 5/2009 | Grammer et al. | |
| 2009/0138276 A1 | 5/2009 | Hayashida et al. | |
| 2009/0140035 A1 | 6/2009 | Miller | |
| 2009/0144702 A1 | 6/2009 | Atkin et al. | |
| 2009/0158249 A1 | 6/2009 | Tomkins et al. | |
| 2009/0172705 A1 | 7/2009 | Cheong | |
| 2009/0182818 A1 | 7/2009 | Krywaniuk | |
| 2009/0187764 A1 | 7/2009 | Astakhov et al. | |
| 2009/0204452 A1 | 8/2009 | Iskandar et al. | |
| 2009/0204820 A1 | 8/2009 | Brandenburg et al. | |
| 2009/0210347 A1 | 8/2009 | Sarcanin | |

(56) References Cited

U.S. PATENT DOCUMENTS

| | | |
|---|---|---|
| 2009/0216610 A1 | 8/2009 | Chorny |
| 2009/0249076 A1 | 10/2009 | Reed et al. |
| 2009/0303237 A1 | 12/2009 | Liu et al. |
| 2010/0010912 A1 | 1/2010 | Jones et al. |
| 2010/0010968 A1 | 1/2010 | Redlich et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0262624 A1 | 10/2010 | Pullikottil |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0153396 A1 | 6/2011 | Marcuvitz et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2011/0238573 A1 | 9/2011 | Varadarajan |
| 2011/0252456 A1 | 10/2011 | Hatakeyama |
| 2011/0302643 A1 | 12/2011 | Pichna et al. |
| 2012/0041939 A1 | 2/2012 | Amsterdamski |
| 2012/0084151 A1 | 4/2012 | Kozak et al. |
| 2012/0084349 A1 | 4/2012 | Lee et al. |
| 2012/0102411 A1 | 4/2012 | Sathish |
| 2012/0102543 A1 | 4/2012 | Kohli et al. |
| 2012/0109830 A1 | 5/2012 | Vogel |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0191596 A1 | 7/2012 | Kremen et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0160120 A1 | 6/2013 | Malaviya et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0211872 A1 | 8/2013 | Cherry et al. |
| 2013/0218829 A1 | 8/2013 | Martinez |
| 2013/0219459 A1 | 8/2013 | Bradley |
| 2013/0254139 A1 | 9/2013 | Lei |
| 2013/0254649 A1 | 9/2013 | Michael |
| 2013/0254699 A1 | 9/2013 | Bashir et al. |
| 2013/0262328 A1 | 10/2013 | Federgreen |
| 2013/0282438 A1 | 10/2013 | Hunter et al. |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Peter |
| 2014/0040161 A1 | 2/2014 | Jason |
| 2014/0040979 A1 | 2/2014 | Barton et al. |
| 2014/0041048 A1 | 2/2014 | Goodwin et al. |
| 2014/0047551 A1 | 2/2014 | Nagasundaram et al. |
| 2014/0052463 A1 | 2/2014 | Cashman et al. |
| 2014/0067973 A1 | 3/2014 | Eden |
| 2014/0074550 A1 | 3/2014 | Chourey |
| 2014/0074645 A1 | 3/2014 | Ingram |
| 2014/0075493 A1 | 3/2014 | Krishnan et al. |
| 2014/0089027 A1 | 3/2014 | Brown |
| 2014/0089039 A1 | 3/2014 | McClellan |
| 2014/0108173 A1 | 4/2014 | Cooper et al. |
| 2014/0108968 A1 | 4/2014 | Eric |
| 2014/0137257 A1 | 5/2014 | Martinez et al. |
| 2014/0142988 A1 | 5/2014 | Grosso et al. |
| 2014/0143011 A1 | 5/2014 | Mudugu et al. |
| 2014/0143844 A1 | 5/2014 | Goertzen |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0278802 A1 | 9/2014 | Macpherson |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289366 A1 | 9/2014 | Choi et al. |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0006514 A1 | 1/2015 | Hung |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0074765 A1 | 3/2015 | Haight et al. |
| 2015/0088598 A1 | 3/2015 | Acharyya et al. |
| 2015/0088635 A1 | 3/2015 | Maycotte et al. |
| 2015/0089585 A1 | 3/2015 | Novack |
| 2015/0106260 A1 | 4/2015 | Andrews et al. |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |

(56)　　　　References Cited

U.S. PATENT DOCUMENTS

| | | |
|---|---|---|
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242638 A1 | 8/2015 | Bitran et al. |
| 2015/0242773 A1 | 8/2015 | Major et al. |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0288715 A1 | 10/2015 | Hotchkiss |
| 2015/0309813 A1 | 10/2015 | Patel |
| 2015/0310227 A1 | 10/2015 | Ishida et al. |
| 2015/0310575 A1 | 10/2015 | Shelton |
| 2015/0347421 A1 | 12/2015 | Steiner et al. |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0080405 A1 | 3/2016 | Schler et al. |
| 2016/0087957 A1 | 3/2016 | Shah et al. |
| 2016/0099963 A1 | 4/2016 | Mahaffey et al. |
| 2016/0103963 A1 | 4/2016 | Mishra |
| 2016/0104259 A1 | 4/2016 | Menrad |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0148259 A1 | 5/2016 | Baek et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Mssamsetty et al. |
| 2016/0262163 A1 | 9/2016 | Gonzalez Garrido et al. |
| 2016/0292453 A1 | 10/2016 | Patterson et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0335531 A1 | 11/2016 | Mullen et al. |
| 2016/0342811 A1 | 11/2016 | Whitcomb et al. |
| 2016/0359861 A1 | 12/2016 | Manov et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0068785 A1 | 3/2017 | Experton et al. |
| 2017/0070495 A1 | 3/2017 | Cherry et al. |
| 2017/0075513 A1 | 3/2017 | Watson et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0213206 A1 | 7/2017 | Shearer |
| 2017/0220685 A1 | 8/2017 | Yan et al. |
| 2017/0220964 A1 | 8/2017 | Datta Ray |
| 2017/0228454 A1 | 8/2017 | Bose et al. |
| 2017/0249394 A1 | 8/2017 | Loeb et al. |
| 2017/0249710 A1 | 8/2017 | Guillama et al. |
| 2017/0251013 A1* | 8/2017 | Kirti .................. H04L 63/1441 |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082024 A1 | 3/2018 | Curbera et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0204281 A1 | 7/2018 | Painter et al. |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0288063 A1* | 10/2018 | Koottayi .................. G06F 21/50 |
| 2018/0301222 A1 | 10/2018 | Dew, Sr. et al. |
| 2018/0307859 A1 | 10/2018 | Lafever et al. |
| 2018/0329893 A1* | 11/2018 | Hill .................. G06K 19/06037 |
| 2018/0336509 A1 | 11/2018 | Guttmann |
| 2018/0343215 A1 | 11/2018 | Ganapathi et al. |
| 2018/0349583 A1 | 12/2018 | Turgeman et al. |
| 2018/0351888 A1 | 12/2018 | Howard |

(56) References Cited

U.S. PATENT DOCUMENTS

| | | | |
|---|---|---|---|
| 2018/0352003 A1 | 12/2018 | Winn et al. | |
| 2018/0357243 A1 | 12/2018 | Yoon | |
| 2018/0365720 A1 | 12/2018 | Goldman et al. | |
| 2018/0374030 A1 | 12/2018 | Barday et al. | |
| 2018/0375814 A1 | 12/2018 | Hart | |
| 2019/0005210 A1 | 1/2019 | Wiederspohn et al. | |
| 2019/0012211 A1 | 1/2019 | Selvaraj | |
| 2019/0012672 A1 | 1/2019 | Francesco | |
| 2019/0019184 A1 | 1/2019 | Lacey et al. | |
| 2019/0050547 A1 | 2/2019 | Welsh et al. | |
| 2019/0087570 A1 | 3/2019 | Sloane | |
| 2019/0096020 A1 | 3/2019 | Barday et al. | |
| 2019/0108353 A1 | 4/2019 | Sadeh et al. | |
| 2019/0130132 A1 | 5/2019 | Barbas et al. | |
| 2019/0132350 A1 | 5/2019 | Smith et al. | |
| 2019/0138496 A1 | 5/2019 | Yamaguchi | |
| 2019/0139087 A1 | 5/2019 | Dabbs et al. | |
| 2019/0148003 A1 | 5/2019 | Van Hoe | |
| 2019/0156053 A1 | 5/2019 | Vogel et al. | |
| 2019/0156058 A1 | 5/2019 | Van Dyne et al. | |
| 2019/0171801 A1 | 6/2019 | Barday et al. | |
| 2019/0179652 A1 | 6/2019 | Hesener et al. | |
| 2019/0180051 A1* | 6/2019 | Barday | G06F 11/3065 |
| 2019/0182294 A1 | 6/2019 | Rieke et al. | |
| 2019/0188402 A1 | 6/2019 | Wang et al. | |
| 2019/0266200 A1 | 8/2019 | Francolla | |
| 2019/0266201 A1 | 8/2019 | Barday et al. | |
| 2019/0266350 A1 | 8/2019 | Barday et al. | |
| 2019/0268343 A1 | 8/2019 | Barday et al. | |
| 2019/0268344 A1 | 8/2019 | Barday et al. | |
| 2019/0272492 A1 | 9/2019 | Elledge et al. | |
| 2019/0294818 A1 | 9/2019 | Barday et al. | |
| 2019/0332802 A1 | 10/2019 | Barday et al. | |
| 2019/0332807 A1 | 10/2019 | Lafever et al. | |
| 2019/0333118 A1 | 10/2019 | Crimmins et al. | |
| 2019/0354709 A1 | 11/2019 | Brinskelle | |
| 2019/0356684 A1 | 11/2019 | Sinha et al. | |
| 2019/0362169 A1 | 11/2019 | Lin et al. | |
| 2019/0362268 A1 | 11/2019 | Fogarty et al. | |
| 2019/0377901 A1 | 12/2019 | Balzer et al. | |
| 2019/0378073 A1 | 12/2019 | Lopez et al. | |
| 2019/0384934 A1 | 12/2019 | Kim | |
| 2019/0392162 A1 | 12/2019 | Stern et al. | |
| 2019/0392170 A1 | 12/2019 | Barday et al. | |
| 2019/0392171 A1 | 12/2019 | Barday et al. | |
| 2020/0004938 A1 | 1/2020 | Brannon et al. | |
| 2020/0020454 A1 | 1/2020 | McGarvey et al. | |
| 2020/0050966 A1 | 2/2020 | Enuka et al. | |
| 2020/0051117 A1 | 2/2020 | Mitchell | |
| 2020/0057781 A1 | 2/2020 | McCormick | |
| 2020/0074471 A1 | 3/2020 | Adjaoute | |
| 2020/0081865 A1 | 3/2020 | Farrar et al. | |
| 2020/0082270 A1 | 3/2020 | Gu et al. | |
| 2020/0090197 A1 | 3/2020 | Rodriguez et al. | |
| 2020/0092179 A1 | 3/2020 | Chieu et al. | |
| 2020/0097662 A1* | 3/2020 | Hufsmith | H04L 9/0643 |
| 2020/0110589 A1 | 4/2020 | Bequet et al. | |
| 2020/0110904 A1 | 4/2020 | Shinde et al. | |
| 2020/0117737 A1 | 4/2020 | Gopalakrishnan et al. | |
| 2020/0137097 A1 | 4/2020 | Zimmermann et al. | |
| 2020/0143301 A1 | 5/2020 | Bowers | |
| 2020/0143797 A1 | 5/2020 | Manoharan et al. | |
| 2020/0159952 A1 | 5/2020 | Dain et al. | |
| 2020/0159955 A1 | 5/2020 | Barlik et al. | |
| 2020/0167653 A1 | 5/2020 | Manjunath et al. | |
| 2020/0175424 A1 | 6/2020 | Kursun | |
| 2020/0183655 A1 | 6/2020 | Barday et al. | |
| 2020/0186355 A1 | 6/2020 | Davies | |
| 2020/0193018 A1 | 6/2020 | Van Dyke | |
| 2020/0193022 A1 | 6/2020 | Lunsford et al. | |
| 2020/0210558 A1 | 7/2020 | Barday et al. | |
| 2020/0210620 A1 | 7/2020 | Haletky | |
| 2020/0211002 A1 | 7/2020 | Steinberg | |
| 2020/0220901 A1 | 7/2020 | Barday et al. | |
| 2020/0226156 A1 | 7/2020 | Borra et al. | |
| 2020/0226196 A1 | 7/2020 | Brannon et al. | |
| 2020/0242259 A1 | 7/2020 | Chirravuri et al. | |
| 2020/0242719 A1 | 7/2020 | Lee | |
| 2020/0250342 A1 | 8/2020 | Miller et al. | |
| 2020/0252413 A1 | 8/2020 | Buzbee et al. | |
| 2020/0252817 A1 | 8/2020 | Brouillette et al. | |
| 2020/0272764 A1 | 8/2020 | Brannon et al. | |
| 2020/0285755 A1 | 9/2020 | Kassoumeh et al. | |
| 2020/0293679 A1 | 9/2020 | Handy Bosma et al. | |
| 2020/0296171 A1 | 9/2020 | Mocanu et al. | |
| 2020/0302089 A1 | 9/2020 | Barday et al. | |
| 2020/0310917 A1 | 10/2020 | Tkachev et al. | |
| 2020/0311310 A1 | 10/2020 | Barday et al. | |
| 2020/0344243 A1 | 10/2020 | Brannon et al. | |
| 2020/0356695 A1 | 11/2020 | Brannon et al. | |
| 2020/0364369 A1 | 11/2020 | Brannon et al. | |
| 2020/0372178 A1 | 11/2020 | Barday et al. | |
| 2020/0394327 A1 | 12/2020 | Childress et al. | |
| 2020/0401380 A1 | 12/2020 | Jacobs et al. | |
| 2020/0401962 A1 | 12/2020 | Gottemukkala et al. | |
| 2020/0410117 A1 | 12/2020 | Barday et al. | |
| 2020/0410131 A1 | 12/2020 | Barday et al. | |
| 2020/0410132 A1 | 12/2020 | Brannon et al. | |
| 2021/0012341 A1 | 1/2021 | Garg et al. | |
| 2021/0056569 A1 | 2/2021 | Silberman et al. | |
| 2021/0075775 A1 | 3/2021 | Cheng et al. | |
| 2021/0081567 A1 | 3/2021 | Park et al. | |
| 2021/0099449 A1 | 4/2021 | Frederick et al. | |
| 2021/0110047 A1 | 4/2021 | Victor | |
| 2021/0124821 A1 | 4/2021 | Spivak et al. | |
| 2021/0125089 A1 | 4/2021 | Nickl et al. | |
| 2021/0136065 A1 | 5/2021 | Liokumovich et al. | |
| 2021/0152496 A1 | 5/2021 | Kim et al. | |
| 2021/0182940 A1 | 6/2021 | Gupta et al. | |
| 2021/0224402 A1 | 7/2021 | Sher-Jan et al. | |
| 2021/0233157 A1 | 7/2021 | Crutchfield, Jr. | |
| 2021/0243595 A1 | 8/2021 | Buck et al. | |
| 2021/0248247 A1 | 8/2021 | Poothokaran et al. | |
| 2021/0256163 A1 | 8/2021 | Fleming et al. | |
| 2021/0279360 A1 | 9/2021 | Gimenez Palop et al. | |
| 2021/0288995 A1 | 9/2021 | Attar et al. | |
| 2021/0297441 A1 | 9/2021 | Olalere | |
| 2021/0303828 A1 | 9/2021 | Lafreniere et al. | |
| 2021/0312061 A1 | 10/2021 | Schroeder et al. | |
| 2021/0314328 A1 | 10/2021 | Simons | |
| 2021/0326786 A1 | 10/2021 | Sun et al. | |
| 2021/0328969 A1 | 10/2021 | Gaddam et al. | |
| 2021/0350022 A1 | 11/2021 | Brannon et al. | |
| 2021/0382949 A1 | 12/2021 | Yastrebenetsky et al. | |
| 2021/0397735 A1 | 12/2021 | Samatov et al. | |
| 2021/0400018 A1 | 12/2021 | Vettaikaran et al. | |
| 2021/0406365 A1* | 12/2021 | Neil | G06F 16/951 |
| 2021/0406712 A1 | 12/2021 | Bhide et al. | |
| 2022/0004663 A1 | 1/2022 | Brannon et al. | |
| 2022/0137850 A1 | 5/2022 | Boddu et al. | |
| 2022/0171759 A1 | 6/2022 | Jindal et al. | |
| 2022/0217045 A1 | 7/2022 | Blau et al. | |
| 2022/0255959 A1* | 8/2022 | Viswanathan | G06F 21/60 |
| 2022/0414255 A1 | 12/2022 | Wang et al. | |

FOREIGN PATENT DOCUMENTS

| | | | |
|---|---|---|---|
| CN | 111496802 A | 8/2020 | |
| CN | 112115859 A | 12/2020 | |
| EP | 1394698 A2 | 3/2004 | |
| EP | 2031540 A1 | 3/2009 | |
| KR | 20130024345 A | 3/2013 | |
| KR | 20130062500 A | 6/2013 | |
| KR | 20210030622 A | 3/2021 | |
| WO | 2001033430 | 5/2001 | |
| WO | 20020067158 | 8/2002 | |
| WO | 20030050773 | 6/2003 | |
| WO | 2005008411 A2 | 1/2005 | |
| WO | 2007002412 A2 | 1/2007 | |
| WO | 2008134203 A1 | 11/2008 | |
| WO | 2012174659 A1 | 12/2012 | |
| WO | 2015116905 A1 | 8/2015 | |

(56)  References Cited

FOREIGN PATENT DOCUMENTS

WO    2020146028 A1    7/2020
WO    2022006421 A1    1/2022

OTHER PUBLICATIONS

Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated Mar. 9, 2023, from corresponding U.S. Appl. No. 17/306,496.
Office Action, dated May 12, 2022, from corresponding U.S. Appl. No. 17/509,974.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 16, 2022, from corresponding U.S. Appl. No. 17/679,750.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 24, 2022, from corresponding U.S. Appl. No. 17/674,187.
Office Action, dated May 24, 2023, from corresponding U.S. Appl. No. 18/091,750.
Office Action, dated May 25, 2023, from corresponding U.S. Appl. No. 17/869,504.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 4, 2023, from corresponding U.S. Appl. No. 18/096,935.
Office Action, dated May 5, 2020, from corresponding U.S. Appl. No. 16/410,336.
Office Action, dated May 9, 2022, from corresponding U.S. Appl. No. 16/840,943.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 10, 2022, from corresponding U.S. Appl. No. 17/670,341.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 15, 2022, from corresponding U.S. Appl. No. 17/200,698.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 18, 2022, from corresponding U.S. Appl. No. 17/836,454.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 29, 2022, from corresponding U.S. Appl. No. 17/838,939.
Office Action, dated Nov. 4, 2021, from corresponding U.S. Appl. No. 17/491,906.
Office Action, dated Nov. 8, 2021, from corresponding U.S. Appl. No. 16/872,130.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.

(56) References Cited

OTHER PUBLICATIONS

Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 14, 2022, from corresponding U.S. Appl. No. 17/836,872.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Final Office Action, dated Apr. 1, 2022, from corresponding U.S. Appl. No. 17/370,650.
Final Office Action, dated Apr. 13, 2023, from corresponding U.S. Appl. No. 16/925,550.
Final Office Action, dated Apr. 23, 2020, from corresponding U.S. Appl. No. 16/572,347.
Final Office Action, dated Apr. 25, 2022, from corresponding U.S. Appl. No. 17/149,421.
Final Office Action, dated Apr. 27, 2021, from corresponding U.S. Appl. No. 17/068,454.
Final Office Action, dated Apr. 28, 2022, from corresponding U.S. Appl. No. 16/925,550.
Final Office Action, dated Apr. 5, 2022, from corresponding U.S. Appl. No. 17/013,756.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 17, 2023, from corresponding U.S. Appl. No. 17/872,266.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 21, 2022, from corresponding U.S. Appl. No. 17/013,756.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 15, 2023, from corresponding U.S. Appl. No. 17/499,582.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 2, 2023, from corresponding U.S. Appl. No. 17/510,001.
Office Action, dated Feb. 2, 2023, from corresponding U.S. Appl. No. 17/872,266.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Office Action, dated Jan. 12, 2023, from corresponding U.S. Appl. No. 17/872,084.

(56) References Cited

OTHER PUBLICATIONS

Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 19, 2023, from corresponding U.S. Appl. No. 17/205,165.
Office Action, dated Jan. 21, 2022, from corresponding U.S. Appl. No. 17/499,624.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 31, 2022, from corresponding U.S. Appl. No. 17/493,290.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 4, 2023, from corresponding U.S. Appl. No. 17/346,586.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.

Office Action, dated Aug. 15, 2019, from corresponding U.S. Appl. No. 16/505,461.
Office Action, dated Aug. 17, 2022, from corresponding U.S. Appl. No. 17/373,444.
Office Action, dated Aug. 17, 2022, from corresponding U.S. Appl. No. 17/836,430.
Office Action, dated Aug. 17, 2023, from corresponding U.S. Appl. No. 17/942,242.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 19, 2022, from corresponding U.S. Appl. No. 17/584,187.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Aug. 9, 2023, from corresponding U.S. Appl. No. 17/743,749.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Final Office Action, dated Feb. 23, 2023, from corresponding U.S. Appl. No. 17/370,650.
Final Office Action, dated Feb. 25, 2022, from corresponding U.S. Appl. No. 17/346,586.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.

(56) References Cited

OTHER PUBLICATIONS

Final Office Action, dated Jul. 1, 2022, from corresponding U.S. Appl. No. 17/187,329.

Final Office Action, dated Jul. 21, 2021, from corresponding U.S. Appl. No. 17/151,334.

Final Office Action, dated Jul. 6, 2022, from corresponding U.S. Appl. No. 17/200,698.

Final Office Action, dated Jul. 7, 2021, from corresponding U.S. Appl. No. 17/149,421.

Final Office Action, dated Jun. 10, 2022, from corresponding U.S. Appl. No. 17/161,159.

Final Office Action, dated Jun. 29, 2022, from corresponding U.S. Appl. No. 17/020,275.

Final Office Action, dated Jun. 9, 2022, from corresponding U.S. Appl. No. 17/494,220.

Final Office Action, dated Mar. 13, 2023, from corresponding U.S. Appl. No. 17/161,159.

Final Office Action, dated Mar. 16, 2022, from corresponding U.S. Appl. No. 17/838,939.

Final Office Action, dated Mar. 16, 2023, from corresponding U.S. Appl. No. 17/670,341.

Final Office Action, dated Mar. 16, 2023, from corresponding U.S. Appl. No. 17/836,454.

Final Office Action, dated Mar. 2, 2023, from corresponding U.S. Appl. No. 17/836,865.

Final Office Action, dated Mar. 21, 2022, from corresponding U.S. Appl. No. 17/373,444.

Final Office Action, dated Mar. 22, 2022, from corresponding U.S. Appl. No. 17/380,485.

Final Office Action, dated Mar. 26, 2021, from corresponding U.S. Appl. No. 17/020,275.

Final Office Action, dated Mar. 3, 2023, from corresponding U.S. Appl. No. 17/306,438.

Final Office Action, dated Mar. 3, 2023, from corresponding U.S. Appl. No. 17/670,354.

Final Office Action, dated Mar. 5, 2019, from corresponding U.S. Appl. No. 16/055,961.

Final Office Action, dated Mar. 6, 2020, from corresponding U.S. Appl. No. 16/595,342.

Final Office Action, dated Mar. 9, 2023, from corresponding U.S. Appl. No. 17/679,734.

Final Office Action, dated May 12, 2022, from corresponding U.S. Appl. No. 17/499,624.

Final Office Action, dated May 14, 2021, from corresponding U.S. Appl. No. 17/013,756.

Final Office Action, dated May 16, 2022, from corresponding U.S. Appl. No. 17/480,377.

Final Office Action, dated May 2, 2022, from corresponding U.S. Appl. No. 17/499,595.

Final Office Action, dated May 24, 2022, from corresponding U.S. Appl. No. 17/499,582.

Final Office Action, dated Nov. 29, 2017, from corresponding U.S. Appl. No. 15/619,237.

Final Office Action, dated Nov. 8, 2022, from corresponding U.S. Appl. No. 17/151,334.

Final Office Action, dated Oct. 26, 2021, from corresponding U.S. Appl. No. 17/306,496.

Final Office Action, dated Oct. 27, 2022, from corresponding U.S. Appl. No. 17/346,586.

Final Office Action, dated Oct. 28, 2021, from corresponding U.S. Appl. No. 17/234,205.

Final Office Action, dated Oct. 29, 2021, from corresponding U.S. Appl. No. 17/020,275.

Final Office Action, dated Sep. 17, 2021, from corresponding U.S. Appl. No. 17/200,698.

Final Office Action, dated Sep. 19, 2022, from corresponding U.S. Appl. No. 17/306,496.

Final Office Action, dated Sep. 21, 2020, from corresponding U.S. Appl. No. 16/808,493.

Final Office Action, dated Sep. 21, 2020, from corresponding U.S. Appl. No. 16/862,944.

Final Office Action, dated Sep. 22, 2020, from corresponding U.S. Appl. No. 16/808,497.

Final Office Action, dated Sep. 23, 2020, from corresponding U.S. Appl. No. 16/862,948.

Final Office Action, dated Sep. 24, 2020, from corresponding U.S. Appl. No. 16/862,952.

Final Office Action, dated Sep. 25, 2019, from corresponding U.S. Appl. No. 16/278,119.

Final Office Action, dated Sep. 28, 2020, from corresponding U.S. Appl. No. 16/565,395.

Final Office Action, dated Sep. 8, 2020, from corresponding U.S. Appl. No. 16/410,866.

Office Action, dated Apr. 1, 2021, from corresponding U.S. Appl. No. 17/119,080.

Office Action, dated Oct. 10, 2018, from corresponding U.S. Appl. No. 16/041,563.

Office Action, dated Oct. 10, 2018, from corresponding U.S. Appl. No. 16/055,083.

Office Action, dated Oct. 10, 2018, from corresponding U.S. Appl. No. 16/055,944.

Office Action, dated Oct. 12, 2021, from corresponding U.S. Appl. No. 17/346,509.

Office Action, dated Oct. 14, 2020, from corresponding U.S. Appl. No. 16/927,658.

Office Action, dated Oct. 15, 2018, from corresponding U.S. Appl. No. 16/054,780.

Office Action, dated Oct. 15, 2021, from corresponding U.S. Appl. No. 16/908,081.

Office Action, dated Oct. 16, 2019, from corresponding U.S. Appl. No. 16/557,392.

Office Action, dated Oct. 16, 2020, from corresponding U.S. Appl. No. 16/808,489.

Office Action, dated Oct. 23, 2018, from corresponding U.S. Appl. No. 16/055,961.

Office Action, dated Oct. 25, 2022, from corresponding U.S. Appl. No. 17/836,865.

Office Action, dated Oct. 26, 2018, from corresponding U.S. Appl. No. 16/041,468.

Office Action, dated Oct. 27, 2022, from corresponding U.S. Appl. No. 17/161,159.

Office Action, dated Oct. 8, 2019, from corresponding U.S. Appl. No. 16/552,765.

Office Action, dated Sep. 1, 2017, from corresponding U.S. Appl. No. 15/619,459.

Office Action, dated Sep. 11, 2017, from corresponding U.S. Appl. No. 15/619,375.

Office Action, dated Sep. 11, 2017, from corresponding U.S. Appl. No. 15/619,478.

Office Action, dated Sep. 15, 2021, from corresponding U.S. Appl. No. 16/623,157.

Office Action, dated Sep. 16, 2019, from corresponding U.S. Appl. No. 16/277,715.

Office Action, dated Sep. 16, 2022, from corresponding U.S. Appl. No. 17/306,438.

Office Action, dated Sep. 19, 2017, from corresponding U.S. Appl. No. 15/671,073.

Office Action, dated Sep. 2, 2022, from corresponding U.S. Appl. No. 17/499,624.

Office Action, dated Sep. 21, 2023, from corresponding U.S. Appl. No. 18/116,791.

Office Action, dated Sep. 22, 2017, from corresponding U.S. Appl. No. 15/619,278.

Office Action, dated Sep. 24, 2021, from corresponding U.S. Appl. No. 17/342,153.

Office Action, dated Sep. 4, 2020, from corresponding U.S. Appl. No. 16/989,086.

Office Action, dated Sep. 5, 2017, from corresponding U.S. Appl. No. 15/619,469.

Office Action, dated Sep. 6, 2017, from corresponding U.S. Appl. No. 15/619,479.

(56) References Cited

OTHER PUBLICATIONS

Office Action, dated Sep. 7, 2017, from corresponding U.S. Appl. No. 15/633,703.

Office Action, dated Sep. 8, 2017, from corresponding U.S. Appl. No. 15/619,251.

Office Action, dated Sep. 8, 2022, from corresponding U.S. Appl. No. 17/850,244.

Notice of Allowance, dated Apr. 12, 2017, from corresponding U.S. Appl. No. 15/256,419.

Notice of Allowance, dated Apr. 12, 2022, from corresponding U.S. Appl. No. 17/479,807.

Notice of Allowance, dated Apr. 14, 2022, from corresponding U.S. Appl. No. 17/572,276.

Notice of Allowance, dated Apr. 17, 2020, from corresponding U.S. Appl. No. 16/593,639.

Notice of Allowance, dated Apr. 19, 2021, from corresponding U.S. Appl. No. 17/164,029.

Notice of Allowance, dated Apr. 2, 2019, from corresponding U.S. Appl. No. 16/160,577.

Notice of Allowance, dated Apr. 2, 2021, from corresponding U.S. Appl. No. 17/162,006.

Notice of Allowance, dated Apr. 20, 2022, from corresponding U.S. Appl. No. 17/573,808.

Notice of Allowance, dated Apr. 22, 2021, from corresponding U.S. Appl. No. 17/163,701.

Notice of Allowance, dated Apr. 25, 2018, from corresponding U.S. Appl. No. 15/883,041.

Notice of Allowance, dated Apr. 27, 2022, from corresponding U.S. Appl. No. 17/573,999.

Notice of Allowance, dated Apr. 28, 2021, from corresponding U.S. Appl. No. 17/135,445.

Notice of Allowance, dated Apr. 28, 2021, from corresponding U.S. Appl. No. 7/181,828.

Notice of Allowance, dated Apr. 28, 2022, from corresponding U.S. Appl. No. 17/592,922.

Notice of Allowance, dated Apr. 28, 2022, from corresponding U.S. Appl. No. 17/670,352.

Notice of Allowance, dated Apr. 29, 2020, from corresponding U.S. Appl. No. 16/700,049.

Notice of Allowance, dated Apr. 29, 2022, from corresponding U.S. Appl. No. 17/387,421.

Notice of Allowance, dated Apr. 30, 2020, from corresponding U.S. Appl. No. 16/565,265.

Notice of Allowance, dated Apr. 30, 2020, from corresponding U.S. Appl. No. 16/820,346.

Notice of Allowance, dated Apr. 30, 2021, from corresponding U.S. Appl. No. 16/410,762.

Notice of Allowance, dated Apr. 4, 2022, from corresponding U.S. Appl. No. 17/493,332.

Notice of Allowance, dated Apr. 4, 2022, from corresponding U.S. Appl. No. 17/572,298.

Notice of Allowance, dated Apr. 8, 2019, from corresponding U.S. Appl. No. 16/228,250.

Notice of Allowance, dated Apr. 8, 2020, from corresponding U.S. Appl. No. 16/791,348.

Notice of Allowance, dated Apr. 9, 2020, from corresponding U.S. Appl. No. 16/791,075.

Notice of Allowance, dated Aug. 10, 2020, from corresponding U.S. Appl. No. 16/671,444.

Notice of Allowance, dated Aug. 10, 2020, from corresponding U.S. Appl. No. 16/788,633.

Notice of Allowance, dated Aug. 12, 2020, from corresponding U.S. Appl. No. 16/719,488.

Notice of Allowance, dated Aug. 12, 2021, from corresponding U.S. Appl. No. 16/881,832.

Notice of Allowance, dated Aug. 14, 2018, from corresponding U.S. Appl. No. 15/989,416.

Notice of Allowance, dated Aug. 18, 2017, from corresponding U.S. Appl. No. 15/619,455.

Notice of Allowance, dated Aug. 20, 2019, from corresponding U.S. Appl. No. 16/241,710.

Notice of Allowance, dated Aug. 22, 2022, from corresponding U.S. Appl. No. 17/499,595.

Notice of Allowance, dated Aug. 24, 2018, from corresponding U.S. Appl. No. 15/619,479.

Notice of Allowance, dated Aug. 26, 2019, from corresponding U.S. Appl. No. 16/443,374.

Notice of Allowance, dated Aug. 26, 2020, from corresponding U.S. Appl. No. 16/808,503.

Notice of Allowance, dated Aug. 28, 2019, from corresponding U.S. Appl. No. 16/278,120.

Notice of Allowance, dated Aug. 3, 2022, from corresponding U.S. Appl. No. 17/668,714.

Notice of Allowance, dated Aug. 30, 2018, from corresponding U.S. Appl. No. 15/996,208.

Notice of Allowance, dated Aug. 31, 2021, from corresponding U.S. Appl. No. 17/326,901.

Notice of Allowance, dated Aug. 4, 2021, from corresponding U.S. Appl. No. 16/895,278.

Notice of Allowance, dated Aug. 4, 2022, from corresponding U.S. Appl. No. 17/670,349.

Notice of Allowance, dated Aug. 7, 2020, from corresponding U.S. Appl. No. 16/901,973.

Notice of Allowance, dated Aug. 9, 2018, from corresponding U.S. Appl. No. 15/882,989.

Notice of Allowance, dated Aug. 9, 2021, from corresponding U.S. Appl. No. 16/881,699.

Notice of Allowance, dated Aug. 9, 2022, from corresponding U.S. Appl. No. 17/832,313.

Notice of Allowance, dated Dec. 10, 2018, from corresponding U.S. Appl. No. 16/105,602.

Notice of Allowance, dated Dec. 11, 2019, from corresponding U.S. Appl. No. 16/278,122.

Notice of Allowance, dated Dec. 11, 2019, from corresponding U.S. Appl. No. 16/593,634.

Notice of Allowance, dated Dec. 12, 2017, from corresponding U.S. Appl. No. 15/169,643.

Notice of Allowance, dated Dec. 12, 2017, from corresponding U.S. Appl. No. 15/619,212.

Notice of Allowance, dated Dec. 12, 2017, from corresponding U.S. Appl. No. 15/619,382.

Notice of Allowance, dated Dec. 13, 2019, from corresponding U.S. Appl. No. 16/512,033.

Notice of Allowance, dated Dec. 13, 2021, from corresponding U.S. Appl. No. 16/908,081.

Notice of Allowance, dated Dec. 13, 2021, from corresponding U.S. Appl. No. 17/347,853.

Notice of Allowance, dated Dec. 15, 2020, from corresponding U.S. Appl. No. 16/989,086.

Notice of Allowance, dated Dec. 16, 2019, from corresponding U.S. Appl. No. 16/505,461.

Notice of Allowance, dated Dec. 17, 2020, from corresponding U.S. Appl. No. 17/034,772.

Notice of Allowance, dated Dec. 18, 2019, from corresponding U.S. Appl. No. 16/659,437.

Notice of Allowance, dated Dec. 2, 2021, from corresponding U.S. Appl. No. 16/901,654.

Notice of Allowance, dated Dec. 23, 2019, from corresponding U.S. Appl. No. 16/656,835.

Notice of Allowance, dated Dec. 23, 2020, from corresponding U.S. Appl. No. 17/068,557.

Notice of Allowance, dated Dec. 3, 2019, from corresponding U.S. Appl. No. 16/563,749.

Notice of Allowance, dated Dec. 30, 2021, from corresponding U.S. Appl. No. 16/938,520.

Notice of Allowance, dated Dec. 31, 2018, from corresponding U.S. Appl. No. 16/159,634.

Notice of Allowance, dated Dec. 31, 2019, from corresponding U.S. Appl. No. 16/404,399.

Notice of Allowance, dated Dec. 4, 2019, from corresponding U.S. Appl. No. 16/594,670.

(56)     References Cited

OTHER PUBLICATIONS

Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Jun. 29, 2022, from corresponding U.S. Appl. No. 17/675,118.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Jun. 8, 2022, from corresponding U.S. Appl. No. 17/722,551.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 13, 2023, from corresponding U.S. Appl. No. 17/200,698.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 16, 2022, from corresponding U.S. Appl. No. 17/486,350.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 28, 2022, from corresponding U.S. Appl. No. 17/499,609.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated Mar. 31, 2022, from corresponding U.S. Appl. No. 17/476,209.
Notice of Allowance, dated Mar. 4, 2022, from corresponding U.S. Appl. No. 17/409,999.
Notice of Allowance, dated Mar. 6, 2023, from corresponding U.S. Appl. No. 17/836,430.
Notice of Allowance, dated Mar. 8, 2023, from corresponding U.S. Appl. No. 17/530,201.
Notice of Allowance, dated May 1, 2020, from corresponding U.S. Appl. No. 16/586,202.
Notice of Allowance, dated May 10, 2023, from corresponding U.S. Appl. No. 17/872,084.
Notice of Allowance, dated May 11, 2020, from corresponding U.S. Appl. No. 16/786,196.
Notice of Allowance, dated May 11, 2022, from corresponding U.S. Appl. No. 17/395,759.
Notice of Allowance, dated May 13, 2021, from corresponding U.S. Appl. No. 17/101,915.
Notice of Allowance, dated May 18, 2022, from corresponding U.S. Appl. No. 17/670,354.
Notice of Allowance, dated May 19, 2020, from corresponding U.S. Appl. No. 16/505,430.
Notice of Allowance, dated May 19, 2020, from corresponding U.S. Appl. No. 16/808,496.
Office Action, dated Jan. 31, 2023, from corresponding U.S. Appl. No. 17/836,872.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 20, 2023, from corresponding U.S. Appl. No. 18/104,981.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jul. 27, 2022, from corresponding U.S. Appl. No. 17/831,713.

(56)     References Cited

OTHER PUBLICATIONS

Office Action, dated Jul. 28, 2022, from corresponding U.S. Appl. No. 16/925,550.

Office Action, dated Jul. 7, 2022, from corresponding U.S. Appl. No. 17/370,650.

Office Action, dated Jun. 1, 2020, from corresponding U.S. Appl. No. 16/862,952.

Office Action, dated Jun. 1, 2022, from corresponding U.S. Appl. No. 17/306,496.

Office Action, dated Jun. 14, 2022, from corresponding U.S. Appl. No. 17/346,586.

Office Action, dated Jun. 16, 2022, from corresponding U.S. Appl. No. 17/689,683.

Office Action, dated Jun. 24, 2019, from corresponding U.S. Appl. No. 16/410,336.

Office Action, dated Jun. 24, 2021, from corresponding U.S. Appl. No. 17/234,205.

Office Action, dated Jun. 27, 2019, from corresponding U.S. Appl. No. 16/404,405.

Office Action, dated Jun. 27, 2023, from corresponding U.S. Appl. No. 17/738,448.

Office Action, dated Jun. 7, 2021, from corresponding U.S. Appl. No. 17/200,698.

Office Action, dated Jun. 7, 2023, from corresponding U.S. Appl. No. 17/977,285.

Office Action, dated Jun. 9, 2021, from corresponding U.S. Appl. No. 17/222,523.

Office Action, dated Mar. 1, 2022, from corresponding U.S. Appl. No. 17/119,080.

Office Action, dated Mar. 11, 2019, from corresponding U.S. Appl. No. 16/220,978.

Office Action, dated Mar. 12, 2019, from corresponding U.S. Appl. No. 16/221,153.

Office Action, dated Mar. 15, 2021, from corresponding U.S. Appl. No. 17/149,421.

Office Action, dated Mar. 16, 2020, from corresponding U.S. Appl. No. 16/719,488.

Office Action, dated Mar. 16, 2023, from corresponding U.S. Appl. No. 17/494,220.

Office Action, dated Mar. 17, 2020, from corresponding U.S. Appl. No. 16/565,395.

Office Action, dated Mar. 17, 2020, from corresponding U.S. Appl. No. 16/719,071.

Office Action, dated Mar. 2, 2022, from corresponding U.S. Appl. No. 17/020,275.

Office Action, dated Mar. 2, 2022, from corresponding U.S. Appl. No. 17/161,159.

Office Action, dated Mar. 2, 2022, from corresponding U.S. Appl. No. 17/200,698.

Office Action, dated Mar. 20, 2020, from corresponding U.S. Appl. No. 16/778,709.

Office Action, dated Mar. 21, 2022, from corresponding U.S. Appl. No. 17/571,871.

Office Action, dated Mar. 22, 2022, from corresponding U.S. Appl. No. 17/187,329.

Office Action, dated Mar. 23, 2020, from corresponding U.S. Appl. No. 16/671,444.

Office Action, dated Mar. 25, 2019, from corresponding U.S. Appl. No. 16/278,121.

Office Action, dated Mar. 25, 2020, from corresponding U.S. Appl. No. 16/701,043.

Office Action, dated Mar. 25, 2020, from corresponding U.S. Appl. No. 16/791,006.

Office Action, dated Mar. 27, 2019, from corresponding U.S. Appl. No. 16/278,120.

Notice of Allowance, dated Jan. 31, 2022, from corresponding U.S. Appl. No. 17/472,948.

Notice of Allowance, dated Jan. 31, 2023, from corresponding U.S. Appl. No. 17/499,624.

Notice of Allowance, dated Jan. 5, 2022, from corresponding U.S. Appl. No. 17/475,241.

Notice of Allowance, dated Jan. 6, 2021, from corresponding U.S. Appl. No. 16/595,327.

Notice of Allowance, dated Jan. 6, 2022, from corresponding U.S. Appl. No. 17/407,765.

Notice of Allowance, dated Jan. 7, 2022, from corresponding U.S. Appl. No. 17/222,725.

Notice of Allowance, dated Jan. 8, 2020, from corresponding U.S. Appl. No. 16/600,879.

Notice of Allowance, dated Jul. 10, 2019, from corresponding U.S. Appl. No. 16/237,083.

Notice of Allowance, dated Jul. 10, 2019, from corresponding U.S. Appl. No. 16/403,358.

Notice of Allowance, dated Jul. 12, 2019, from corresponding U.S. Appl. No. 16/278,121.

Notice of Allowance, dated Jul. 14, 2020, from corresponding U.S. Appl. No. 16/701,043.

Notice of Allowance, dated Jul. 15, 2020, from corresponding U.S. Appl. No. 16/791,006.

Notice of Allowance, dated Jul. 16, 2020, from corresponding U.S. Appl. No. 16/901,979.

Notice of Allowance, dated Jul. 17, 2019, from corresponding U.S. Appl. No. 16/055,961.

Notice of Allowance, dated Jul. 17, 2020, from corresponding U.S. Appl. No. 16/778,709.

Notice of Allowance, dated Jul. 19, 2021, from corresponding U.S. Appl. No. 17/306,252.

Notice of Allowance, dated Jul. 20, 2022, from corresponding U.S. Appl. No. 16/938,509.

Notice of Allowance, dated Jul. 21, 2020, from corresponding U.S. Appl. No. 16/557,392.

Notice of Allowance, dated Jul. 23, 2019, from corresponding U.S. Appl. No. 16/220,978.

Notice of Allowance, dated Jul. 26, 2019, from corresponding U.S. Appl. No. 16/409,673.

Notice of Allowance, dated Jul. 26, 2021, from corresponding U.S. Appl. No. 17/151,399.

Notice of Allowance, dated Jul. 26, 2021, from corresponding U.S. Appl. No. 17/207,316.

Notice of Allowance, dated Jul. 26, 2023, from corresponding U.S. Appl. No. 18/109,556.

Notice of Allowance, dated Jul. 27, 2022, from corresponding U.S. Appl. No. 17/679,750.

Notice of Allowance, dated Jul. 29, 2022, from corresponding U.S. Appl. No. 17/670,341.

Notice of Allowance, dated Jul. 31, 2019, from corresponding U.S. Appl. No. 16/221,153.

Notice of Allowance, dated Jul. 7, 2022, from corresponding U.S. Appl. No. 17/571,871.

Notice of Allowance, dated Jul. 7, 2023, from corresponding U.S. Appl. No. 17/977,285.

Notice of Allowance, dated Jul. 8, 2021, from corresponding U.S. Appl. No. 17/201,040.

Notice of Allowance, dated Jun. 1, 2020, from corresponding U.S. Appl. No. 16/813,321.

Notice of Allowance, dated Jun. 11, 2021, from corresponding U.S. Appl. No. 16/862,948.

Notice of Allowance, dated Jun. 11, 2021, from corresponding U.S. Appl. No. 16/862,952.

Notice of Allowance, dated Jun. 11, 2021, from corresponding U.S. Appl. No. 17/216,436.

Notice of Allowance, dated Jun. 12, 2019, from corresponding U.S. Patent Application No. 16/278, 123.

Notice of Allowance, dated Jun. 12, 2019, from corresponding U.S. Appl. No. 16/363,454.

Notice of Allowance, dated Jun. 14, 2022, from corresponding U.S. Appl. No. 17/679,734.

Notice of Allowance, dated Jun. 16, 2020, from corresponding U.S. Appl. No. 16/798,818.

Notice of Allowance, dated Jun. 16, 2022, from corresponding U.S. Appl. No. 17/119,080.

(56) References Cited

OTHER PUBLICATIONS

Notice of Allowance, dated Jun. 17, 2020, from corresponding U.S. Appl. No. 16/656,895.

Notice of Allowance, dated Jun. 18, 2019, from corresponding U.S. Appl. No. 16/410,566.

Notice of Allowance, dated Jun. 19, 2018, from corresponding U.S. Appl. No. 15/894,890.

Notice of Allowance, dated Jun. 19, 2019, from corresponding U.S. Appl. No. 16/042,673.

Notice of Allowance, dated Jun. 19, 2019, from corresponding U.S. Appl. No. 16/055,984.

Notice of Allowance, dated Jun. 2, 2021, from corresponding U.S. Appl. No. 17/198,581.

Notice of Allowance, dated Jun. 2, 2022, from corresponding U.S. Appl. No. 17/493,290.

Notice of Allowance, dated Jun. 2, 2023, from corresponding U.S. Appl. No. 18/096,935.

Notice of Allowance, dated Jun. 21, 2019, from corresponding U.S. Appl. No. 16/404,439.

Notice of Allowance, dated Jun. 22, 2020, from corresponding U.S. Appl. No. 16/791,337.

Notice of Allowance, dated Jun. 23, 2022, from corresponding U.S. Appl. No. 17/588,645.

Notice of Allowance, dated Jun. 27, 2018, from corresponding U.S. Appl. No. 15/882,989.

Notice of Allowance, dated May 20, 2020, from corresponding U.S. Appl. No. 16/707,762.

Notice of Allowance, dated May 21, 2018, from corresponding U.S. Appl. No. 15/896,790.

Notice of Allowance, dated May 25, 2022, from corresponding U.S. Appl. No. 16/872,031.

Notice of Allowance, dated May 26, 2021, from corresponding U.S. Appl. No. 16/808,493.

Notice of Allowance, dated May 26, 2021, from corresponding U.S. Appl. No. 16/865,874.

Notice of Allowance, dated May 26, 2021, from corresponding U.S. Appl. No. 17/199,514.

Notice of Allowance, dated May 27, 2020, from corresponding U.S. Appl. No. 16/820,208.

Notice of Allowance, dated May 27, 2021, from corresponding U.S. Appl. No. 16/927,658.

Notice of Allowance, dated May 27, 2021, from corresponding U.S. Appl. No. 17/198,757.

Notice of Allowance, dated May 27, 2022, from corresponding U.S. Appl. No. 17/543,546.

Notice of Allowance, dated May 28, 2019, from corresponding U.S. Appl. No. 16/277,568.

Notice of Allowance, dated May 28, 2020, from corresponding U.S. Appl. No. 16/799,279.

Notice of Allowance, dated May 28, 2021, from corresponding U.S. Appl. No. 16/862,944.

Notice of Allowance, dated May 31, 2022, from corresponding U.S. Appl. No. 17/679,715.

Notice of Allowance, dated May 5, 2017, from corresponding U.S. Appl. No. 15/254,901.

Notice of Allowance, dated May 5, 2020, from corresponding U.S. Appl. No. 16/563,754.

Notice of Allowance, dated May 6, 2022, from corresponding U.S. Appl. No. 17/666,886.

Notice of Allowance, dated May 7, 2020, from corresponding U.S. Appl. No. 16/505,426.

Notice of Allowance, dated May 7, 2021, from corresponding U.S. Appl. No. 17/194,662.

Notice of Allowance, dated Nov. 14, 2019, from corresponding U.S. Appl. No. 16/436,616.

Notice of Allowance, dated Nov. 16, 2021, from corresponding U.S. Appl. No. 17/491,871.

Notice of Allowance, dated Nov. 16, 2022, from corresponding U.S. Appl. No. 17/860,255.

Notice of Allowance, dated Nov. 2, 2018, from corresponding U.S. Appl. No. 16/054,762.

Notice of Allowance, dated Nov. 21, 2022, from corresponding U.S. Appl. No. 17/831,713.

Notice of Allowance, dated Nov. 22, 2021, from corresponding U.S. Appl. No. 17/383,889.

Notice of Allowance, dated Nov. 22, 2022, from corresponding U.S. Appl. No. 17/828,953.

Notice of Allowance, dated Nov. 23, 2020, from corresponding U.S. Appl. No. 16/791,589.

Notice of Allowance, dated Nov. 24, 2020, from corresponding U.S. Appl. No. 17/027,019.

Notice of Allowance, dated Nov. 25, 2020, from corresponding U.S. Appl. No. 17/019,771.

Notice of Allowance, dated Nov. 26, 2019, from corresponding U.S. Appl. No. 16/563,735.

Notice of Allowance, dated Nov. 27, 2019, from corresponding U.S. Appl. No. 16/570,712.

Notice of Allowance, dated Nov. 27, 2019, from corresponding U.S. Appl. No. 16/577,634.

Notice of Allowance, dated Nov. 3, 2020, from corresponding U.S. Appl. No. 16/719,071.

Notice of Allowance, dated Nov. 5, 2019, from corresponding U.S. Appl. No. 16/560,965.

Notice of Allowance, dated Nov. 7, 2017, from corresponding U.S. Appl. No. 15/671,073.

Notice of Allowance, dated Nov. 8, 2018, from corresponding U.S. Appl. No. 16/042,642.

Notice of Allowance, dated Nov. 9, 2020, from corresponding U.S. Appl. No. 16/595,342.

Notice of Allowance, dated Nov. 9, 2022, from corresponding U.S. Appl. No. 17/187,329.

Notice of Allowance, dated Oct. 1, 2021, from corresponding U.S. Appl. No. 17/340,395.

Notice of Allowance, dated Oct. 10, 2019, from corresponding U.S. Appl. No. 16/277,539.

Notice of Allowance, dated Oct. 17, 2018, from corresponding U.S. Appl. No. 15/896,790.

Notice of Allowance, dated Oct. 17, 2018, from corresponding U.S. Appl. No. 16/054,672.

Notice of Allowance, dated Oct. 17, 2019, from corresponding U.S. Appl. No. 16/563,741.

Notice of Allowance, dated Oct. 18, 2022, from corresponding U.S. Appl. No. 16/840,943.

Notice of Allowance, dated Oct. 21, 2019, from corresponding U.S. Appl. No. 16/404,405.

Notice of Allowance, dated Oct. 21, 2020, from corresponding U.S. Appl. No. 16/834,812.

Notice of Allowance, dated Oct. 22, 2021, from corresponding U.S. Appl. No. 17/346,847.

Notice of Allowance, dated Oct. 25, 2022, from corresponding U.S. Appl. No. 17/711,331.

Notice of Allowance, dated Oct. 3, 2019, from corresponding U.S. Appl. No. 16/511,700.

Notice of Allowance, dated Sep. 1, 2021, from corresponding U.S. Appl. No. 17/196,570.

Notice of Allowance, dated Sep. 1, 2021, from corresponding U.S. Appl. No. 17/222,556.

Notice of Allowance, dated Sep. 1, 2022, from corresponding U.S. Appl. No. 17/480,377.

Notice of Allowance, dated Sep. 12, 2019, from corresponding U.S. Appl. No. 16/512,011.

Notice of Allowance, dated Sep. 12, 2022, from corresponding U.S. Appl. No. 17/674,187.

Notice of Allowance, dated Sep. 13, 2018, from corresponding U.S. Appl. No. 15/894,809.

Notice of Allowance, dated Sep. 13, 2018, from corresponding U.S. Appl. No. 15/894,890.

Notice of Allowance, dated Sep. 14, 2021, from corresponding U.S. Appl. No. 16/808,497.

Notice of Allowance, dated Sep. 16, 2020, from corresponding U.S. Appl. No. 16/915,097.

(56)         References Cited

OTHER PUBLICATIONS

Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 2, 2022, from corresponding U.S. Appl. No. 17/380,485.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 28, 2022, from corresponding U.S. Appl. No. 17/509,974.
Notice of Allowance, dated Sep. 28, 2022, from corresponding U.S. Appl. No. 17/689,683.
Notice of Allowance, dated Sep. 29, 2021, from corresponding U.S. Appl. No. 17/316,179.
Notice of Allowance, dated Sep. 30, 2022, from corresponding U.S. Appl. No. 17/867,068.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 14, 2023, from corresponding U.S. Appl. No. 17/373,444.
Notice of Allowance, dated Feb. 19, 2019, from corresponding U.S. Appl. No. 16/159,632.

Notice of Allowance, dated Feb. 19, 2021, from corresponding U.S. Appl. No. 16/832,451.
Notice of Allowance, dated Feb. 2, 2023, from corresponding U.S. Appl. No. 17/850,244.
Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Feb. 8, 2023, from corresponding U.S. Appl. No. 17/584,187.
Notice of Allowance, dated Feb. 8, 2023, from corresponding U.S. Appl. No. 17/831,700.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 25, 2023, from corresponding U.S. Appl. No. 17/675,760.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.

(56) References Cited

OTHER PUBLICATIONS

Written Opinion of the International Searching Authority, dated Feb. 14, 2022, from corresponding International Application No. PCT/US2021/058274.

Written Opinion of the International Searching Authority, dated Jan. 14, 2019, from corresponding International Application No. PCT/US2018/046949.

Written Opinion of the International Searching Authority, dated Jan. 27, 2023, from corresponding International Application No. PCT/US2022/045520.

Written Opinion of the International Searching Authority, dated Jan. 5, 2022, from corresponding International Application No. PCT/US2021/050497.

Written Opinion of the International Searching Authority, dated Jan. 7, 2019, from corresponding International Application No. PCT/US2018/055772.

Written Opinion of the International Searching Authority, dated Jun. 1, 2022, from corresponding International Application No. PCT/US2022/016930.

Written Opinion of the International Searching Authority, dated Jun. 21, 2017, from corresponding International Application No. PCT/US2017/025600.

Written Opinion of the International Searching Authority, dated Jun. 22, 2022, from corresponding International Application No. PCT/US2022/019358.

Written Opinion of the International Searching Authority, dated Jun. 24, 2022, from corresponding International Application No. PCT/US2022/019882.

Written Opinion of the International Searching Authority, dated Jun. 6, 2017, from corresponding International Application No. PCT/US2017/025605.

Written Opinion of the International Searching Authority, dated Jun. 6, 2017, from corresponding International Application No. PCT/US2017/025611.

Written Opinion of the International Searching Authority, dated Mar. 14, 2019, from corresponding International Application No. PCT/US2018/055736.

Written Opinion of the International Searching Authority, dated Mar. 18, 2022, from corresponding International Application No. PCT/US2022/013733.

Written Opinion of the International Searching Authority, dated Mar. 4, 2019, from corresponding International Application No. PCT/US2018/055773.

Written Opinion of the International Searching Authority, dated Mar. 4, 2019, from corresponding International Application No. PCT/US2018/055774.

Written Opinion of the International Searching Authority, dated May 12, 2022, from corresponding International Application No. PCT/US2022/015929.

Written Opinion of the International Searching Authority, dated May 17, 2022, from corresponding International Application No. PCT/US2022/015241.

Written Opinion of the International Searching Authority, dated May 19, 2022, from corresponding International Application No. PCT/US2022/015637.

Written Opinion of the International Searching Authority, dated Nov. 12, 2021, from corresponding International Application No. PCT/US2021/043481.

Written Opinion of the International Searching Authority, dated Nov. 19, 2018, from corresponding International Application No. PCT/US2018/046939.

Written Opinion of the International Searching Authority, dated Nov. 3, 2021, from corresponding International Application No. PCT/US2021/040893.

Written Opinion of the International Searching Authority, dated Nov. 3, 2021, from corresponding International Application No. PCT/US2021/044910.

Written Opinion of the International Searching Authority, dated Oct. 11, 2018, from corresponding International Application No. PCT/US2018/043975.

Written Opinion of the International Searching Authority, dated Oct. 11, 2018, from corresponding International Application No. PCT/US2018/043976.

Written Opinion of the International Searching Authority, dated Oct. 11, 2018, from corresponding International Application No. PCT/US2018/043977.

Written Opinion of the International Searching Authority, dated Oct. 11, 2018, from corresponding International Application No. PCT/US2018/044026.

Written Opinion of the International Searching Authority, dated Oct. 11, 2018, from corresponding International Application No. PCT/US2018/045240.

Written Opinion of the International Searching Authority, dated Oct. 12, 2017, from corresponding International Application No. PCT/US2017/036888.

Written Opinion of the International Searching Authority, dated Oct. 12, 2018, from corresponding International Application No. PCT/US2018/044046.

Written Opinion of the International Searching Authority, dated Oct. 16, 2018, from corresponding International Application No. PCT/US2018/045243.

Written Opinion of the International Searching Authority, dated Oct. 18, 2018, from corresponding International Application No. PCT/US2018/045249.

Written Opinion of the International Searching Authority, dated Oct. 20, 2017, from corresponding International Application No. PCT/US2017/036917.

Written Opinion of the International Searching Authority, dated Oct. 3, 2017, from corresponding International Application No. PCT/US2017/036912.

Written Opinion of the International Searching Authority, dated Sep. 1, 2017, from corresponding International Application No. PCT/US2017/036896.

Written Opinion of the International Searching Authority, dated Sep. 12, 2018, from corresponding International Application No. PCT/US2018/037504.

Written Opinion of the International Searching Authority, dated Sep. 15, 2021, from corresponding International Application No. PCT/US2021/033631.

Wu et al., "Data Mining with Big Data," IEEE, Jan. 2014, pp. 97-107, vol. 26, No. 1, (Year: 2014).

Www.truste.com (1), 200150207, Internet Archive Wayback Machine, www.archive.org,2_7_2015.

Xu, et al., "GatorShare: A File System Framework for High-Throughput Data Management," ACM, pp. 776-786 (Year: 2010).

Yang et al., "DAC-MACS: Effective Data Access Control for Multiauthority Cloud Storage Systems," IEEE, pp. 1790-1801 (Year: 2013).

Yang et al., "Mining Web Access Sequence with Improved Apriori Algorithm," IEEE, 2017, pp. 780-784 (Year: 2017).

Ye et al., "An Evolution-Based Cache Scheme for Scalable Mobile Data Access," ACM, pp. 1-7 (Year: 2007).

Yin et al., "Multibank Memory Optimization for Parallel Data Access in Multiple Data Arrays", ACM, pp. 1-8 (Year: 2016).

Yiu et al., "Outsourced Similarity Search on Metric Data Assets", IEEE, pp. 338-352 (Year: 2012).

Yu, "Using Data from Social Media Websites to Inspire the Design of Assistive Technology", ACM, pp. 1-2 (Year: 2016).

Yu, et al., "Performance and Fairness Issues in Big Data Transfers," ACM, pp. 9-11 (Year: 2014).

Yue et al., "An Automatic HTTP Cookie Management System," Computer Networks, Elsevier, Amsterdam, NL, vol. 54, No. 13, Sep. 15, 2010, pp. 2182-2198 (Year: 2010).

Zannone, et al., "Maintaining Privacy on Derived Objects," ACM, pp. 10-19 (Year: 2005).

Zeldovich, Nickolai, et al., Making Information Flow Explicit in HiStar, OSDI '06: 7th USENIX Symposium on Operating Systems Design and Implementation, USENIX Association, p. 263-278.

Zemel, et al. Learning Fair Representations, Proceedings of the 30th International Conference on Machine Learning, JMLR vol. 28, pp. 4-5 (Year: 2013).

(56) References Cited

OTHER PUBLICATIONS

Cheng, Raymond, et al., "Radiatus: A Shared-Nothing Server-Side Web Architecture," Proceedings of the Seventh ACM Symposium on Cloud Computing, Oct. 5, 2016, pp. 237-250 (Year: 2016).

Choi et al., "A Survey on Ontology Mapping," ACM, pp. 34-41 (Year: 2006).

Choi et al., "Retrieval Effectiveness of Table of Contents and Subject Headings," ACM, pp. 103-104 (Year: 2007).

Chowdhury et al., "A System Architecture for Subject-Centric Data Sharing", ACM, pp. 1-10 (Year: 2018).

Chowdhury et al., "Managing Data Transfers in Computer Clusters with Orchestra," ACM, pp. 98-109 (Year: 2011).

Civili et al., "Mastro Studio: Managing Ontology-Based Data Access Applications," ACM, pp. 1314-1317, Aug. 26-30, 2013 (Year: 2013).

Cruz et al., "Interactive User Feedback in Ontology Matching Using Signature Vectors," IEEE, pp. 1321-1324 (Year: 2012).

Cudre-Mauroux, "ESWC 2008 Ph.D. Symposium," The ESWC 2008 Ph.D. Symposium is sponsored by the Okkam project (http://fp7.okkam.org/), MIT, pp. 1-92 (Year: 2008).

Cui et al., "Domain Ontology Management Environment," IEEE, pp. 1-9 (Year: 2000).

Czeskis et al., "Lightweight Server Support for Browser-based CSRF Protection," Proceedings of the 22nd International Conference on World Wide Web, 2013, pp. 273-284 (Year: 2013).

Decision Regarding Institution of Post-Grant Review in Case PGR2018-00056 for U.S. Pat. No. 9,691,090 B1, Oct. 11, 2018.

Degeling et al., "We Value Your Privacy Now Take Some Cookies: Measuring the GDPRs Impact on Web Privacy," ARXIV.ORG, Cornell University Library, 201 Olin Library Cornell University, Ithaca, NY 14853, Aug. 15, 2018, pp. 1-15 (Year: 2019).

Dimou et al., "Machine-Interpretable Dataset and Service Descriptions for Heterogeneous Data Access and Retrieval", ACM, pp. 145-152 (Year: 2015).

Dokholyan et al., "Regulatory and Ethical Considerations for Linking Clinical and Administrative Databases," American Heart Journal 157.6 (2009), pp. 971-982 (Year: 2009).

Dowling, "Auditing Global HR Compliance," published May 23, 2014, retrieved from https://www.shrm.org/resourcesandtools/hr-topics/ global-hr/pages/auditing-global-hr-compliance.aspx Jul. 2, 2022 (Year: 2014).

Dunkel et al., "Data Organization and Access for Efficient Data Mining", IEEE, pp. 522-529 (Year: 1999).

Dwork, Cynthia, Differential Privacy, Microsoft Research, p. 1-12.

Edinger et al., "Age and Gender Estimation of Unfiltered Faces," IEEE, 2014, pp. 2170-2179 (Year: 2014).

Emerson, et al., "A Data Mining Driven Risk Profiling Method for Road Asset Management," ACM, pp. 1267-1275 (Year: 2013).

Enck, William, et al., TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.

Everypixel Team, "A New Age Recognition API Detects the Age of People on Photos," May 20, 2019, pp. 1-5 (Year: 2019).

Ex Parte Quayle Action, dated May 10, 2022, from corresponding U.S. Appl. No. 17/668,714.

Falahrastegar, Marjan, et al., Tracking Personal Identifiers Across the Web, Medical Image Computing and Computer-Assisted Intervention—Miccai 2015, 18th International Conference, Oct. 5, 2015, Munich, Germany.

Falbo et al., "An Ontological Approach to Domain Engineering," ACM, pp. 351-358 (Year: 2002).

Fan et al., "Intrusion Investigations with Data-hiding for Computer Log-file Forensics," IEEE, pp. 1-6 (Year: 2010).

Final Written Decision Regarding Post-Grant Review in Case PGR2018-00056 for U.S. Pat. No. 9,691,090 B1, Oct. 10, 2019.

Francis, Andre, Business Mathematics and Statistics, South-Western Cengage Learning, 2008, Sixth Edition.

Friedman et al., "Data Mining with Differential Privacy," ACM, Jul. 2010, pp. 493-502 (Year: 2010).

Friedman et al., "Informed Consent in the Mozilla Browser: Implementing Value-Sensitive Design," Proceedings of the 35th Annual Hawaii International Conference on System Sciences, 2002, IEEE, pp. 1-10 (Year: 2002).

Frikken, Keith B., et al., Yet Another Privacy Metric for Publishing Micro-data, Miami University, Oct. 27, 2008, p. 117-121.

Fung et al., "Discover Information and Knowledge from Websites using an Integrated Summarization and Visualization Framework", IEEE, pp. 232-235 (Year: 2010).

Gajare et al., "Improved Automatic Feature Selection Approach for Health Risk Prediction," Feb. 16, 2018, IEEE, pp. 816-819 (Year: 2018).

Geko et al., "An Ontology Capturing the Interdependence of the General Data Protection Regulation (GDPR) and Information Security," ACM, pp. 1-6, Nov. 15-16, 2018 (Year: 2018).

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

Gilda, et al., "Blockchain for Student Data Privacy and Consent," 2018 International Conference on Computer Communication and Informatics, Jan. 4-6, 2018, IEEE, pp. 1-5 (Year: 2018).

Golab, et al., "Issues in Data Stream Management," ACM, SIGMOD Record, vol. 32, No. 2, Jun. 2003, pp. 5-14 (Year: 2003).

Golfarelli et al., Beyond Data Warehousing: What's Next in Business Intelligence?, ACM, pp. 1-6 (Year: 2004).

Gonçalves et al., "The XML Log Standard for Digital Libraries: Analysis, Evolution, and Deployment," IEEE, pp. 312-314 (Year: 2003).

Goni, Kyriaki, Deletion Process_Only you can see my history: Investigating Digital Privacy, Digital Oblivion, and Control on Personal Data Through an Interactive Art Installation, ACM, 2016, retrieved online on Oct. 3, 2019, pp. 324-333. Retrieved from the Internet URL: http://delivery.acm.org/10.1145/2920000/291.

Gowadia et al., "RDF Metadata for XML Access Control," ACM, pp. 31-48 (Year: 2003).

Grolinger, et al., "Data Management in Cloud Environments: NoSQL and NewSQL Data Stores," Journal of Cloud Computing: Advances, Systems and Applications, pp. 1-24 (Year: 2013).

Guo, et al., "Opal: A Passe-partout for Web Forms," ACM, pp. 353-356 (Year: 2012).

Gustarini, et al., "Evaluation of Challenges in Human Subject Studies "In-the-Wild" Using Subjects' Personal Smartphones," ACM, pp. 1447-1456 (Year: 2013).

HacigümüS, Hakan, et al., Executing SQL over Encrypted Data in the Database-Service-Provider Model, ACM, Jun. 4, 2002, pp. 216-227.

Halevy, et al., "Schema Mediation in Peer Data Management Systems," IEEE, Proceedings of the 19th International Conference on Data Engineering, 2003, pp. 505-516 (Year: 2003).

Hall-Holt et al., "Stripe Boundary Codes for Real-Time Structured-Light Range Scanning of Moving Objects," IEEE, pp. 359-366 (Year: 2001).

Hammer, Eran et al., "The OAuth 2.0 Authorization Framework; draft-ietf-oauth-v2-26," Internet Engineering Task Force, IETF; StandardWorkingDraft, Internet Society (ISOC) 4, Rue Des Falaises CH-1205 Geneva, Switzerland, Jun. 8, 2012 (Jun. 8, 2012), pp. 1-71, XP015083227, [retrieved on Jun. 8, 2012] the whole document.

Han et al., "Demographic Estimation from Face Images: Human VS. Machine Performance," IEEE, 2015, pp. 1148-1161 (Year: 2015).

Hauch, et al., "Information Intelligence: Metadata for Information Discovery, Access, and Integration," ACM, pp. 793-798 (Year: 2005).

He et al., "A Crowdsourcing Framework for Detecting of Cross-Browser Issues in Web Application," ACM, pp. 1-4, Nov. 6, 2015 (Year: 2015).

Abdullah et al., "The Mapping Process of Unstructured Data to the Structured Data", ACM, pp. 151-155 (Year: 2013).

Abiteboul, et al., "A Rule-based Language for Web Data Management," ACM, pp. 293-304 (Year: 2011).

(56) References Cited

OTHER PUBLICATIONS

Acar, Gunes, et al., The Web Never Forgets, Computer and Communications Security, ACM, Nov. 3, 2014, pp. 674-689.

Aghasian, Erfan, et al., Scoring Users' Privacy Disclosure Across Multiple Online Social Networks, IEEE Access, Multidisciplinary Rapid Review Open Access Journal, Jul. 31, 2017, vol. 5, 2017.

Agosti et al., "Access and Exchange of Hierarchically Structured Resources on the Web with the NESTOR Framework", IEEE, pp. 659-662 (Year: 2009).

Agrawal et al., "Securing Electronic Health Records Without Impeding the Flow of Information," International Journal of Medical Informatics 76, 2007, p. 471 479 (Year: 2007).

Ahmad et al., "Task-Oriented Access Model for Secure Data Sharing Over Cloud," ACM, pp. 1-7 (Year: 2015).

Ahmad, et al., "Performance of Resource Management Algorithms for Processable Bulk Data Transfer Tasks in Grid Environments," ACM, pp. 177-188 (Year: 2008).

Alaa et al., "Personalized Risk Scoring for Critical Care Prognosis Using Mixtures of Gaussian Processes," Apr. 27, 2017, IEEE, vol. 65, issue 1, pp. 207-217 (Year: 2017).

Ali et al., "Age Estimation from Facial Images Using Biometric Ratios and Wrinkle Analysis," IEEE, 2015, pp. 1-5 (Year: 2015).

Alkalha et al., "Investigating the Effects of Human Resource Policies on Organizational Performance: An Empirical Study on Commercial Banks Operating in Jordan," European Journal of Economics, Finance and Administrative Science, pp. 1-22 (Year: 2012).

Aman et al., "Detecting Data Tampering Attacks in Synchrophasor Networks using Time Hopping," IEEE, pp. 1-6 (Year: 2016).

Amar et al., "Privacy-Aware Infrastructure for Managing Personal Data," ACM, pp. 571-572, Aug. 22-26, 2016 (Year: 2016).

Antunes et al., "Preserving Digital Data in Heterogeneous Environments", ACM, pp. 345-348, 2009 (Year: 2009).

Ardagna, et al., "A Privacy-Aware Access Control System," Journal of Computer Security, 16:4, pp. 369-397 (Year: 2008).

Avepoint, Automating Privacy Impact Assessments, AvePoint, Inc.

Avepoint, AvePoint Privacy Impact Assessment 1: User Guide, Cumulative Update 2, Revision E, Feb. 2015, AvePoint, Inc.

Avepoint, Installing and Configuring the APIA System, International Association of Privacy Professionals, AvePoint, Inc.

Ball, et al., "Aspects of the Computer-Based Patient Record," Computers in Healthcare, Springer-Verlag New York Inc., pp. 1-23 (Year: 1992).

Banerjee et al., "Link Before You Share: Managing Privacy Policies through Blockchain," IEEE, pp. 4438-4447 (Year: 2017).

Bang et al., "Building an Effective and Efficient Continuous Web Application Security Program," 2016 International Conference on Cyber Security Situational Awareness, Data Analytics and Assessment (CyberSA), London, 2016, pp. 1-4 (Year: 2016).

Bansal et al., "Integrating Big Data: A Semantic Extract-Transform-Load Framework," IEEE, pp. 42-50 (Year: 2015).

Bao et al., "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).

Barker, "Personalizing Access Control by Generalizing Access Control," ACM, pp. 149-158 (Year: 2010).

Barr, "Amazon Rekognition Update - Estimated Age Range for Faces," AWS News Blog, Feb. 10, 2017, pp. 1-5 (Year: 2017).

Bayardo et al., "Technological Solutions for Protecting Privacy," Computer 36.9 (2003), pp. 115-118, (Year: 2003).

Beelders et al., "The Influence of Syntax Highlighting on Scanning and Reading Behaviour for Source Code," SAICSIT Sep. 26-28, 2016, Johannesburg, South Africa, ACM, pp. 1-10 (Year: 2016).

Bellini, et al., "A Distributed Environment for Automatic Multimedia Content Production based on Grid," IEEE, pp. 1-9 (Year: 2005).

Berezovskiy et al., "A framework for dynamic data source identification and orchestration on the Web", ACM, pp. 1-8 (Year: 2010).

Bertino et al., "On Specifying Security Policies for Web Documents with an XML-based Language," ACM, pp. 57-65 (Year: 2001).

Bertino et al., "Towards Mechanisms for Detection and Prevention of Data Exfiltration by Insiders," Mar. 22, 2011, ACM, pp. 10-19 (Year: 2011).

Bhargav-Spantzel et al., Receipt Management—Transaction History based Trust Establishment, 2007, ACM, p. 82-91.

Bhuvaneswaran et al., "Redundant Parallel Data Transfer Schemes for the Grid Environment", ACM, pp. 18 (Year: 2006).

Bieker, et al., "Privacy-Preserving Authentication Solutions—Best Practices for Implementation and EU Regulatory Perspectives," Oct. 29, 2014, IEEE, pp. 1-10 (Year: 2014).

Bin, et al., "Research on Data Mining Models for the Internet of Things," IEEE, pp. 1-6 (Year: 2010).

Bindschaedler et al., "Privacy Through Fake Yet Semantically Real Traces," Arxiv.Org, Cornell University Library, 201 Olin Library Cornell University Ithaca, NY 14853, May 27, 2015 (Year: 2015).

Binns, et al., "Data Havens, or Privacy Sans Frontières? A Study of International Personal Data Transfers," ACM, pp. 273-274 (Year: 2002).

Bjorn Greif, "Cookie Pop-up Blocker: Cliqz Automatically Denies Consent Requests," Cliqz.com, pp. 1-9, Aug. 11, 2019 (Year: 2019).

Borgida, "Description Logics in Data Management," IEEE Transactions on Knowledge and Data Engineering, vol. 7, No. 5, Oct. 1995, pp. 671-682 (Year: 1995).

Brandt et al., "Efficient Metadata Management in Large Distributed Storage Systems," IEEE, pp. 1-9 (Year: 2003).

Bujlow et al., "Web Tracking: Mechanisms, Implications, and Defenses," Proceedings of the IEEE, Aug. 1, 2017, vol. 5, No. 8, pp. 1476-1510 (Year: 2017).

Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).

Carminati et al., "Enforcing Access Control Over Data Streams," ACM, pp. 21-30 (Year: 2007).

Carpineto et al., "Automatic Assessment of Website Compliance to the European Cookie Law with CoolCheck," Proceedings of the 2016 ACM on Workshop on Privacy in the Electronic Society, 2016, pp. 135-138 (Year: 2016).

Castro et al., "Creating Lightweight Ontologies for Dataset Description," IEEE, pp. 1-4 (Year: 2014).

Cerpzone, "How to Access Data on Data Archival Storage and Recovery System", https://www.saj.usace.army.nmil/Portals/44/docs/Environmental/Lake%200%20Watershed/15February2017/How20To920Access%20Model94 20Data%20on%20DASR.pdf?ver=2017-02-16-095535-633, Feb. 16, 2017.

Cha et al., "A Data-Driven Security Risk Assessment Scheme for Personal Data Protection," IEEE, pp. 50510-50517 (Year: 2018).

Cha, et al., "Process-Oriented Approach for Validating Asset Value for Evaluating Information Security Risk," IEEE, Aug. 31, 2009, pp. 379-385 (Year: 2009).

Chang et al., "A Ranking Approach for Human Age Estimation Based on Face Images," IEEE, 2010, pp. 3396-3399 (Year: 2010).

Chapados et al., "Scoring Models for Insurance Risk Sharing Pool Optimization," 2008, IEEE, pp. 97-105 (Year: 2008).

International Search Report, dated Nov. 3, 2021, from corresponding International Application No. PCT/US2021/040893.

International Search Report, dated Nov. 3, 2021, from corresponding International Application No. PCT/US2021/044910.

International Search Report, dated Oct. 11, 2018, from corresponding International Application No. PCT/US2018/043975.

International Search Report, dated Oct. 11, 2018, from corresponding International Application No. PCT/US2018/043976.

International Search Report, dated Oct. 11, 2018, from corresponding International Application No. PCT/US2018/043977.

International Search Report, dated Oct. 11, 2018, from corresponding International Application No. PCT/US2018/044026.

International Search Report, dated Oct. 11, 2018, from corresponding International Application No. PCT/US2018/045240.

International Search Report, dated Oct. 12, 2017, from corresponding International Application No. PCT/US2017/036888.

International Search Report, dated Oct. 12, 2018, from corresponding International Application No. PCT/US2018/044046.

(56) References Cited

OTHER PUBLICATIONS

International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Iordanou et al., "Tracing Cross Border Web Tracking," Oct. 31, 2018, pp. 329-342, ACM (Year: 2018).
Islam, et al., "Mixture Model Based Label Association Techniques for Web Accessibility," ACM, pp. 67-76 (Year: 2010).
Jayasinghe et al., "Matching Facial Images Using Age Related Morphing Changes," ISSRI, 2009, pp. 2901-2907 (Year: 2009).
Jensen, et al., "Temporal Data Management," IEEE Transactions on Knowledge and Data Engineering, vol. 11, No. 1, Jan./Feb. 1999, pp. 36-44 (Year: 1999).
Jiahao Chen et al. "Fairness Under Unawareness: Assessing Disparity when Protected Class is Unobserved," Arxiv.org, Cornell University Library, 201 Olin Library Cornell University, Ithaca, NY 14853, Nov. 27, 2018 (Nov. 27, 2018), Section 2, Figure 2. (Year 2018).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf (Year: 2013).
Jones et al., "AI and the Ethics of Automating Consent," IEEE, pp. 64-72, May 2018 (Year: 2018).
Joonbakhsh et al., "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al., "Scalable Multi-Access Flash Store for Big Data Analytics," ACM, pp. 55-64 (Year: 2014).
Kamiran, et al. "Classifying without Discriminating," 2009 2nd International Conference on Computer, Control and Communication, IEEE, Abstract (Year: 2009).
Khan et al., "Wrinkles Energy Based Age Estimation Using Discrete Cosine Transform," IEEE, 2015, pp. 1-4 (Year: 2015).
Kirkham, et al., "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Kristian et al., "Human Facial Age Classification Using Active Shape Module, Geometrical Feature, and Support Vendor Machine on Early Growth Stage," ISICO, 2015, pp. 1-8 (Year: 2015).

Krol, Kat, et al., Control versus Effort in Privacy Warnings for Webforms, ACM, Oct. 24, 2016, pp. 13-23.
Lamb et al., "Role-Based Access Control for Data Service Integration", ACM, pp. 3-11 (Year: 2006).
Lasierra et al., "Data Management in Home Scenarios Using an Autonomic Ontology-Based Approach," IEEE, pp. 94-99 (Year: 2012).
Leadbetter, et al., "Where Big Data Meets Linked Data: Applying Standard Data Models to Environmental Data Streams," IEEE, pp. 2929-2937 (Year: 2016).
Lebeau, Franck, et al., Model-Based Vulnerability Testing for Web Applications, 2013 IEEE Sixth International Conference on Software Testing, Verification and Validation Workshops, pp. 445-452, IEEE, 2013 (Year: 2013).
Lenzerini et al., "Ontology-based Data Management," ACM, pp. 5-6 (Year: 2011).
Lewis, James et al., "Microservices," Mar. 25, 2014 (Mar. 25, 2014), XP055907494, Retrieved from the Internet: https://martinfowler.com/articles/micr oservices.htm [retrieved on Mar. 31, 2022].
Li, Ninghui, et al., t-Closeness: Privacy Beyond k-Anonymity and I-Diversity, IEEE, 2014, p. 106-115.
Liu et al., "A Novel Approach for Detecting Browser-based Silent Miner," IEEE, pp. 490-497 (Year: 2018).
Liu et al., "Cross-Geography Scientific Data Transferring Trends and Behavior," ACM, pp. 267-278 (Year: 2018).
Liu et al., "Overview on Ontology Mapping and Approach," IEEE, pp. 592-595 (Year: 2011).
Liu, Kun, et al., A Framework for Computing the Privacy Scores of Users in Online Social Networks, ACM Transactions on Knowledge Discovery from Data, vol. 5, No. 1, Article 6, Dec. 2010, 30 pages.
Liu, Yandong, et al., "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al., "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Lu et al., "An HTTP Flooding Detection Method Based on Browser Behavior," IEEE, pp. 1151-1154 (Year: 2006).
Lu, "How Machine Learning Mitigates Racial Bias in the US Housing Market," Available as SSRN 3489519, pp. 1-73, Nov. 2019 (Year: 2019).
Luu, et al., "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Ma Ziang, et al., "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).
Mandal, et al., "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al., "Multimedia Information Interchange: Web Forms Meet Data Servers", IEEE, pp. 499-505 (Year: 1999).
Martin, et al., "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).
Matte et al., "Do Cookie Banners Respect my Choice ?: Measuring Legal Compliance of Banners from IAB Europe's Transparency and Consent Framework," 2020 IEEE Symposium on Security and Privacy (SP), 2020, pp. 791-809 (Year: 2020).
McGarth et al., "Digital Library Technology for Locating and Accessing Scientific Data", ACM, pp. 188-194 (Year: 1999).

(56) References Cited

OTHER PUBLICATIONS

Mesbah et al., "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).

Milic et al., "Comparative Analysis of Metadata Models on e-Government Open Data Platforms," IEEE, pp. 119-130 (Year: 2021).

Moiso et al., "Towards a User-Centric Personal Data Ecosystem The Role of the Bank of Individual's Data," 2012 16th International Conference on Intelligence in Next Generation Networks, Berlin, 2012, pp. 202-209 (Year: 2012).

Moscoso-Zea et al., "Datawarehouse Design for Educational Data Mining," IEEE, pp. 1-6 (Year: 2016).

Mudepalli et al., "An efficient data retrieval approach using blowfish encryption on cloud CipherText Retrieval in Cloud Computing" IEEE, pp. 267-271 (Year: 2017).

Mundada et al., "Half-Baked Cookies: Hardening Cookie-Based Authentication for the Modern Web," Proceedings of the 11th ACM on Asia Conference on Computer and Communications Security, 2016, pp. 675-685 (Year: 2016).

Nemec et al., "Assessment of Query Execution Performance Using Selected Business Intelligence Tools and Experimental Agile Oriented Data Modeling Approach," Sep. 16, 2015, IEEE, pp. 1327-1333. (Year: 2015).

Newman et al., "High Speed Scientific Data Transfers using Software Defined Networking," ACM, pp. 1-9 (Year: 2015).

Newman, "Email Archive Overviews using Subject Indexes", ACM, pp. 652-653, 2002 (Year: 2002).

Nishikawa, Taiji, English Translation of JP 2019154505, Aug. 27, 2019 (Year: 2019).

Niu, et al., "Achieving Data Truthfulness and Privacy Preservation in Data Markets", IEEE Transactions On Knowledge and Data Engineering, IEEE Service Centre, Los Alamitos, CA, US, vol. 31, No. 1, Jan. 1, 2019, pp. 105-119 (Year 2019).

Notice of Filing Date for Petition for Post-Grant Review of related U.S. Pat. No. 9,691,090 dated Apr. 12, 2018.

Nouwens et al., "Dark Patterns after the GDPR: Scraping Consent Pop-ups and Demonstrating their Influence," ACM, pp. 1-13, Apr. 25, 2020 (Year: 2020).

O'Keefe et al., "Privacy-Preserving Data Linkage Protocols," Proceedings of the 2004 ACM Workshop on Privacy in the Electronic Society, 2004, pp. 94-102 (Year: 2004).

Olenski, Steve, For Consumers, Data Is A Matter Of Trust, CMO Network, Apr. 18, 2016, https://www.forbes.com/sites/steveolenski/2016/04/18/for-consumers-data-is-a-matter-of-trust/#2e48496278b3.

Ozdikis et al., "Tool Support for Transformation from an OWL Ontology to an HLA Object Model," ACM, pp. 1-6 (Year: 2010).

Paes, "Student Research Abstract: Automatic Detection of Cross-Browser Incompatibilities using Machine Learning and Screenshot Similarity," ACM, pp. 697-698, Apr. 3, 2017 (Year: 2017).

Pearson, et al., "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).

Pechenizkiy et al., "Process Mining Online Assessment Data," Educational Data Mining, pp. 279-288 (Year: 2009).

Petition for Post-Grant Review of related U.S. Pat. No. 9,691,090 dated Mar. 27, 2018.

Petrie et al., "The Relationship between Accessibility and Usability of Websites", ACM, pp. 397-406 (Year: 2007).

Pfeifle, Sam, The Privacy Advisor, IAPP and AvePoint Launch New Free PIA Tool, International Association of Privacy Professionals, Mar. 5, 2014.

Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.

Ping et al., "Wide Area Placement of Data Replicas for Fast and Highly Available Data Access," ACM, pp. 1-8 (Year: 2011).

Popescu-Zeletin, "The Data Access and Transfer Support in a Local Heterogeneous Network (Hminet)", IEEE, pp. 147-152 (Year: 1979).

Porter, "De-Identified Data and Third Party Data Mining: The Risk of Re-Identification of Personal Information," Shidler JL Com. & Tech. 5, 2008, pp. 1-9 (Year: 2008).

Pretorius, et al., "Attributing Users Based on Web Browser History," 2017 IEEE Conference on Application, Information and Network Security (AINS), 2017, pp. 69-74 (Year: 2017).

Preuveneers et al., "Access Control with Delegated Authorization Policy Evaluation for Data-Driven Microservice Workflows," Future Internet 2017, MDPI, pp. 1-21 (Year: 2017).

Qing-Jiang et al., "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).

Qiu, et al., "Design and Application of Data Integration Platform Based on Web Services and XML," IEEE, pp. 253-256 (Year: 2016).

Qu et al., "Metadata Type System: Integrate Presentation, Data Models and Extraction to Enable Exploratory Browsing Interfaces," ACM, pp. 107-116 (Year: 2014).

Radu, et al., "Analyzing Risk Evaluation Frameworks and Risk Assessment Methods," IEEE, Dec. 12, 2020, pp. 1-6 (Year: 2020).

Rakers, "Managing Professional and Personal Sensitive Information," ACM, pp. 9-13, Oct. 24-27, 2010 (Year: 2010).

Reardon et al., User-Level Secure Deletion on Log-Structured File Systems, ACM, 2012, retrieved online on Ar. 22, 2021, pp. 1-11. Retrieved from the Internet: URL: http://citeseerx.ist.psu.edu/viewdoc/download; jsessionid=450713515DC7F19F8ED09AE961D4B60E (Year: 2012).

Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).

Roesner et al., "Detecting and Defending Against Third-Party Tracking on the Web," 9th USENIX Symposium on Networked Systems Design and Implementation, Apr. 11, 2013, pp. 1-14, ACM (Year: 2013).

Rozepz, "What is Google Privacy Checkup? Everything You Need to Know," Tom's Guide web post, Apr. 26, 2018, pp. 1-11 (Year: 2018).

Sachinopoulou et al., "Ontology-Based Approach for Managing Personal Health and Wellness Information," IEEE, pp. 1802-1805 (Year: 2007).

Salim et al., "Data Retrieval and Security using Lightweight Directory Access Protocol", IEEE, pp. 685-688 (Year: 2009).

Sanchez-Rola et al., "Can I Opt Out Yet ?: GDPR and the Global Illusion of Cookie Control," Proceedings of the 2019 ACM Asia Conference on Computer and Communications Security, 2019, pp. 340-351 (Year: 2019).

Santhisree, et al., "Web Usage Data Clustering Using Dbscan Algorithm and Set Similarities," IEEE, pp. 220-224 (Year: 2010).

Sanzo et al., "Analytical Modeling of Lock-Based Concurrency Control with Arbitrary Transaction Data Access Patterns," ACM, pp. 69-78 (Year: 2010).

Sarkar et al., "Towards Enforcement of the Eu Gdpr: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).

Schwartz, Edward J., et al., 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.

Sedinic et al., "Security Risk Management in Complex Organization," May 29, 2015, IEEE, pp. 1331-1337 (Year: 2015).

Shahriar et al., "A Model-Based Detection of Vulnerable and Malicious Browser Extensions," IEEE, pp. 198-207 (Year: 2013).

Shankar et al., "Doppleganger: Better Browser Privacy Without the Bother," Proceedings of the 13th ACM Conference on Computer

(56)                    References Cited

OTHER PUBLICATIONS and Communications Security; [ACM Conference on Computer and Communications Security], New York, NY: ACM US, Oct. 30, 2006, pp. 154-167 (Year: 2006).

Shulz et al., "Generative Data Models for Validation and Evaluation of Visualization Techniques," ACM, pp. 1-13 (Year: 2016).

Singh, et al., "A Metadata Catalog Service for Data Intensive Applications," ACM, pp. 1-17 (Year: 2003).

Sjosten et al., "Discovering Browser Extensions via Web Accessible Resources," ACM, pp. 329-336, Mar. 22, 2017 (Year: 2017).

Slezak, et al., "Brighthouse: An Analytic Data Warehouse for Ad-hoc Queries," ACM, pp. 1337-1345 (Year: 2008).

Soceanu, et al., "Managing the Privacy and Security of eHealth Data," May 29, 2015, IEEE, pp. 1-8 (Year: 2015).

Srinivasan et al., "Descriptive Data Analysis of File Transfer Data," ACM, pp. 1-8 (Year: 2014).

Srivastava, Agrima, et al., Measuring Privacy Leaks in Online Social Networks, International Conference on Advances in Computing, Communications and Informatics (ICACCI), 2013.

Stack Overflow, "Is there a way to force a user to scroll to the bottom of a div?," Stack Overflow, pp. 1-11, Nov. 2013. [Online]. Available: https://stackoverflow.com/questions/2745935/is-there-a-way-to-force-a-user-to-scroll-to-the-bottom-of-a-div (Year: 2013).

Stern, Joanna, "iPhone Privacy Is Broken. and Apps Are to Blame", The Wall Street Journal, wsj.com, May 31, 2019.

Strodl, et al., "Personal & SOHO Archiving," Vienna University of Technology, Vienna, Austria, JCDL '08, Jun. 16-20, 2008, Pittsburgh, Pennsylvania, USA, pp. 115-123 (Year: 2008).

Sukumar et al., "Review on Modern Data Preprocessing Techniques in Web Usage Mining (WUM)," IEEE, 2016, pp. 64-69 (Year: 2016).

Symantec, Symantex Data Loss Prevention—Discover, monitor, and protect confidential data; 2008; Symantec Corporation; ttp://www.mssuk.com/images/Symantec%2014552315_IRC_BR_DLP_03.09_sngl.pdf.

Tanasa et al., "Advanced Data Preprocessing for Intersites Web Usage Mining," IEEE, Mar. 2004, pp. 59-65 (Year: 2004).

Tanwar, et al., "Live Forensics Analysis: Violations of Business Security Policy," 2014 International Conference on Contemporary Computing and Informatics (IC31), 2014, pp. 971-976 (Year: 2014).

The Cookie Collective, Optanon Cookie Policy Generator, The Cookie Collective, Year 2016, http://web.archive.org/web/20160324062743/https:/optanon.com/.

Thomas et al., "MooM—A Prototype Framework for Management of Ontology Mappings," IEEE, pp. 548-555 (Year: 2011).

Thuraisingham, "Security Issues for the Semantic Web," Proceedings 27th Annual International Computer Software and Applications Conference, COMPSAC 2003, Dallas, TX, USA, 2003, pp. 633-638 (Year: 2003).

TRUSTe Announces General Availability of Assessment Manager for Enterprises to Streamline Data Privacy Management with Automation, PRNewswire, Mar. 4, 2015.

Tsai et al., "Determinants of Intangible Assets Value: The Data Mining Approach," Knowledge Based System, pp. 67-77 http://www.elsevier.com/locate/knosys (Year: 2012).

Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).

US2017/025611.

Van Eijk et al., "The Impact of User Location on Cookie Notices (Inside and Outside of the European Union," IEEE Security & Privacy Workshop on Technology and Consumer Protection (CONPRO '19), Jan. 1, 2019 (Year: 2019).

Van Kleek, et al., "Carpe Data: Supporting Serendipitous Data Integration in Personal Information Management", ACM, pp. 2339-2348 (Year: 2013).

Vukovic et al., "Managing Enterprise IT Systems Using Online Communities," Jul. 9, 2011, IEEE, pp. 552-559. (Year: 2011).

Wang et al., "Revealing Key Non-Financial Factors for Online Credit-Scoring in E-Financing," 2013, IEEE, pp. 1-6—(Year: 2013).

Wang et al., "Secure and Efficient Access to Outsourced Data," ACM, pp. 55-65 (Year: 2009).

Weaver et al., "Understanding Information Preview in Mobile Email Processing", ACM, pp. 303-312, 2011 (Year: 2011).

Wong et al., "Ontology Mapping for the Interoperability Problem in Network Management," IEEE, pp. 2058-2068 (Year: 2005).

Written Opinion of the International Searching Authority, dated Apr. 12, 2022, from corresponding International Application No. PCT/US2022/016735.

Written Opinion of the International Searching Authority, dated Aug. 15, 2017, from corresponding International Application No. PCT/US2017/036919.

Written Opinion of the International Searching Authority, dated Aug. 21, 2017, from corresponding International Application No. PCT/US2017/036914.

Written Opinion of the International Searching Authority, dated Aug. 29, 2017, from corresponding International Application No. PCT/US2017/036898.

Written Opinion of the International Searching Authority, dated Aug. 8, 2017, from corresponding International Application No. PCT/US2017/036889.

Written Opinion of the International Searching Authority, dated Aug. 8, 2017, from corresponding International Application No. PCT/US2017/036890.

Written Opinion of the International Searching Authority, dated Aug. 8, 2017, from corresponding International Application No. PCT/US2017/036893.

Written Opinion of the International Searching Authority, dated Aug. 8, 2017, from corresponding International Application No. PCT/US2017/036901.

Written Opinion of the International Searching Authority, dated Aug. 8, 2017, from corresponding International Application No. PCT/US2017/036913.

Written Opinion of the International Searching Authority, dated Aug. 8, 2017, from corresponding International Application No. PCT/US2017/036920.

Written Opinion of the International Searching Authority, dated Aug. 9, 2023, from corresponding International Application No. PCT/US2023/011446.

Written Opinion of the International Searching Authority, dated Dec. 14, 2018, from corresponding International Application No. PCT/US2018/045296.

Written Opinion of the International Searching Authority, dated Dec. 22, 2021, from corresponding International Application No. PCT/US2021/051217.

Written Opinion of the International Searching Authority, dated Dec. 27, 2022, from corresponding International Application No. PCT/US2022/044574.

Written Opinion of the International Searching Authority, dated Feb. 11, 2022, from corresponding International Application No. PCT/US2021/053518.

Heil et al., "Downsizing and Rightsizing," https://web.archive.org/web/20130523153311/https://www.referenceforbusiness.com/management/De-Ele/Downsizing-and-Rightsizing.html (Year 2013).

Hernandez, et al., "Data Exchange with Data-Metadata Translations," ACM, pp. 260-273 (Year: 2008).

Hinde, "A Model to Assess Organisational Information Privacy Maturity Against the Protection of Personal Information Act Dissertation University of Cape Town" 2014, pp. 1-121 (Year: 2014).

Hodge, et al., "Managing Virtual Data Marts with Metapointer Tables," pp. 1-7 (Year: 2002).

Horrall et al., "Evaluating Risk: IBM's Country Financial Risk and Treasury Risk Scorecards," Jul. 21, 2014, IBM, vol. 58, issue 4, pp. 2:1-2:9 (Year: 2014).

Hu, et al., "Attribute Considerations for Access Control Systems," NIST Special Publication 800-205, Jun. 2019, pp. 1-42 (Year: 2019).

Hu, et al., "Guide to Attribute Based Access Control (ABAC) Definition and Considerations (Draft)," NIST Special Publication 800-162, pp. 1-54 (Year: 2013).

(56) References Cited

OTHER PUBLICATIONS

Huang, et al., "A Study on Information Security Management with Personal Data Protection," IEEE, Dec. 9, 2011, pp. 624-630 (Year: 2011).

Huettner, "Digital Risk Management: Protecting Your Privacy, Improving Security, and Preparing for Emergencies," IEEE, pp. 136-138 (Year: 2006).

Huner et al., "Towards a Maturity Model for Corporate Data Quality Management", ACM, pp. 231-238, 2009 (Year: 2009).

Hunton & Williams LLP, The Role of Risk Management in Data Protection, Privacy Risk Framework and the Risk-based Approach to Privacy, Centre for Information Policy Leadership, Workshop II, Nov. 23, 2014.

Huo et al., "A Cloud Storage Architecture Model for Data-Intensive Applications," IEEE, pp. 1-4 (Year: 2011).

IAPP, Daily Dashboard, PIA Tool Stocked With New Templates for DPI, Infosec, International Association of Privacy Professionals, Apr. 22, 2014.

IAPP, ISP/IEC 27001 Information Security Management Template, Resource Center, International Association of Privacy Professionals.

Imran et al., "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).

International Search Report, dated Apr. 12, 2022, from corresponding International Application No. PCT/US2022/016735.

International Search Report, dated Aug. 15, 2017, from corresponding International Application No. PCT/US2017/036919.

International Search Report, dated Aug. 21, 2017, from corresponding International Application No. PCT/US2017/036914.

International Search Report, dated Aug. 29, 2017, from corresponding International Application No. PCT/US2017/036898.

International Search Report, dated Aug. 8, 2017, from corresponding International Application No. PCT/US2017/036889.

International Search Report, dated Aug. 8, 2017, from corresponding International Application No. PCT/US2017/036890.

International Search Report, dated Aug. 8, 2017, from corresponding International Application No. PCT/US2017/036893.

International Search Report, dated Aug. 8, 2017, from corresponding International Application No. PCT/US2017/036901.

International Search Report, dated Aug. 8, 2017, from corresponding International Application No. PCT/US2017/036913.

International Search Report, dated Aug. 8, 2017, from corresponding International Application No. PCT/US2017/036920.

International Search Report, dated Aug. 9, 2023, from corresponding International Application No. PCT/US2023/011446.

International Search Report, dated Dec. 14, 2018, from corresponding International Application No. PCT/US2018/045296.

International Search Report, dated Dec. 22, 2021, from corresponding International Application No. PCT/US2021/051217.

International Search Report, dated Dec. 27, 2022, from corresponding International Application No. PCT/US2022/044574.

International Search Report, dated Feb. 11, 2022, from corresponding International Application No. PCT/US2021/053518.

International Search Report, dated Feb. 14, 2022, from corresponding International Application No. PCT/US2021/058274.

International Search Report, dated Jan. 14, 2019, from corresponding International Application No. PCT/US2018/046949.

International Search Report, dated Jan. 27, 2023, from corresponding International Application No. PCT/US2022/045520.

International Search Report, dated Jan. 5, 2022, from corresponding International Application No. PCT/US2021/050497.

International Search Report, dated Jan. 7, 2019, from corresponding International Application No. PCT/US2018/055772.

International Search Report, dated Jun. 1, 2022, from corresponding International Application No. PCT/US2022/016930.

International Search Report, dated Jun. 21, 2017, from corresponding International Application No. PCT/US2017/025600.

International Search Report, dated Jun. 22, 2022, from corresponding International Application No. PCT/US2022/019358.

International Search Report, dated Jun. 24, 2022, from corresponding International Application No. PCT/US2022/019882.

International Search Report, dated Jun. 6, 2017, from corresponding International Application No. PCT/.

International Search Report, dated Jun. 6, 2017, from corresponding International Application No. PCT/US2017/025605.

International Search Report, dated Mar. 14, 2019, from corresponding International Application No. PCT/US2018/055736.

International Search Report, dated Mar. 18, 2022, from corresponding International Application No. PCT/US2022/013733.

International Search Report, dated Mar. 4, 2019, from corresponding International Application No. PCT/US2018/055773.

International Search Report, dated Mar. 4, 2019, from corresponding International Application No. PCT/US2018/055774.

International Search Report, dated May 12, 2022, from corresponding International Application No. PCT/US2022/015929.

International Search Report, dated May 17, 2022, from corresponding International Application No. PCT/US2022/015241.

International Search Report, dated May 19, 2022, from corresponding International Application No. PCT/US2022/015637.

International Search Report, dated Nov. 12, 2021, from corresponding International Application No. PCT/US2021/043481.

International Search Report, dated Nov. 19, 2018, from corresponding International Application No. PCT/US2018/046939.

Zhang et al., "Data Transfer Performance Issues for a Web Services Interface to Synchrotron Experiments", ACM, pp. 59-65 (Year: 2007).

Zhang et al., "Dynamic Topic Modeling for Monitoring Market Competition from Online Text and Image Data", ACM, pp. 1425-1434 (Year: 2015).

Zheng, et al., "Methodologies for Cross-Domain Data Fusion: An Overview," IEEE, pp. 16-34 (Year: 2015).

Zheng, et al., "Toward Assured Data Deletion in Cloud Storage," IEEE, vol. 34, No. 3, pp. 101-107 May/Jun. 2020 (Year: 2020).

Zhu, et al., "Dynamic Data Integration Using Web Services," IEEE, pp. 1-8 (Year: 2004).

* cited by examiner

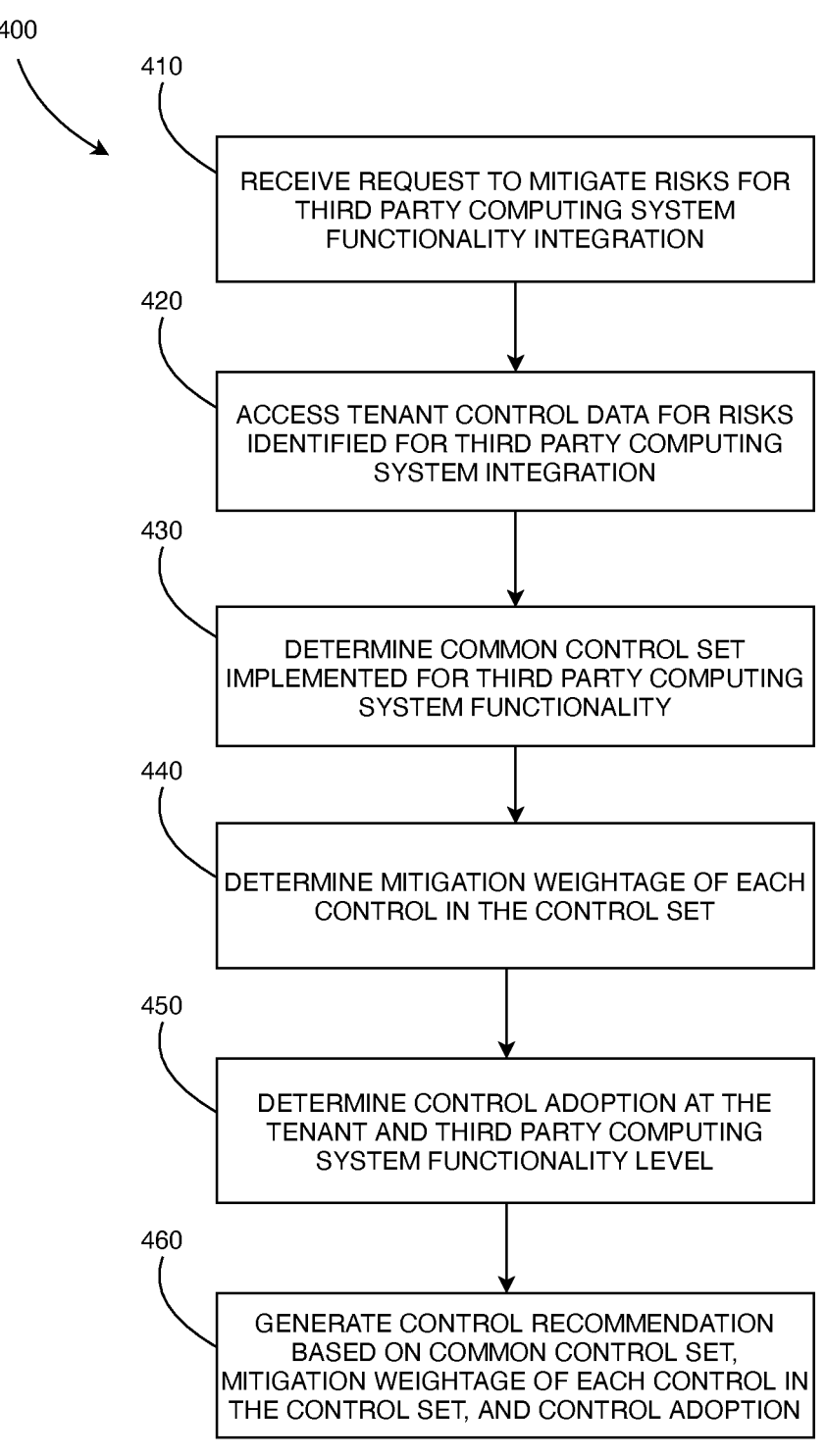

400

410

RECEIVE REQUEST TO MITIGATE RISKS FOR THIRD PARTY COMPUTING SYSTEM FUNCTIONALITY INTEGRATION

420

ACCESS TENANT CONTROL DATA FOR RISKS IDENTIFIED FOR THIRD PARTY COMPUTING SYSTEM INTEGRATION

430

DETERMINE COMMON CONTROL SET IMPLEMENTED FOR THIRD PARTY COMPUTING SYSTEM FUNCTIONALITY

440

DETERMINE MITIGATION WEIGHTAGE OF EACH CONTROL IN THE CONTROL SET

450

DETERMINE CONTROL ADOPTION AT THE TENANT AND THIRD PARTY COMPUTING SYSTEM FUNCTIONALITY LEVEL

460

GENERATE CONTROL RECOMMENDATION BASED ON COMMON CONTROL SET, MITIGATION WEIGHTAGE OF EACH CONTROL IN THE CONTROL SET, AND CONTROL ADOPTION

RECEIVE CONTROL RECOMMENDATION FOR THIRD PARTY COMPUTING SYSTEM FUNCTIONALITY

520

FACILITATE IMPLEMENTATION OF ONE OR MORE CONTROLS BASED ON CONTROL RECOMMENDATION

SYSTEMS AND METHODS FOR MITIGATING RISKS OF THIRD-PARTY COMPUTING SYSTEM FUNCTIONALITY INTEGRATION INTO A FIRST-PARTY COMPUTING SYSTEM

CROSS-REFERENCE TO RELATED APPLICATIONS

This application is a national phase entry of International Patent Application No. PCT/US2022/015929, filed Feb. 10, 2022, which claims the benefit of U.S. Provisional Patent Application Ser. No. 63/148,036, filed Feb. 10, 2021, the entire disclosures of which are hereby incorporated herein by reference in their entirety.

TECHNICAL FIELD

The present disclosure involves computer-implemented systems and processes for protection of system software or data from destruction, unauthorized modification, and/or unauthorized disclosures by, for example, facilitating implementation of controls when integrating third party computing system functionality into a first party computing system.

BACKGROUND

A significant challenge encountered by many organizations is mitigating risks associated with integrating computer-related functionality provided by third party computing systems (e.g., software, storage, processing capacity, etc.). Providing access to an entity computing system by a third party computing system (e.g., for the purposes of transferring data, storing data, implementing software functionality on the entity computing system that utilizes the data, etc.) can expose the data to a signification risk of experiencing some type of data incident involving the data, such as a data breach leading to the unauthorized access of the data, a data loss event, etc. Therefore, a need exists in the art for improved systems and methods for reducing risks associated with such data loss events, while still enabling an entity to integrate third party computing functionality into entity computing systems.

SUMMARY

A system comprising, in various aspects, comprises a non-transitory computer-readable medium storing instructions and a processing device communicatively coupled to the non-transitory computer-readable medium. In some aspects, the processing device is configured to execute the instructions and thereby perform operations comprising: (1) responsive to a request to integrate third party computing system functionality into a first party computing system, initiating a risk analysis for the third party computing system functionality; (2) accessing tenant computing system risk data for the third party computing system functionality, the tenant computing system risk data comprising risk data for each of a plurality of tenant computing systems that have previously integrated the third party computing system functionality; (3) identifying particular risks for integrating the third party computing system functionality based on the tenant computing system risk data; (4) determining a respective normalized risk score for each of the particular risks for each tenant computing system of the plurality of computing systems; (5) accessing tenant computing system control data for the particular risks identified for the third party computing system functionality; (6) determining, based on the tenant computing system control data, a common control set implemented by the plurality of tenant computing systems to mitigate risks for integrating the third party computing system functionality; (7) determining a mitigation weight of each control in the common control set based on the respective normalized risk score for each of the particular risks and the tenant computing system control data; (8) determining control adoption data for each of the plurality of tenants based on the tenant computing system control data; (9) processing the common control set, the mitigation weight, and the control adoption data using at least one of a rules-based model or a machine-learning model to generate a control recommendation, the control recommendation comprising at least one control from the common control set; and (10) facilitating implementation of at least one control identified by the control recommendation related to the integration of the third party computing system functionality into the first party computing system.

In some aspects, the operations further comprise modifying the tenant computing system control data to include new control data for the first party computing system, the new control data indicating the control recommendation as a control implemented by the first party computing system for at least one of the particular risks. In other aspects, the operations further comprise determining a residual risk rating for each of the particular risks based on the respective normalized risk score for each of the particular risks and the mitigation weight of each control in the common control set, and generating the control recommendation further comprises processing the residual risk rating using the at least one of the rules-based model or the machine-learning model to generate the control recommendation. In some aspects, the operations further comprise determining a control mitigation score for the functionality provided by the third party computing system based on a respective tenant control mitigation score for each tenant computing system of the plurality of computing systems. In other aspects, generating the control recommendation further comprises processing the control mitigation score for the functionality provided by the third party computing system using the at least one of the rules-based model or the machine-learning model to generate the control recommendation.

In some aspects, the tenant computing system control data defines: (1) for a first tenant computing system of the plurality of tenant computing systems, a first risk, a first risk score for the first risk, a first control for the first risk, and a first control score for the first control; and (2) for a second tenant computing system of the plurality of tenant computing systems, a second risk, a second risk score for the second risk, a second control for the second risk, and a second control score for the first control. In various aspects, determining the mitigation weight of each control in the common control set based on the respective normalized risk score for each of the particular risks and the tenant computing system control data comprises comparing the first risk score to the first control score and the second risk score to the second control score to determine a relative control mitigation score between the first control and the second control, and processing the common control set, the mitigation weight, and the control adoption data using at least one of a rules-based model or a machine-learning model to generate a control recommendation comprises using the rules-based model to select the control recommendation from the first control or the second control based on the relative control mitigation score.

In some aspects, processing the common control set, the mitigation weight, and the control adoption data comprises using the rules-based model to generate the control recommendation; and the rules-based model comprises a set of rules that selects the control recommendation from the common control set based on at least one of a relative mitigation weight of each control in the common control set or a relative adoption rate of each control in the common control set. In any aspect described herein, facilitating implementation of the at least one control identified by the control recommendation comprises at least one of facilitating modification of the third party computing system functionality or facilitating disabling of the third party computing system functionality.

A method according to various aspects comprises: (1) initiating, by computing hardware, a risk analysis for integrating functionality provided by a third party computing system into a first party computing system; (2) accessing, by the computing hardware, tenant computing system risk data for the functionality provided by the third party computing system, the tenant computing system risk data comprising risk data for each of a plurality of tenant computing systems that have previously integrated the functionality provided by the third party computing system; (3) identifying, by the computing hardware, particular risks for integrating the functionality provided by the third party computing system based on the tenant computing system risk data; (4) determining, by the computing hardware, a respective normalized risk score for each of the particular risks for each tenant computing system of the plurality of computing systems; (5) accessing, by the computing hardware, tenant computing system control data for the particular risks identified for the functionality provided by the third party computing system; (6) determining, by the computing hardware based on the tenant computing system control data, a common control set implemented by the plurality of tenant computing systems to mitigate risks for integrating the functionality provided by the third party computing system; (7) determining, by the computing hardware, a mitigation weight of each control in the common control set based on the respective normalized risk score for each of the particular risks and the tenant computing system control data; (8) causing, by the computing hardware, at least one of a rules-based model or a machine-learning model to process the common control set and the mitigation weight to generate a control recommendation, the control recommendation comprising at least one control from the common control set; and (9) causing, by the computing hardware, implementation of at least one control identified by the control recommendation related to the integration of the functionality provided by the third party computing system into the first party computing system.

In some aspects, the method further comprises determining, by the computing hardware, a control mitigation score for the functionality provided by the third party computing system based on a respective tenant control mitigation score for each tenant computing system of the plurality of computing systems. In other aspects, generating the control recommendation further comprises processing the control mitigation score for the functionality provided by the third party computing system using the at least one of the rules-based model or the machine-learning model to generate the control recommendation. In particular aspects, the method further comprises modifying the tenant computing system control data to include new control data for the first party computing system, the new control data indicating the control recommendation as a control implemented by the first party computing system for at least one of the particular risks.

In some aspects, the method further comprises determining, by the computing hardware, a residual risk rating for each of the particular risks based on the respective normalized risk score for each of the particular risks and mitigation weight of each control in the common control set; and generating the control recommendation further comprises processing the residual risk rating using the at least one of the rules-based model or the machine-learning model to generate the control recommendation. In some aspects, the rules-based model comprises a set of rules that selects the control recommendation from the common control set based on a relative mitigation weight of each control in the common control set. In any aspect described herein, causing the implementation of at least one control identified by the control recommendation can comprise at least one of causing modification of the functionality provided by third party computing system, causing disabling of the functionality provided by third party computing system, or generating a user interface that includes the at least one control and providing the user interface for display on a user device. In some aspects, the method comprises modifying, by the computing hardware, the tenant computing system control data to include new control data for the first party computing system, the new control data indicating the control recommendation as a control implemented by the first party computing system for at least one of the particular risks.

A system comprising, in various aspects, comprises a non-transitory computer-readable medium storing instructions and a processing device communicatively coupled to the non-transitory computer-readable medium. In some aspects, the processing device is configured to execute the instructions and thereby perform operations comprising: (1) initiating a risk analysis for integrating functionality provided by a third party computing system into a first party computing system; (2) accessing tenant computing system risk data for the functionality provided by a third party computing system, the tenant computing system risk data comprising risk data for a first tenant computing system and a second tenant computing that have previously integrated the functionality provided by a third party computing system; (3) identifying, based on the tenant computing system risk data, a first set of risks indicated by the first tenant computing system and a second set of risks indicated by the second tenant computing system; (4) determining a first risk score for the first set of risks score and a second risk score for the second set of risks; (5) accessing tenant computing system control data for the first set of risks and the second set of risks, the tenant computing system control data comprising a first set of controls for the first set of risks and a second set of controls for the second set of risks; (6) determining, based on the first set of risks and the second set of risks, a common control set implemented by the first tenant computing system and the second tenant computing system to mitigate the first set of risks and the second set of risks; (7) determining a mitigation weight of each control in the common control set based on the first risk score, the second risk score and the tenant computing system control data; (8) processing the common control set and the mitigation weight of each control using a rules-based model to generate a control recommendation, the control recommendation comprising at least one control from the common control set; and (9) facilitating implementation of at least one control identified by the control recommendation related to the integration of the functionality provided by the third party computing system into the first party computing system.

In some aspects, the first set of controls and the second set of controls comprise a first common control. In such aspects, determining the mitigation weight of each control in the common control set comprises determining a first mitigation score for mitigation of the first set of risks by the first common control and a second mitigation score for mitigation of the second set of risks by the first common control. In still further aspects, processing the common control set and the mitigation weight of each control using a rules-based model to generate the control recommendation comprises applying a set of rules defining a rule to select the first common control as the control recommendation for the first set of risks or the second set of risks based on the first mitigation score and the second mitigation score. In various aspects, the rules-based model comprises a set of rules that selects the control recommendation from the common control set based on a relative mitigation weight of each control in the common control set.

According to any aspect described herein, the operations further comprise generating a graphical user interface by configuring a display element for displaying the control recommendation and at least one of the first set of risks and the second set of risks. In some aspects, facilitating implementation of the at least one control identified by the control recommendation related to the integration of the functionality provided by the third party computing system into the first party computing system comprises providing the graphical user interface for display on a user device. In various aspects, the operations further comprise modifying the tenant computing system control data to include new control data for the first party computing system, the new control data indicating the control recommendation as a control implemented by the first party computing system for at least one of the first set of risks or the second set of risks. In still other aspects, facilitating implementation of the at least one control identified by the control recommendation comprises at least one of facilitating modification of the functionality provided by the third party computing system or facilitating disabling of the functionality provided by the third party computing system.

BRIEF DESCRIPTION OF THE DRAWINGS

In the course of this description, reference will be made to the accompanying drawings, which are not necessarily drawn to scale, and wherein:

FIG. 4 depicts an example of a process for generating control recommendations for mitigating the data-related risks of integrating third party computing system functionality into a tenant computing system of in accordance with various aspects of the present disclosure;

DETAILED DESCRIPTION

Figure 1:
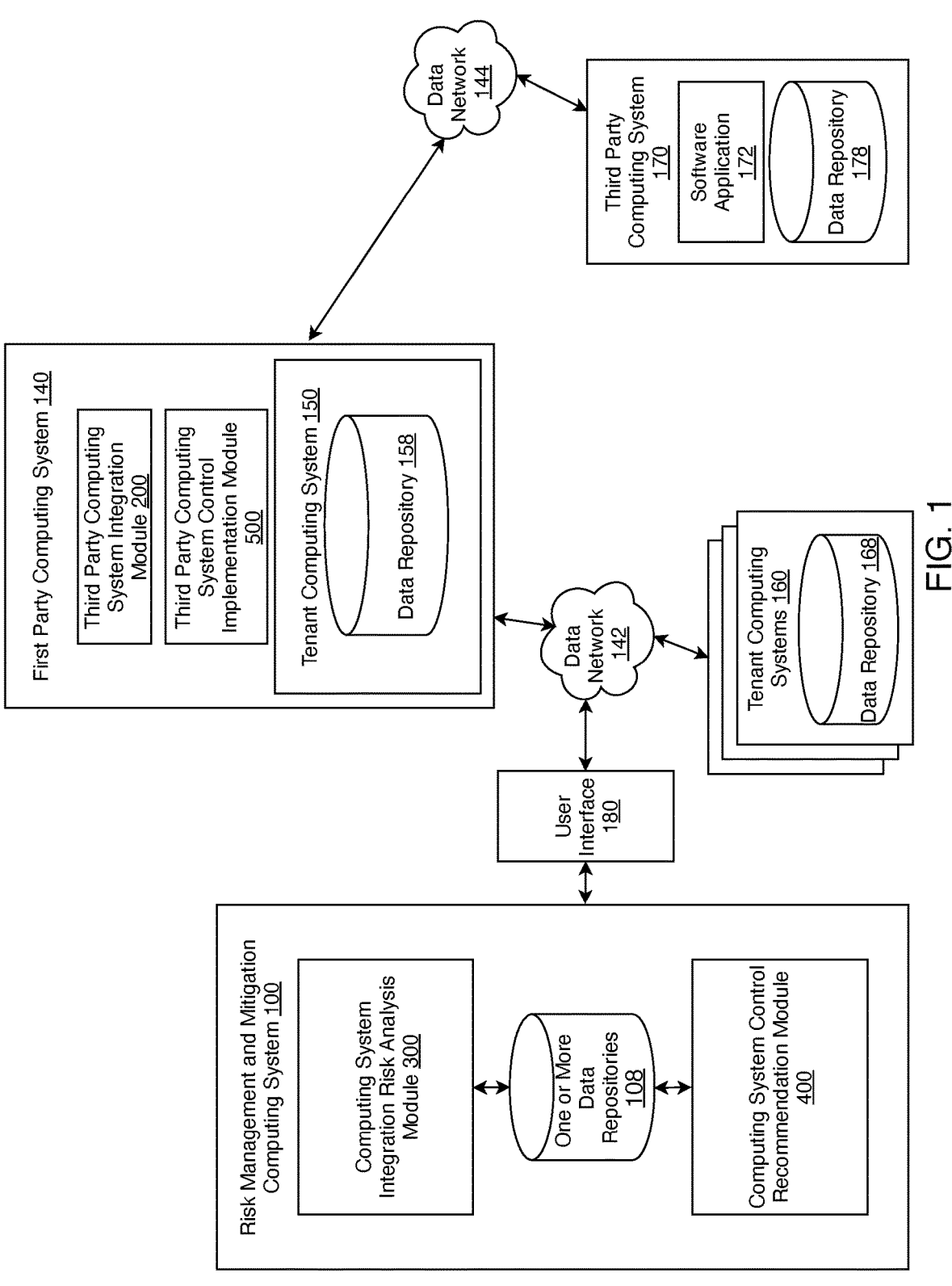
FIG. 1 depicts an example of a computing environment that can be used for analyzing data-related risks associated with integrating functionality provided by a third party computing system into a tenant computing system and facilitating implementation of controls to mitigate the identified risks accordance with various aspects of the present disclosure.

Overview and Technical Contributions of Various Aspects

As noted above, a significant challenge encountered by many organizations is the risk associated with integrating computer-related functionality provided by third party computing systems (e.g., software, storage, processing capacity, etc.) into a first party computing system (e.g., a tenant computing system). In particular, integrating third party computing system functionality into a first party computing system may include, for example, transferring data between the first party and third party computing systems, providing access to data stored on the first party computing system to the third party computing system, etc. As such, integrating third party computing system functionality into a first party computing system may introduce risks related to transferring data between the computing systems, providing access to the external, third party computing system, etc. For example, transferring data between computing systems (e.g., from a first party computing system to a third party computing system in order to provide computing functionality available at the third party computing system to the data) can expose the data to a significant risk of experiencing some type of data incident involving the data, such as a data breach leading to the unauthorized access of the data, a data loss event, etc. As such, it may be technically difficult to integrate third party computing system functionality into a first party computing system without increasing the risk of such exposure.

Accordingly, various aspects of the present disclosure overcome many of the technical challenges mentioned above associated with integrating third party computing system functionality into a first party computing system by providing a risk management and mitigation computing system configured to analyze a risk of integrating the functionality provided by the third party computing system and facilitating implementation of one or more data-related controls that include performing computer-specific operations to mitigate and/or eliminate the identified risks. For example, the risk management and mitigation computing system can access risk data in tenant computing systems to determine a risk score related to the integration of the third party computing system functionality based on risks determined during prior integrations of the third party computing system functionality by other tenant computing systems. The risk management and mitigation computing system can further generate a recommended control (e.g., or controls) to implement at the first party computing system and/or the third party computing system when integrating the third party computing system functionality. The risk management and mitigation computing system can use a rules-based model, a machine-learning model, or some combination thereof to determine the risk and generate the recommended control. Certain aspects described herein provide improvements in generating a recommended control by applying various rules of a particular type, such as algorithms related to selecting among a set of controls based on effectiveness in mitigating specific identified risks, to control the manner in which computing devices process certain data (e.g., mitigation weight of various controls, adoption frequency of particular controls) to generate control recommendations.

Various aspects of the disclosure provided herein address technical disadvantages encountered in designing or implementing various software applications and other third party computing functionality to a first party computing system. Specifically, various aspects of the disclosure provide a computing system control recommendation engine that can generate a control action for mitigating the risk involved in the first party computing system's use of the third party computing system functionality. The first party computing system can then facilitate implementation of the control action in order to mitigate the risk. Further, the first party computing system can perform operations so that the risk is addressed accordingly, such as by implementing one or more controls causing the functionality provided by the third party computing system to be modified or disabled. As a result, various aspects of the disclosure can increase the security, reliability, capacity, and efficiency in using third party computing system functionality in a first party computing system. In doing so, various aspects of the present disclosure make major technical contributions to improving the use of such functionality. This in turn translates to more computationally reliable, secure, and/or efficient systems.

In the course of this description, reference is made to integrating third party computing system functionality into a first party computing system (e.g., or other computing system). Integrating third party computing system functionality can include a third party computing system providing any computing functionality available on the third party computing system to the first party computing system. For example, in various aspects, integrating third party computing system functionality into a first party computing system can include initiating network communications between the third party computing system and the first party computing system; transferring data between the first party computing system and the third party computing system; providing access, to the first party computing system, to data storage available on the third party computing system; providing, by the third party computing system, one or more software applications for installation on the first party computing system; providing access, by the third party computing system, to one or more cloud-based software applications to the first party computing system; and the like.

Example Computing Environment

FIG. 1 depicts an example of a computing environment that can be used for analyzing data-related risks associated with integrating functionality provided by a third party computing system 170 into a first party computing system 140 (e.g., tenant computing system 150) and facilitating implementation of controls and other modifications to mitigate the identified risks in accordance with various aspects of the present disclosure. In various aspects, the controls may include any suitable control, such as those defined by the National Institute of Standards and Technology (NIST), International Organization for Standardization (ISO), etc. In various aspects, the controls may relate to, for example, information security, data access control, operations security, communications security (e.g., network communication security), etc.

FIG. 1 depicts examples of hardware components of a risk management and mitigation computing system 100 according to some aspects. The risk management and mitigation computing system 100 is a specialized computing system that can be used for performing risk analysis related to the integration of functionality provided by a third party computing system 170 to a first party computing system 140. In some aspects, a first party computing system 140 may include a computing system that is operated by a particular entity (e.g., an organization). For example, the first party computing system may include a collection of computing hardware and software over which an entity has control. A third party computing system 170 may include a computing system that is operated by an entity other than the particular entity. For example, the third party computing system 170 may include computing hardware and software that the particular entity has no control over or access to, but which provides some functionality that the particular entity may desire to utilize (e.g., in conjunction with the first party computing system 140). In various aspects, the first party entity may provide compensation to the third party entity in exchange for utilizing the third party computing system functionality provided by the third party computing system 170.

In various aspects, the risk management and mitigation computing system 100 includes a specialized computing system that may be used for generating recommendations for implementing controls for the purpose of mitigating the risks identified with integrating the functionality provided by the third party computing system 170 to the first party computing system 140. In some aspects, the risk management and mitigation computing system 100 utilizes risk and control data received from tenant computing systems 160 from prior integrations of the functionality provided by the third party computing system 140 into other first party systems (e.g., other first party systems associated with the tenant computing systems 160).

The risk management and mitigation computing system 100 can communicate with various computing systems, such as tenant computing systems 160 (e.g., over a data network 142, such as the internet). In various aspects, the risk management and mitigation computing system 100 can receive tenant computing system control data and tenant computing system risk data (e.g., over the data network 142) related to integration, by the respective tenant computing systems 160, of the functionality provided by the third party computing system 170. The tenant computing system control data and tenant computing system risk data may define, for example, data related to risk analysis and control implementation by the tenant computing systems when integrating the third party computing system functionality. The risk management and mitigation computing system 100 may store the tenant computing system control data and tenant computing system risk data in one or more data repositories 108 on the risk management and mitigation computing system 100. The risk management and mitigation computing system 100 may include computing hardware performing a number of different processes in determining risk scores for each of a plurality of identified risks associated with integrating the third party computing system functionality into the first party computing system 140 and generating control recommendations for mitigating identified risks. Specifically, according to various aspects, the risk management and mitigation computing system 100 executes: (1) a computing system integration risk analysis module 300 to determine risk scores for each of a plurality of identified risks associated with integrating the third party computing system functionality into the first party computing system 140.; and/or (2) a computing system control recommendation module 400 to generate a control recommendation to mitigate risks related to integrating the third party computing system functionality into the first party computing system 140.

The risk management and mitigation computing system 100 can also communicate with a first party computing system 140 (e.g., over a data network 142, such as the internet). The first party computing system may include a computing system that is initiating, in the process of integrating, or has completed an integration of functionality provided by the third party computing system. In various aspects, the first party computing system includes a tenant computing system 150. In various aspects, the risk management and mitigation computing system 100 may receive one or more requests from the first party computing system 140 (e.g., via a user interface 180) to analyze a risk for integrating functionality provided by the third party computing system 170 to the first party computing system 140 or to mitigate one or more risks (or provide risk mitigation data) to the first party computing system 140 for use in mitigating the identified risks related to integrating the third party computing system functionality into the first party computing system 140.

According to various aspects, the first party computing system 140 may include computing hardware performing a number of different processes in initiating and implementing integration of third party computing system functionality into the first party computing system 140. Specifically, according to particular aspects, the first party computing system 140 executes: (1) a third party computing system integration module 200 to initiate a third party computing system functionality risk analysis in response to a request to integrate functionality provided by the third party computing system 170 into the first party computing system 140; and/or (2) a third party computing system control implementation module 500 to facilitate implementation of one or more controls based on a control recommendation for integrating the third party computing system functionality into the first party computing system 140.

The first party computing system 140 (e.g., or other suitable system) may execute the third party computing system integration module 200 to perform operations including initiating integration of functionality provided by the third party computing system 170 on the first party computing system 140 by: (1) receiving a request to integrate the third party computing system functionality at the first party computing system 140; (2) initiating a risk analysis for the third party computing system functionality; (3) receiving risk analysis and recommended control data; and/or (4) initiating the integration of the third party computing system functionality into the first party computing system 140 (e.g., based on the risk analysis and recommended control data).

The first party computing system 140 (e.g., or other suitable system) may execute the third party computing system control implementation module 500 to facilitate implementation of one or more controls at the first party computing system 140 and/or the third party computing system 170. The first party computing system 140 may, for example, receive control recommendation data determined by the risk management and mitigation computing system 100, and facilitate implementation of at least one control based on the control recommendation data (e.g., facilitate implementation of at least one control at the first party computing system 140, at the third party computing system 170, etc.).

The first party computing system can include a tenant computing system 150, which may include one or more data repositories 158. In various aspects the tenant computing system 150 and the tenant computing systems 160 are part of a multi-tenant system in which a single instance of software and its supporting architecture (e.g., the risk management and mitigation computing system 100 and associated modules) serve multiple tenant systems. In such aspects, each of the tenant computing system 150 and the tenant computing systems 160 have respective data repositories 158, 168. In particular aspect, a multi-tenant configuration may provide additional technical advantages to various aspects of the present disclosure. In particular, in some aspects, the risk management and mitigation computing system may have access to each of the data repositories 168 for the respective tenant computing systems 168. In this way, although each tenant computing system 160, 150 maintains data in a secure data repository 168, 158 (e.g., or a secure portion of the one or more data repositories 108) the risk management and mitigation computing system 100 may access the tenant computing system control data and tenant computing system risk data for use in risk analysis sand control recommendation processes. In various aspects, the risk management and mitigation computing system 100 may anonymize the tenant computing system control data and tenant computing system risk data such that the data is available for risk analysis and control recommendation processes without revealing which particular one of the tenant computing systems 160 assigned a particular risk level or implemented a particular control. In various aspects, this configuration may provide additional technical advantages by providing improved design and implementation various software applications for determining risks and generating control recommendations, by providing access to data that may otherwise be unavailable to the software.

As shown in FIG. 1, the computing environment further includes a third party computing system, which can communicate with the first party computing system 140 over a data network 144. The third party computing system 170 can include one or more software applications 172 and a data repository 178. In various aspects, the third party computing system may have available computing functionality (e.g., such as data storage on the data repository, software functionality provided by the software application(s) 172, processing capability, etc.). In various aspects, the third party computing system may communicate (e.g., transmit data to, receive data from, etc.) the first party computing system 140. In various aspects, the third party computing system 170 may provide functionality to the first party computing system 140 (e.g., via the data network 144) following the implementation of one or more controls described herein.

The number of devices depicted in FIG. 1 are provided for illustrative purposes. In some aspects, different number of devices may be used. In various aspects, for example, while certain devices or systems are shown as single devices in FIG. 1, multiple devices may instead be used to implement these devices or systems.

In some aspects, the risk management and mitigation computing system 100 can include one or more third-party devices such as, for example, one or more servers operating in a distributed manner. The risk management and mitigation computing system 100 can include any computing device or group of computing devices, and/or one or more server devices Although the data repositories 108, 158, 168, 178 are shown as separate components, these components 120 may include, in other aspects, a single server and/or repository, servers and/or repositories, one or more cloud-based servers and/or repositories, or any other suitable configuration.

Third Party Computing System Integration Module

Figure 2:
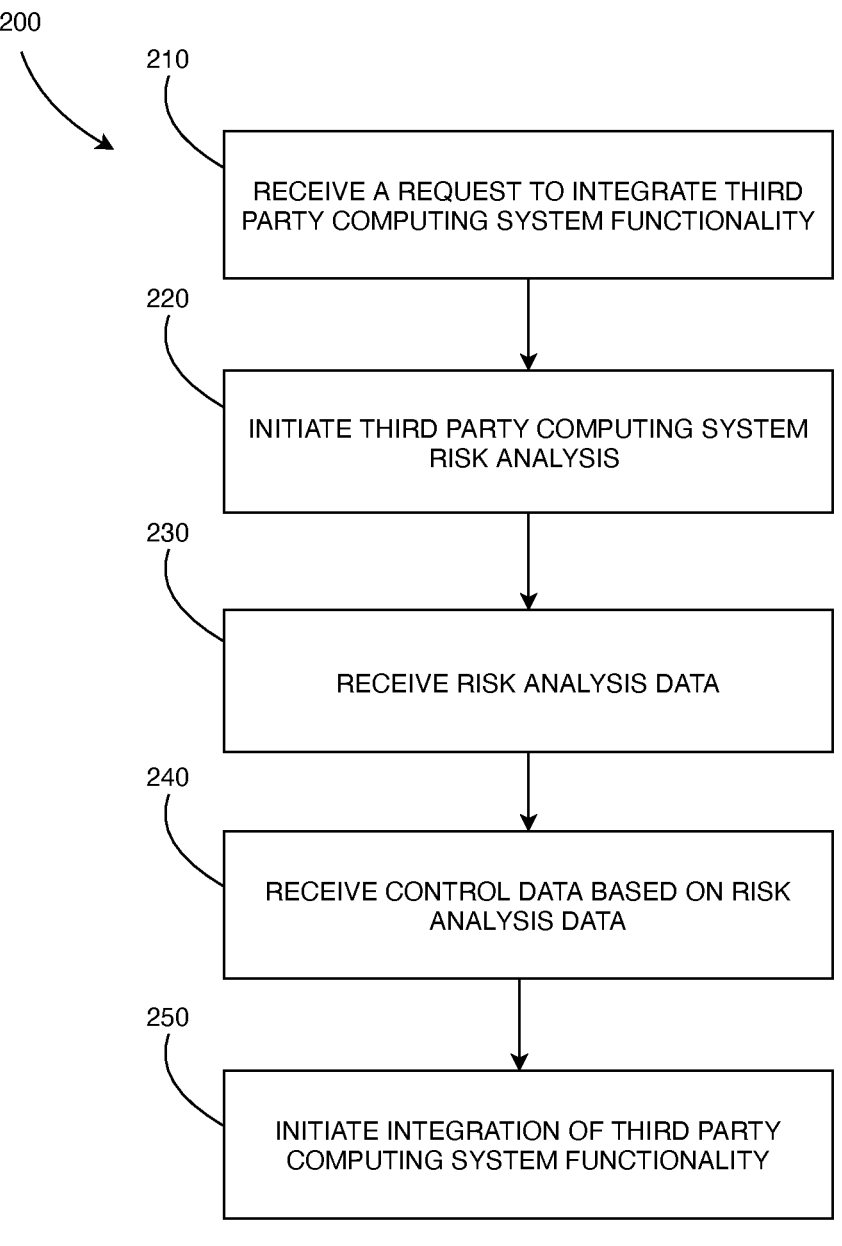
FIG. 2 depicts an example of a process for initiating a process for integrating third party computing system functionality into a tenant computing system in accordance with various aspects of the present disclosure.

FIG. 2 depicts an example of process performed by a third party computing system integration module 200. This process include operations that the first party computing system 140 may execute to initiate a third party computing system functionality risk analysis in response to a request to integrate functionality provided by the third party computing system 170 into the first party computing system 140. For instance, the flow diagram shown in FIG. 2 may correspond to operations carried out, for example, by computing hardware found in the first party computing system 140 as the computing hardware executes the third party computing system integration module 200.

In various aspects, the first party computing system 140 (e.g., when executing steps related to the third party computing system integration module 200) initiates the third party computing system functionality risk analysis and receives risk analysis and control data for use in initiating the integration of the third party computing system functionality into the first party computing system 140.

At operation 210, the third party computing system integration module 200 receives a request to integrate third party computing system functionality into the first party computing system 140. In various aspects, the third party computing system functionality may include any computing functionality provided by the third party computing system 170. In some aspects, the third party computing functionality may include, for example, one or more software applications 172 that may execute on the third party computing system 170 or on the first party computing system once the third party computing system provides the one or more software applications 172 to the first party computing systems 140, access to one or more data repositories 178 on the third party computing system 170 by the first party computing system 140 (e.g., such as for data storage, backup, etc.), and the like.

In some aspects, the first party computing system 140 may receive the request to integrate the third party computing system functionality via a user interface accessible via a user device in the first party computing system 140. As discussed herein, integrating functionality from a third party computing system 170 into a first party computing system 140 may introduce risks related to transferring data between the computing systems, providing access, by the third party computing system 170 to the first party computing system 140, etc. For example, transferring data between computing systems (e.g., from a first party computing system 140 to a third party computing system 170 in order to provide computing functionality available at the third party computing system 170 to the first party computing system 140) can expose the data to a signification risk of experiencing some type of data incident involving the data, such as a data breach leading to the unauthorized access of the data, a data loss event, etc.

In one example the request to integrate the third party computing system functionality may include a request to utilize, at the first party computing system 140 software or computing hardware provided by a third-party vendor. This may include, for example, cloud based computer storage, credit card processing software, etc.

As such, at operation 220, the third party computing system integration module 200 initiates a third party computing system risk analysis related to the integration of the third party computing system functionality into the first party computing system 140. For example, the first party computing system 140 may transmit one or more requests or instructions to the risk management and mitigation computing system 100 to cause the risk management and mitigation computing system 100 to perform processing operations and/or network communications related to determining one or more risks related to the integration of the third party computing system functionality into the first party computing system 140. For example, the first party computing system 140 may cause the risk management and mitigation computing system 100 to perform one or more operations related to the computing system integration risk analysis module 300 described more fully below.

In other aspects, initiating the third party computing system risk analysis related to the integration of the third party computing system functionality into the first party computing system 140 may include, for example, generating and/or transmitting one or more risk assessments to the third party computing system 170 for completion, generating/and or providing one or more risk assessments to the first party computing system 140 for completion by a user of the first party computing system, etc.

At operation 230, the third party computing system integration module 200 receives risk analysis data 230. In particular aspects, the first party computing system receives the risk analysis data from the risk management and mitigation computing system 100. In some aspects, the risk analysis data includes data determined during execution of the computing system integration risk analysis module 300 discussed below with respect to FIG. 3. In particular aspects, the first party computing system 140 stored the risk analysis data (e.g., in the data repository 158 of its tenant computing system 150). In some aspects, the first party computing system 140 may provide the risk analysis data from the tenant computing system 150 to the risk analysis and control identification computing system 100 for use in one or more additional risk analyses related to integration of functionality provided by the third party computing system 170.

In some aspects the first party computing system 140 may generate one or more display elements for inclusion in a graphical user interface. The first party computing system 140 may configure the one or more display elements to display at least some of the risk analysis data (e.g., a determined overall risk of integrating the third party computing system functionality into the first party computing system 140, a risk rating for particular risks identified with integrating the third party computing system functionality into the first party computing system 140, etc.). The first party computing system 140 may then provide the GUI for display on a user device.

Continuing to operation 240, the third party computing system integration module 200 receives control data based on the risk analysis data. For example, in some aspects, the first party computing system 140 receives the control data from the risk management and mitigation computing system 100. In some aspects, the control data includes a control recommendation, which the risk management and mitigation computing system 100 may have generated using the computing system control recommendation module 400 discussed more fully below with respect to FIG. 4. For example, as discussed more fully below, the risk analysis data may include a set of identified risks and an associated risk score for each of the tenant computing systems. The third party computing system integration module 200 may receive control data based on the risk analysis data by accessing control data for each risk in the set of identified risks. In this way, the third party computing system integration module 200 may receive control data for implemented controls that is limited to controls for the actual risks identified for the third party computing system functionality integration. In one aspect, the first party computing system 140 stores the control data (e.g., in the data repository 158 of its tenant computing system 150). In some aspects, the first party computing system 140 may provide the control data from the tenant computing system 150 to the risk analysis and control identification computing system 100 for use in one or more future risk mitigation analyses related to the integration of functionality provided by the third party computing system 170.

In some aspects, the first party computing system 140 may configure the one or more display elements to display at least some of the control analysis data (e.g., a generated control recommendation related to integrating the third party computing system functionality into the first party computing system 140, etc.).

At operation 250, the third party computing system integration module 200 initiates integration of the third party computing system functionality into the first party computing system 100. In various aspects, initiating the integration of the third party computing system functionality into the first party computing system 140 may include, for example, the first party computing system 140 implementing one or more controls based on the control data (e.g., facilitating implementation of the one or more controls at the first party computing system 140 and/or the third party computing system 170). In other aspects the first party computing system 140 may initiate integration of the third party computing system functionality by initiating processing operations or network communications for providing and/or accessing the functionality from the third party computing system 170 at the first party computing system. This may include, for example, initiating network communications between the first party computing system 140 and the third party computing system 170, transferring data and/or software to and/or from the third party computing to the first party computing system 140, etc.

For illustrative purposes, the third party computing system integration module 200 is described with reference to implementations described above with respect to one or more examples described herein. Other implementations, however, are possible. In some aspects, the steps in FIG. 2 may be implemented in program code that is executed by one or more computing devices such as the, the first party computing system 140, the risk management and mitigation computing system 100, or other system in FIG. 1. In some aspects, one or more operations shown in FIG. 2 may be omitted or performed in a different order. Similarly, additional operations not shown in FIG. 2 may be performed.

Computing System Integration Risk Analysis Module

Figure 3:
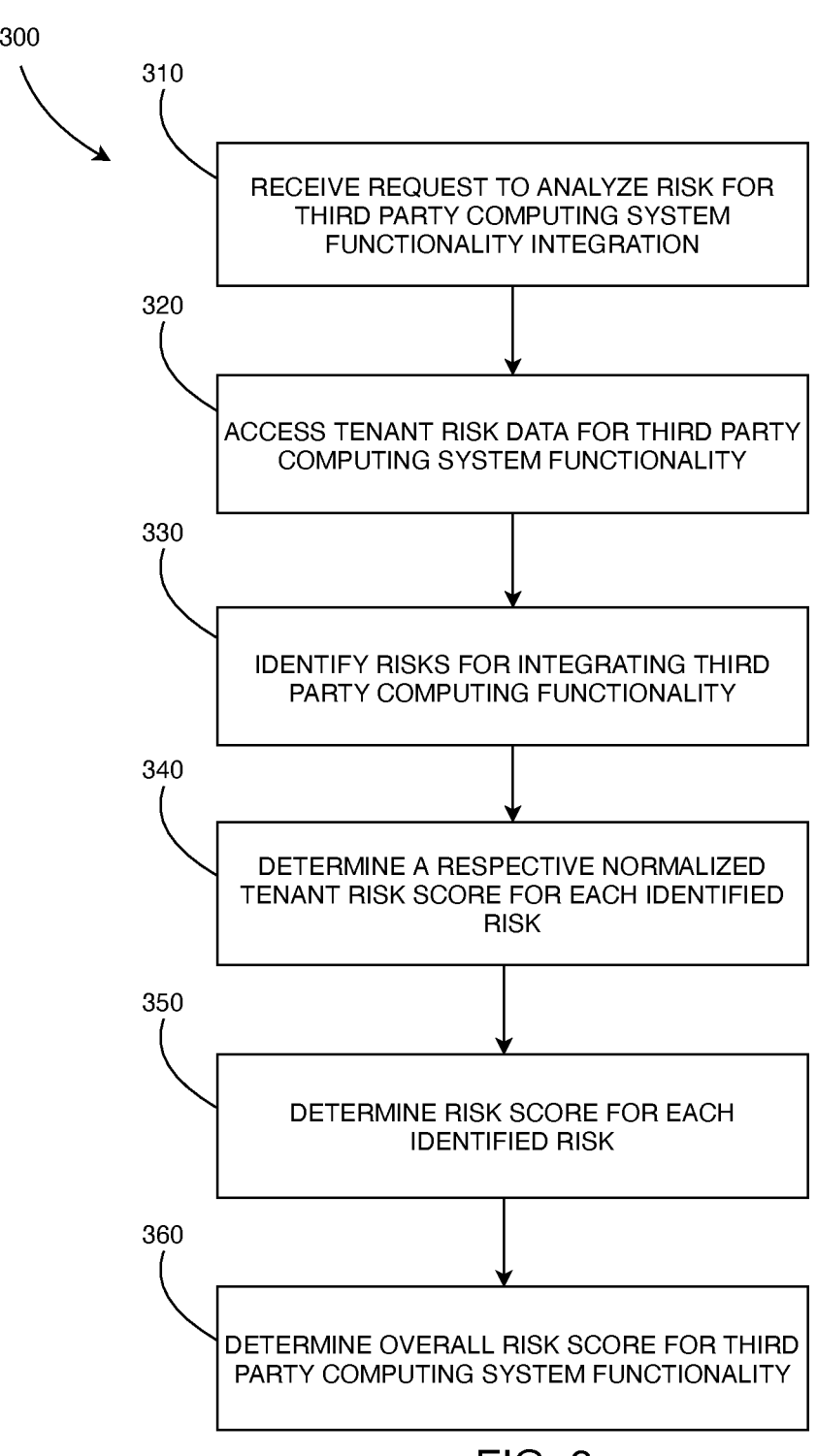
FIG. 3 depicts an example of a process for identifying and determining data-related risks when integrating third party computing system functionality into a tenant computing system in accordance with various aspects of the present disclosure.

FIG. 3 depicts an example of a process performed by a computing system integration risk analysis module 300. This process may, for example, include operations that the risk management and mitigation computing system 100 may execute to determine risk scores for each of a plurality of identified risks associated with integrating the third party computing system functionality into the first party computing system 140. For instance, the flow diagram shown in FIG. 3 may correspond to operations performed by computing hardware found in the risk management and mitigation computing system 100 that executes the computing system integration risk analysis module 300.

At operation 310, the computing system integration risk analysis module 300 receives a request to analyze risk for third party computing system functionality integration (e.g., third party computing system functionality integration into a first party computing system 140). In some aspects, the computing system integration risk analysis module 300 receives the request in response to a request to integrate third party computing system functionality into the first party computing system 140 (e.g., such as discussed above with respect to operation 210 of the third party computing system integration module 200 shown in FIG. 2).

In operation 320, the computing system integration risk analysis module 300 accesses tenant computing system risk data for the third party computing system functionality. In some aspects, the risk management and mitigation computing system 100 accesses the tenant computing system risk data from the one or more data repositories 108 on the risk management and mitigation computing system 100. In various aspects, the risk management and mitigation computing system 100 may receive the tenant computing system control data from one or more data repositories 168 in the tenant computing systems 160. In various aspects, the tenant computing system risk data includes data related to one or more risks identified by various tenant computing systems 160 when integrating the third party computing system functionality into the tenant computing systems 160 (or other first party computing systems associated with the tenant computing systems 160) at a past time. For example, the tenant computing risk data may include a set of identified risks and an associated risk score for each of the tenant computing systems, where the set of identified risks and the associated risk scores were determined during a process in which each of the tenant computing systems 160 integrated the third party computing system functionality (e.g., during an iteration of the computing system integration risk analysis module 300 executed on behalf of the tenant computing systems 160 while the tenant computing systems 160 were integrating the functionality provided by the third party computing system 170).

In various aspects, each of the tenant computing systems 160 may utilize different scoring values for each of the identified risks. For example, each of the tenant computing systems 160 may define a respective scoring scale (e.g., set of scoring ranges) that corresponds to an indication of a risk level for a particular identified risk (e.g., low, medium high).

In one example, the computing system integration risk analysis module 300 may access the following tenant computing system risk data for a first functionality (F1) provided by the third party computing system 170:

TABLE 1

| Exemplary Tenant Computing System Risk Data | | | | |
|---|---|---|---|---|
| Tenant | Risk Score Ranges | Risks | Risk Score | Level |
| T1 | Low: 1-5 | R1 | 5 | Low |
| | Medium: 6-10 | R2 | 10 | Medium |
| | High: 11-15 | R3 | 15 | High |
| T2 | Low: 1-2 | R1 | 1 | Low |
| | Medium: 3-6 | R2 | 3 | Medium |
| | High: 7-10 | R3 | 8 | High |
| T3 | Low: 1-10 | R1 | 8 | Low |
| | Medium: 11-20 | R2 | 17 | Medium |
| | High: 21-30 | R3 | 27 | High |

At operation 330, the computing system integration risk analysis module 300 identifies risks for integrating the third party computing functionality into the first party computing system 140 (e.g., based on the tenant computing system risk data). In the integration process, each of the tenant computing systems 160 may initiate a risk analysis for identifying risks and respective scores for each identified risk at the time of the integration. Continuing the example above, in the tenant computing system risk data, each of three tenant computing systems (e.g., T1, T2, and T3) have identified the same three risks (R1, R2, and R3) associated with integrating the first functionality (F1) provided by the third party computing system 170.

At operation 340, the computing system integration risk analysis module 300 determines a respective normalized tenant risk score for each risk identified at operation 330. As mentioned above, each of the tenant computing systems 160 may utilize different scoring values for each of the identified risks. As such, it may be difficult to generate an overall risk score for a particular functionality provided by a third party computing system 170. As such, the risk management and mitigation computing system 100 can normalize respective tenant computing system risk scores for each identified risk for the particular functionality provided by the third party computing system 170. In various aspects, the risk management and mitigation computing system 100 may normalize a risk score for the functionality provided by the third party computing system 170 (e.g., normalize the risk score across one or more determined risks for each tenant computing system of the tenant computing systems). The risk management and mitigation computing system 100 can normalize the risk score by utilizing an algorithm based on each risk -continued

| Notation | Description |
|---|---|
| Smax | The maximum risk score possible, which depends on the score ranges specified for a particular tenant computing system |
| Fs | The total risk score for the functionality F |

In this example, for a given Ri for a functionality F and the maximum possible risk score, risk management and mitigation computing system 100 may normalize the risk score based on the formula $SSi=Si/Smax$. The risk management and mitigation computing system 100 may determine a risk score for the functionality F based on each of the risk scores determined for each of the risks in the set of risks for each tenant in the set of tenants that have integrated functionality provided by the third party computing system 170 (e.g., $Fs=SS1+SS2+SS3+ \ldots +SSn$). In various aspects, the risk management and mitigation computing system 100 determines the Fs based on the total number of risks associated with the functionality provided by the third party computing system 170 in the context of a particular tenant (e.g., the tenant computing system 150). The risk management and mitigation computing system 100 may then determine an overall risk score for the functionality F by averaging each determined risk score across the entire set of tenants that have integrated the functionality provided by the third party computing system 170.

At operations 350, the computing system integration risk analysis module 300 determines a risk score (e.g., a normalized risk score) for each identified risk for each of the tenants (e.g., tenant computing systems 160). In operation 360, the computing system integration risk analysis module 300 determines an overall risk score for integrating the third party computing system functionality into the first party computing system 140.

TABLE 2

Exemplary Tenant Computing System Risk Data Analysis

| Tenant | Risk Score Ranges | Risks | Risk Score | Level | Standardized Score | Functionality Risk Score Per Tenant | Overall Functionality Risk (F1) |
|---|---|---|---|---|---|---|---|
| T1 | Low: 1-5 | R1 | 5 | Low | 5/15 = 0.33 | 0.33 + 0.66 + | (1.99 + 1.2 + 1.74)/ |
| | Medium: 6-10 | R2 | 10 | Medium | 10/15 = 0.66 | 1 = 1.99 | 3 = 1.64 |
| | High: 11-15 | R3 | 15 | High | 15/15 = 1 | | |
| T2 | Low: 1-2 | R1 | 1 | Low | 1/10 = 0.3 | 0.1 + 0.3 + | |
| | Medium: 3-6 | R2 | 3 | Medium | 3/10 = 0.3 | 0.8 = 1.2 | |
| | High: 7-10 | R3 | 8 | High | 8/10 = 0.8 | | |
| T3 | Low: 1-10 | R1 | 8 | Low | 8/30 = 0.27 | 0.27 + 0.57 + | |
| | Medium: 11-20 | R2 | 17 | Medium | 17/30 = 0.57 | 0.9 = 1.74 | |
| | High: 21-30 | R3 | 27 | High | 27/30 = 0.9 | | | score for a particular functionality provided by the third party computing system 170 and the maximum risk scores utilized by the tenant computing systems 160 that produced each risk score. Continuing the example above, the risk management and mitigation computing system 100 can determine normalized tenant risk scores for each identified risk, referring to the following notations:

| Notation | Description |
|---|---|
| F | The integrated functionality provided by the third party computing system 170 |
| Ti{i/N} | The set of tenants who have integrated the functionality F |
| Ri{i/N} | The set of risks identified for the functionality F |
| Si | The risk score of each risk Ri |
| SSi | The normalized risk score of the risk Ri |

Additional examples of results of the risk analysis discussed above are shown in Tables 3 and 4 below with respect to different functionality (F2 and F3) provided by the third party computing system 170. As may be understood from these examples, risk scores may vary across tenants (e.g., tenant computing systems). By normalizing values across different tenant risk analyses, the risk management and mitigation computing system 100 and comparing determined risks at both the tenant level and the overall level for a particular third party computing system functionality, may provide improvements over technical defects in existing software's ability to provide accurate risk analysis related to integrating functionality provided by third party computing systems 170 (and to use that risk analysis to generate more accurate controls recommendations that provide the largest reduction in risks posed by potential data loss through the integration of such functionality). This is particularly true where data related to prior instances of integrating the functionality provided by the third party computing systems is stored in separate data repositories 168 in respective tenant computing systems 160, and may be otherwise inaccessible in configurations other than the multi-tenant system described with respect to certain aspects of the present disclosure.

At operation 410, the computing system control recommendation module 400 receives a request to mitigate risks for the third party computing system functionality integration (e.g., into a first party computing system 140). In some aspects, the computing system integration risk analysis module 300 receives the request in response to a request to integrate third party computing system functionality into the

TABLE 3

Exemplary Tenant Computing System Risk Data Analysis

| Tenant | Risk Score Ranges | Risks | Risk Score | Level | Standardized Score | Functionality Risk Score Per Tenant | Overall Functionality Risk (F2) |
|---|---|---|---|---|---|---|---|
| T4 | Low: 1-5 | R1 | 3 | Low | 3/15 = 0.2 | 0.2 + 0.54 + | (1.54 + 1.8 + 2.2)/ |
| | Medium: 6-10 | R2 | 8 | Medium | 8/15 = 0.54 | 0.8 = 1.54 | 3 = 1.85 |
| | High: 11-15 | R3 | 12 | High | 12/15 = 0.8 | | |
| T5 | Low: 1-2 | R1 | 2 | Low | 2/10 = 0.2 | 0.2 + 0.6 + | |
| | Medium: 3-6 | R2 | 6 | Medium | 6/10 = 0.6 | 1 = 1.8 | |
| | High: 7-10 | R3 | 10 | High | 10/10 = 1 | | |
| T6 | Low: 1-10 | R1 | 18 | Medium | 18/30 = 0.6 | 0.3 + 0.7 + | |
| | Medium: 11-20 | R2 | 21 | High | 21/30 = 0.7 | 0.9 = 1.9 | |
| | High: 21-30 | R3 | 27 | High | 27/30 = 0.9 | | |

TABLE 4

Exemplary Tenant Computing System Risk Data Analysis

| Tenant | Risk Score Ranges | Risks | Risk Score | Level | Standardized Score | Functionality Risk Score Per Tenant | Overall Functionality Risk (F3) |
|---|---|---|---|---|---|---|---|
| T7 | Low: 1-20 | R1 | 15 | Low | 15/50 = 0.3 | 0.3 + 0.7 + | (1.9 + 1.15 + 2.8)/ |
| | Medium: 21-40 | R2 | 35 | Medium | 35/50 = 0.7 | 0.9 = 1.9 | 3 = 1.95 |
| | High: 41-50 | R3 | 45 | High | 45/50 = 0.9 | | |
| T8 | Low: 1-10 | R1 | 2 | Low | 2/20 = 0.1 | 0.1 + 0.3 + | |
| | Medium: 10-15 | R2 | 3 | Low | 6/20 = 0.3 | 0.75 = 1.15 | |
| | High: 15-20 | R3 | 8 | Medium | 15/20 = 0.75 | | |
| T9 | Low: 1-2 | R1 | 4 | Medium | 4/5 = 0.8 | 0.8 + 1 + | |
| | Medium: 3-4 | R2 | 5 | High | 5/5 = 1 | 1 = 2.8 | |
| | High: 5 | R3 | 5 | High | 5/5 = 1 | | |

For illustrative purposes, the computing system integration risk analysis module 300 is described with reference to implementations described above with respect to one or more examples described herein. Other implementations, however, are possible. In some aspects, the steps in FIG. 3 may be implemented in program code that is executed by one or more computing devices such as the risk management and mitigation computing system 100, the third party computing system 140, or other system in FIG. 1. In some aspects, one or more operations shown in FIG. 3 may be omitted or performed in a different order. Similarly, additional operations not shown in FIG. 3 may be performed.
Computing System Control Recommendation Module FIG. 4 depicts an example of a process performed by a computing system control recommendation module 400 according to various aspects. This process includes operations that the risk management and mitigation computing system 100 may execute to generate a control recommendation to mitigate risks related to integrating the third party computing system functionality into the first party computing system 140. For instance, the flow diagram shown in FIG. 4 may correspond to operations carried out, for example, by computing hardware found in, the risk management and mitigation computing system 100 as the computing hardware executes the computing system control recommendation module 400.

first party computing system 140 (e.g., such as discussed above with respect to operation 210 of the third party computing system integration module 200 shown in FIG. 2).

At operation 420, the computing system control recommendation module 400 accesses tenant computing system control data for risks identified for the third party computing system integration. In various aspects, the risks include risks identified as part of the computing system integration risk analysis module 300 discussed with respect to FIG. 3 (e.g., at operation 330). In some aspects, the risk management and mitigation computing system 100 accesses the tenant computing system control data from the one or more data repositories 108 on the risk management and mitigation computing system 100. In various aspects, the risk management and mitigation computing system 100 may receive and/or access the tenant computing system control data from one or more data repositories 168 in the tenant computing systems 160. In various aspects, the tenant computing system control data includes data related to one or more controls implemented by various tenant computing systems 160 when integrating the third party computing system functionality into the tenant computing systems 160 (i.e., to mitigate one or more risks identified by a respective risk analysis process performed when the tenant computing systems 160 where integrating the third party computing system functionality into the tenant computing systems 160.

In various aspects, the tenant computing system control data includes the risks identified risks by each of the tenant computing systems 160, a risk score for each of the identified risks (e.g., an absolute risk score, a normalized risk score as discussed above, etc.), a control (e.g., or controls) implemented to mitigate each risk, and a control score. The control score may, for example, indicate an extent to which the identified control reduces each identified risk (e.g., a control score of 5 may mitigate an entire risk represented by an identified risk with a risk score of 5).

At operation 430, the computing system control recommendation module 400 determines a common control set implemented for the third party computing system functionality (e.g., by each of the tenant computing systems 160). For example, the common control set may include each control that is implemented by more than one tenant computing system 160 for particular third party computing system functionality. In operation 440, the computing system control recommendation module 400 determines a mitigation weight of each control in the control set. In various aspects, the mitigation weight may indicate an extent to which each particular control (e.g., or combination of controls) mitigates a particular risk (e.g., or combination of risks) associated with integrating a particular functionality provided by a third party computing system 170.

At operation 450, the computing system control recommendation module 400 determines control adoption data for each control in the control set (e.g., by each of the tenant computing systems 160). In some aspects, the control adoption data may indicate an extent to which each particular tenant computing system 160 has implemented some kind of control to mitigate risks posed by a particular third party computing functionality. In other aspects, the control adoption data may indicate an extent to which all tenant computing systems 160 have implemented some type of control to mitigate the risks posed by a particular third party computing functionality. In still other aspects, the control adoption data may indicate an extent to which a particular control mitigates a particular risk.

In some aspects the control adoption data can include, for example, a number of tenant computing systems 160 that have implemented each particular control in the common control set, a portion (e.g., percentage) of tenant computing systems 160 that have implemented each particular control in the common control set, a number of tenant computing systems 160 that have implemented each particular control in the common control set for each particular risk in a set of risks, a portion (e.g., percentage) of tenant computing systems 160 that have implemented each particular control in the common control set for each particular risk in the set of risks, a number of tenant computing systems 160 that have implemented any type of control in the common control set, etc. In still other aspects, the control adoption data may indicate an extent to which controls have been implemented for a particular third party computing system functionality (e.g., across all tenant computing systems 160 that have integrated the functionality). In some aspects, the control adoption data may include a control mitigation score (e.g., which the computing system control recommendation module 400 may determine based on various control mitigation scores as described below).

In one example, the risk management and mitigation computing system 100 can determine the common control set, the mitigation weight, and control mitigation score of various controls, referring to the following notations:

| Notation | Description |
|---|---|
| F | The integrated functionality provided by the third party computing system 170 |
| Ti{i/N} | The set of tenants who have integrated the functionality F |
| Ri{i/N} | The set of risks identified for the functionality F |
| RRi | The residual risk rating for the risk Ri |
| Ci {i/N} | The set of controls implemented to mitigate the risks R for the functionality F |
| Ai {i/N} | The set of assessments for the functionality F |
| Si | The risk score of the risk Ri |
| SV | The sum of the risk scores of all the identified vendor risks R for the functionality F |
| CxSi | Control mitigation score, which may include an extent to which each control Cx contributes to the mitigation of the associated risk Ri. |
| CMxST | Control Mitigation score across all risks mitigated by a particular control in the context of the functionality F and the tenant |
| CMxSV | Control Mitigation Score across all risks mitigated by a particular control in the context of the functionality F and across all tenants |

In various aspects, the risk management and mitigation computing system 100 may generate one or more control recommendations to mitigate an identified risk (e.g., based on one or more determined risks and identified control implementation by the tenant computing systems 160, when integrating the third party computing system functionality). For example, given a functionality F with a total risk score S—when a control C that mitigates n risks, the extent to which the control C may affect the mitigation may be indicated by CMxST. In various aspects, the risk management and mitigation computing system 100 may determine the control mitigation score across all risks mitigated by this control C based on the individual control mitigation scores and risk scores (e.g., $CMxST=(CS1+CS2= \ldots +CSn)/(S1+S2+S3+ \ldots Sm)$—where m is the total number of risks associated with the functionality F). When m different controls mitigate a risk Ri, the risk management and mitigation computing system 100 may uniformly distribute the control score across all the mitigating controls (e.g., $CSx=Si/m$).

In some aspects, the residual risk rating RRi may include a risk score that remains for a particular risk after implementation of one or more controls to mitigate the risk. In some aspects, the risk management and mitigation computing system 100 may omit the residual risk rating RRi when determining a mitigation score of a control itself. For example, in response to identifying a risk with a 10 rating, and two controls that respectively mitigate the risk by 2 and 6, the mitigation factor for these controls remains 2/10 and 6/10 respectively. A residual risk rating may, for example, automatically factor into a control mitigation score, where the risk management and mitigation computing system 100 may determine how much controls are used to mitigate risks.

In particular embodiments, the risk management and mitigation computing system 100 determines a control mitigation score for all tenants (e.g., tenant computing systems 160), in order to determine an overall mitigation score for a particular control. Various aspects, the risk management and mitigation computing system 100 performs an updated control mitigation analysis in response to a change for a particular risk score (e.g., because a control's mitigation may also change when a particular aspect of a functionality F becomes more or less risky).

In various aspects, the risk management and mitigation computing system can identify and determine, for example: (1) what control set is most widely used across a set of tenants to mitigate one or more risks associated with a particular functionality F); (2) what mitigation weight each of the controls provide to the one or more risks; (3) whether (and to what extent) any particular tenant is using controls to mitigate vendor risks; (4) etc.

Table 5 depicts an exemplary mitigation analysis for a first functionality F1:

TABLE 5

Exemplary Tenant Computing System Control Data for F1

| Tenant | Risks | Risk Score | Control | Control Score |
|--------|-------|-----------|---------|--------------|
| T1 | R1 | 5 | C1 | 5 |
| | R2 | 10 | C2 | 10 |
| | R3 | 15 | C1 | 15 |
| | R4 | 5 | C2 | 5 |
| T2 | R5 | 1 | C1 | 1 |
| | R6 | 3 | C2 | 3 |
| T3 | R7 | 6 | C1 | 6 |
| | R8 | 8 | C2 | 8 |

In the example shown above, tenants T1, T2, and T3 (e.g., tenant computing systems T1, T2, and T3) have integrated functionality F1. The risk management and mitigation computing system 100 has identified various risks (R1, R2, R3, R4, R5, R6, R7, and R8) associated with the functionality F1 (e.g., identified from the tenant computing system control data), and the controls that have been applied to mitigate each risk are shown in Table 5 above. In the example shown in this table, each risk is mitigated by a single control (e.g., C1 or C2). As such, in this example, the control mitigation score for each of the controls is equal to the respective risk score itself.

TABLE 6

Control Mitigation Analysis for Data from Table 5

| Tenant | Control | CxS | CMxST | SV |
|--------|---------|-----|-------|-----|
| T1 | C1 | 5 + 15 = 20 | 20/35 = 0.57 | 20 + 15 = 35 |
| T1 | C2 | 10 + 5 = 15 | 15/35 = 0.43 | 20 + 15 = 35 |
| T2 | C1 | 1 | 1 = /4 = 0.25 | 1 + 3 = 4 |
| T2 | C2 | 3 | 3/4 = 0.75 | 1 + 3 = 4 |
| T3 | C1 | 6 | 6/14 = 0.43 | 6 + 8 = 14 |
| T3 | C2 | 8 | 8/14 = 0.57 | 6 + 8 = 14 |

Based on the exemplary data in Table 6, the risk management and mitigation computing system 100 may determine a control mitigation score for C1 (CM1SV) of: (0.57+0.25+0.43)/3=0.42; and a control mitigation score of C2 (CM2SV) of (0.43+0.75+0.57)/3=0.58. In this example, the control set most widely used to mitigate the risks for the functionality F1 in the set of tenants (T1, T2 and T3) is C1 and C2. The mitigation weight of these two controls, in this example, are C1=0.42 and C2=0.58. In this example, the controls are being widely used to mitigate risks. For example, a control mitigation score at the tenant and functionality level includes the following:

$$T1:CM1ST1+CM2ST1=0.57+0.43=1.0(100\%)$$

$$T2:CM1ST2+CM2ST2=0.25+0.75=1.0(100\%)$$

$$T3:CM1ST3+CM2ST3=0.43+0.57=1.0(100\%)$$

In this example, the risk management and mitigation computing system 100 may determine a control mitigation score at the functionality F1 level, across all identified tenants, as 100% (CMxSV=CM1SV+CM2SV=0.42+0.58=1.0 (100%)).

Table 7 depicts an exemplary mitigation analysis for a second functionality F2:

TABLE 7

Exemplary Tenant Computing System Control Data for F2

| Tenant | Risks | Risk Score | Control | Control Score |
|--------|-------|-----------|---------|--------------|
| T1 | R1 | 5 | C1 | 2.5 |
| | R1 | 10 | C2 | 2.5 |
| | R2 | 15 | C1 | 15 |
| | R3 | 5 | C2 | 10 |
| T2 | R4 | 1 | C1 | 1 |
| | R5 | 3 | C2 | 3 |
| T3 | R7 | 6 | C1 | 6 |
| | R8 | 8 | C2 | 8 |

In the example shown above, tenants T1, T2, and T3 (e.g., tenant computing systems T1, T2, and T3) have integrated functionality F2. The risk management and mitigation computing system 100 has identified various risks (R1, R2, R3, R4, R5, R6, R7, and R8) associated with the functionality F2 (e.g., identified from the tenant computing system control data), and the controls that have been applied to mitigate each risk are shown in Table 7 above. In the example shown immediately above, there is a risk (R1) that is mitigated by more than one control (C1 and C2). In this example, the control mitigation score for each control may be distributed evenly among the controls.

TABLE 8

Control Mitigation Analysis for Data from Table 7

| Tenant | Control | CxS | CMxST | SV |
|--------|---------|-----|-------|-----|
| T1 | C1 | 2.5 + 15 = 17.5 | 17.5/30 = 0.58 | 5 + 15 + 10 = 30 |
| T1 | C2 | 2.5 + 10 = 12.5 | 12.5/35 = 0.42 | 5 + 15 + 10 = 30 |
| T2 | C1 | 1 | 1/4 = 0.25 | 4 |
| T2 | C2 | 3 | 3/4 = 0.75 | 4 |
| T3 | C1 | 6 | 6/14 = 0.43 | 14 |
| T3 | C2 | 8 | 8/14 = 0.57 | 14 |

Based on the exemplary data in Table 8, the risk management and mitigation computing system 100 may determine a control mitigation score for C1 (CM1SV) of: (0.58+0.25+0.43)/3=0.42; and a control mitigation score of C2 (CM2SV) of (0.42+0.75+0.57)/3=0.58. In this example, the control set most widely used to mitigate the risks for the functionality F2 in the set of tenants (T1, T2 and T3) is C1 and C2. The mitigation weight of these two controls, in this example, are C1=0.58 and C2=0.42. In this example, the controls are being widely used to mitigate risks. For example, a control mitigation score at the tenant and functionality level includes the following:

$$T1:CM1ST1+CM2ST1=0.58+0.42=1.0(100\%)$$

$$T2:CM1ST2+CM2ST2=0.25+0.75=1.0(100\%)$$

$$T3:CM1ST3+CM2ST3=0.43+0.57=1.0(100\%)$$

In this example, the risk management and mitigation computing system 100 may determine a control mitigation score at the functionality F2 level, across all identified tenants, as 100% (CMxSV=CM1SV+CM2SV=0.42+0.58=1.0 (100%)).

Table 9 depicts an exemplary mitigation analysis for a third functionality F3:

TABLE 9

| Exemplary Tenant Computing System Control Data for F3 | | | | |
| --- | --- | --- | --- | --- |
| Tenant | Risks | Risk Score | Control | Control Score |
| T1 | R1 | 5 | C1 | 5 |
| | R2 | 5 | C2 | 5 |
| | R3 | 15 | C1 | 15 |
| | R4 | 10 | C2 | 10 |
| T2 | R5 | 1 | C3 | 1 |
| | R6 | 3 | C4 | 3 |
| T3 | R7 | 6 | C1 | 6 |
| | R8 | 8 | C2 | 8 |
| T4 | R9 | 10 | C3 | 10 |
| | R10 | 15 | C4 | 15 |

In the example shown above, tenants T1, T2, T3, and T4 have integrated functionality F3. The risk management and mitigation computing system 100 has identified various risks (R1, R2, R3, R4, R5, R6, R7, R8, R9, and R10) associated with the functionality F3 (e.g., identified from the tenant computing system control data), and the controls that have been applied to mitigate each risk are shown in Table 9 above. In the example shown in this table, Tenants T1 and T3 use a set of controls (C1, C2) to mitigate various risks, while T2 and T4 use a different set of controls (C3, C4) to mitigate risks identified for functionality F3.

TABLE 10

| Control Mitigation Analysis for Data from Table 9 | | | | |
| --- | --- | --- | --- | --- |
| Tenant | Control | CxS | CMxST | SV |
| T1 | C1 | 5 + 15 = 20 | $^{20}/_{35}$ = 0.57 | 20 + 15 = 35 |
| T1 | C2 | 10 + 5 = 15 | 15/35 = 0.43 | 20 = 15 = 35 |
| T2 | C3 | 1 | 1/4 = 0.25 | 1 + 3 = 4 |
| T2 | C4 | 3 | 3/4 = 0.75 | 1 + 3 = 4 |
| T3 | C1 | 6 | 6/14 = 0.43 | 6 + 8 = 14 |
| T3 | C2 | 8 | 8/14 = 0.57 | 6 + 8 = 14 |
| T4 | C3 | 10 | 10/25 = 0.4 | 10 + 15 = 25 |
| T4 | C4 | 15 | 15/25 = 0.6 | 10 + 15 = 25 |

Based on the exemplary data in Table 10, the risk management and mitigation computing system 100 may determine a control mitigation score for C1 (CM1SV) of: (0.57+0.43)/4=0.25; a control mitigation score of C2 (CM2SV) of (0.43+0.57)/4=0.25; a control mitigation score of C3 (CM3SV) of (0.25+0.4)/4=0.16; and a control mitigation score of C4 (CM4SV) of (0.75+0.6)/4=0.34. In this example, the control set most widely used to mitigate the risks for the functionality F3 in the set of tenants (T1, T2, T3 and T4) are C1, C2, C3, and C4. The mitigation weight of these four controls, in this example, are C1=0.25; C2=0.25; C3=0.16; and C4=0.34. In this example, the controls are being widely used to mitigate risks. For example, a control mitigation score at the tenant and functionality level includes the following:

$$T1:CM1ST1+CM2ST1=0.58+0.42=1.0(100\%)$$

$$T2:CM3ST2+CM4ST2=0.25+0.75=1.0(100\%)$$

$$T3:CM1ST3+CM2ST3=0.43+0.57=1.0(100\%)$$

$$T4:CM3ST3+CM4ST3=0.40+0.60=1.0(100\%)$$

In this example, the risk management and mitigation computing system 100 may determine a control mitigation score at the vendor level, across all identified tenants, as 100% (CMxSV=CM1SV+CM2SV+CM3SV=CM4SV=0.25+0.25+0.16+0.34=1.0 (100%)).

Table 11 depicts an exemplary mitigation analysis for a fourth functionality F4:

TABLE 11

| Exemplary Tenant Computing System Control Data for F4 | | | | |
| --- | --- | --- | --- | --- |
| Tenant | Risks | Risk Score | Control | Control Score |
| T1 | R1 | 5 | C1 | 5 |
| | R2 | 5 | C2 | 5 |
| | R3 | 15 | C1 | 15 |
| | R4 | 10 | C2 | 10 |
| T2 | R5 | 1 | C3 | 1 |
| | R6 | 3 | C4 | 3 |
| T3 | R7 | 6 | C1 | 6 |
| | R8 | 8 | Nil | 0 |
| T4 | R9 | 10 | C3 | 10 |
| | R10 | 15 | Nil | 0 |

In the example shown above, tenants T1, T2, T3, and T4 (e.g., tenant computing systems T1, T2, T3, and T4) have integrated functionality F1. The risk management and mitigation computing system 100 has identified various risks (R1, R2, R3, R4, R5, R6, R7, R8, R9, and R10) associated with the functionality F4 (e.g., identified from the tenant computing system control data), and the controls that have been applied to mitigate each risk are shown in Table 11 above. In the example shown immediately above, not all tenants use controls to mitigate every risk (e.g., tenants T3 and T4 do not have controls implemented for risks R8 and R10 respectively).

TABLE 12

| Control Mitigation Analysis for Data from Table 11 | | | | |
| --- | --- | --- | --- | --- |
| Tenant | Control | CxS | CMxST | SV |
| T1 | C1 | 5 + 15 = 20 | 20/35 = 0.57 | 20 + 15 = 35 |
| T1 | C2 | 10 + 5 = 15 | 15/35 = 0.43 | 20 = 15 = 35 |
| T2 | C3 | 1 | 1/4 = 0.25 | 1 + 3 = 4 |
| T2 | C4 | 3 | 3/4 = 0.75 | 1 + 3 = 4 |
| T3 | C1 | 6 | 6/14 = 0.43 | 6 + 8 = 14 |
| T3 | Nil | 0 | 0 | 0 |
| T4 | C3 | 10 | 10/25 = 0.4 | 10 + 15 = 25 |
| T4 | Nil | 0 | 0 | 0 |

Based on the exemplary data in Table 12, the risk management and mitigation computing system 100 may determine a control mitigation score for C1 (CM1SV) of: (0.57+0.43)/4=0.25; a control mitigation score of C2 (CM2SV) of (0.43)/4=0.11; a control mitigation score of C3 (CM3SV) of (0.25+0.4)/4=0.16; and a control mitigation score of C4 (CM4SV) of (0.75)/4=0.19. In this example, the control set most widely used to mitigate the risks for the functionality F4 in the set of tenants (T1, T2, T3 and T4) includes C1, C2, C3, and C4. The mitigation weight of these four controls, in this example, are C1=0.25; C2=0.11; C3=0.16; and C4=0.19. In this example, the controls are being widely used to mitigate risks. For example, a control mitigation score at the tenant and vendor level includes the following:

$$T1:CM1ST1+CM2ST1=0.57+0.43=1.0(100\%)$$

$$T2:CM3ST2+CM4ST2=0.25+0.75=1.0(100\%)$$

$$T3:CM1ST3=0.43(43\%)$$

$$T4:CM3ST3=0.40(40\%)$$

In this example, the risk management and mitigation computing system 100 may determine a control mitigation score at the functionality F4 level, across all identified tenants, as 71% (CMxSV=CM1SV+CM2SV+CM3SV=CM4SV=0.25+0.11+0.16+0.19=0.71 (71%)).

Returning to operation 460, the computing system control recommendation module 400 generates a control recommendation based on the common control set, the mitigation weight of each control in the control set, and the control adoption data (e.g., the control mitigation score).

In various aspects, the computing system control recommendation module 400 may process the common control set, the mitigation weight of each control in the control set, and the control adoption data using a rules-based model, a machine-learning model, or both to generate the control recommendation. For example, the rules-based model, machine learning model, or combination of both may be configured to process the common control set, the mitigation weight of each control in the control set, and the control adoption data, and/or the like in determining a control recommendation(s). In other aspects, the rules-based model, machine learning model, or combination of both may be configured to process the residual risk rating to generate the control recommendation. For example, the rules-based model, machine learning model, or combination of both may be configured to generate a control recommendation by identifying which of a plurality of controls in the common control set result in the lowest residual risk rating for a particular set of risks.

For example, according to particular aspects, the computing system control recommendation module 400 may involve using a rules-based model in generating the control recommendation. The rules-based model may comprise a set of rules that selects at least one control from the common control set based on the mitigation weight of each control and the control adoption data. For example, the set of rules may define one or more rules for selecting the most mitigating control(s) according to mitigation weight, the most commonly adopted control for the particular functionality at issue, etc. In other aspects, the set of rules may define one or more rules for ordering each of the controls in common control set in terms of priority (e.g., most mitigating control to least mitigating control). Accordingly, an entity (e.g., on the first party computing system 140, the risk management and mitigation computing system 100) may maintain the set of rules in some type of data storage, such as a database (e.g., the one or more data repositories 108), from which the risk management and mitigation computing system 100 can access the set of rules for generating the control recommendation.

In some aspects, the rules-based model comprises a set of rules that selects the control recommendation from the common control set based on a relative mitigation weight of each control in the common control set or a relative adoption rate of each control in the common control set. For example, the computing system control recommendation module 400 may use the rules-based model to determine which control in the common control set provides the largest mitigation weight (e.g., which control provides the most mitigation for a particular identified risk), and select the control as the control recommendation. In other aspects, the computing system control recommendation module 400 may use the rules-based model to determine an adoption rate of each control in the common control set (e.g., a rate at which the tenant computing systems 160 have adopted each particular control for an identified risk). The computing system control recommendation module 400 may the use the rules-based model to select the control with the highest adoption rate as the control recommendation.

According to other aspects, the computing system control recommendation module 400 may utilize a machine learning model in generating a control recommendation related to integrating the functionality provided by the third party computing system. Here, the machine learning model may be trained using historical data on determined risks, risk scoring, mitigating control use, etc. by other tenants (e.g., tenant computing systems 160) that have integrated the functionality provided by the third party computing system 170. For instance, according to some aspects, the machine learning model may generate a control recommendation based on a prediction as to a reduction in likelihood of the first party computing system 140 experiencing a data privacy incident through integration of the functionality provided by the third party computing system 170 with the recommended control in place. Accordingly, the machine learning model may be configured using a variety of different types of supervised or unsupervised trained models such as, for example, support vector machine, naive Bayes, decision tree, neural network, and/or the like.

According to still other aspects, the computing system control recommendation module 400 may involve using a combination of the rules-based model and the machine learning model in generating a recommended control (e.g., a recommended control action). In various aspects, the risk management and mitigation computing system 100 may modify the tenant computing system control data to include the generated recommendation in association with the first party computing system and at least one of the identified risks. For example, the risk management and mitigation computing system 100 may modify the tenant computing system control data to include new control data for the first party computing system 140, the new control data indicating the control recommendation as a control implemented by the first party computing system 140 for at least one of the particular risks. In such aspects, the risk management and mitigation computing system 100 may provide the updated tenant computing system control data to a subsequent first party computing system that is integrating (e.g., or requesting to integrate) the third party computing system functionality (e.g., for use in risk analysis or control recommendation for the subsequent integration). In other aspects, the new control data may be fed to the machine learning model as training data. For illustrative purposes, the computing system control recommendation module 400 is described with reference to implementations described above with respect to one or more examples described herein. Other implementations, however, are possible. In some aspects, the steps in FIG. 4 may be implemented in program code that is executed by one or more computing devices such as the risk management and mitigation computing system 100, the first party computing system 140, or other system in FIG. 1. In some aspects, one or more operations shown in FIG. 4 may be omitted or performed in a different order. Similarly, additional operations not shown in FIG. 4 may be performed.

Third Party Computing System Control Implementation Module

Figure 5:
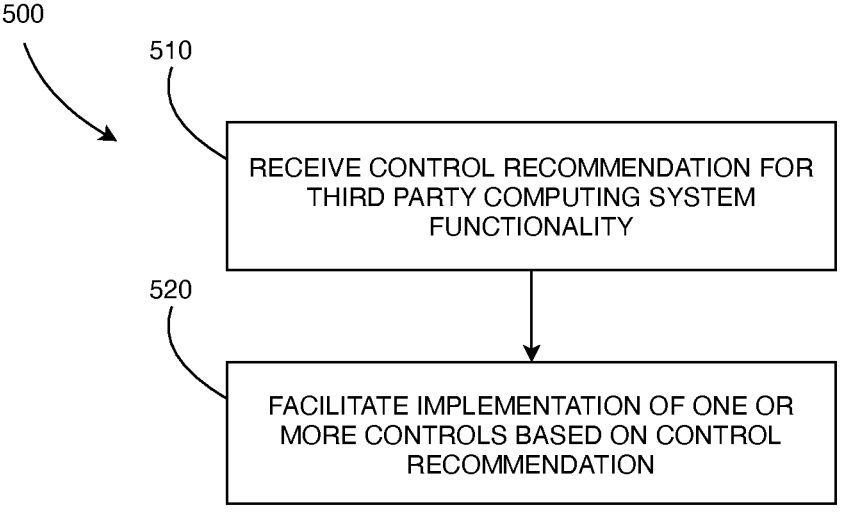
FIG. 5 depicts an example of a process for facilitating implementation of controls for mitigating data-related risks of integrating third party computing system functionality into a tenant computing system in accordance with yet another aspect of the present disclosure.

FIG. 5 depicts an example of a process, performed by a third party computing system control implementation module 500, according to various aspects. This process include operations that the first party computing system 140 may execute to facilitate implementation of one or more controls based on a control recommendation for integrating the third party computing system functionality into the first party computing system 140. For instance, the flow diagram shown in FIG. 5 may correspond to operations carried out, for example, by computing hardware found in, the first party computing system 140 as the computing hardware executes the third party computing system control implementation module 500.

At operation 510, the third party computing system control implementation module 500, receives the control recommendation for the third party computing system functionality. In various aspects, the first party computing system 140 receives the control recommendation (e.g., including one or more controls designed to mitigate at least one risk related to the integration of the third party computing system functionality) from the risk management and mitigation computing system 100 (e.g., following the generation of the control recommendation during execution of the computing system control recommendation module 400 described with respect to FIG. 4).

At operation 520, the third party computing system control implementation module 500, facilitates implementation of one or more controls based on the control recommendation. For example, the first party computing system may modify the functionality provided by the third party computing system (e.g. or cause the third party computing system 170 to modify the functionality). In various aspects the first party computing system 140 may modify the functionality according to the one or more controls. In some aspects, the first party computing system may disable the functionality provided by the third party computing system. In other aspects, the first party computing system may modify network communications between the first party computing system and third party computing system. In other aspects, the first party computing system may modify one or more attributes of the first party computing system and/or the third party computing system (e.g., or facilitate their modification) in order to implement the recommended control.

In other aspects, the first party computing system 140 may generate a graphical user interface by configuring one or more display elements for displaying the recommended control, the set of risks, or any other data described herein. In such aspects the third party computing system control implementation module 500 may facilitate implementation of the one or more controls by providing the graphical user interface for display on a user device.

For illustrative purposes, the third party computing system control implementation module 500 is described with reference to implementations described above with respect to one or more examples described herein. Other implementations, however, are possible. In some aspects, the steps in FIG. 5 may be implemented in program code that is executed by one or more computing devices such as the risk management and mitigation computing system 100, the first party computing system 140, or other system in FIG. 1. In some aspects, one or more operations shown in FIG. 5 may be omitted or performed in a different order. Similarly, additional operations not shown in FIG. 5 may be performed.

Example Technical Platforms

Aspects of the present disclosure may be implemented in various ways, including as computer program products that include articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 6:
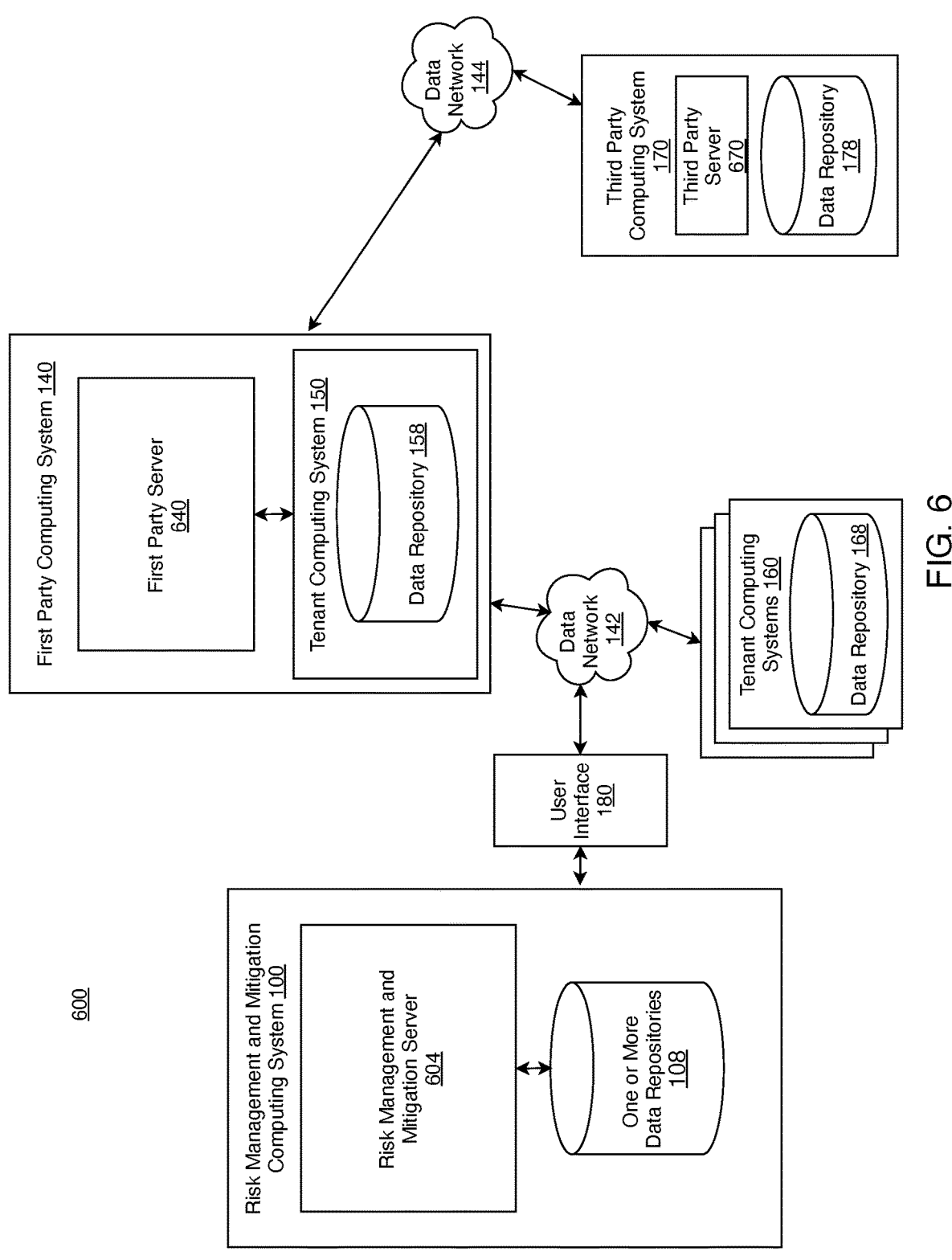
FIG. 6 depicts an example of a system architecture that may be used in accordance with various aspects of the present disclosure.

FIG. 6 depicts an example of a computing environment that can be used for analyzing data-related risks associated with integrating functionality provided by a third party computing system into a tenant computing system and facilitating implementation of controls to mitigate the identified risks accordance with various aspects of the present disclosure. Components of the system architecture 600 are configured according to various aspects to analyze risk associated with integrating third party computing system functionality into a first party computing system 140 and generate recommendations for mitigating those risks on a risk management and mitigation computing system 100

The system architecture 600 according to various aspects may include a risk management and mitigation computing system 100 and one or more data repositories 108. The risk management and mitigation computing system 100 further includes risk management and mitigation server 604. Although the risk management and mitigation computing system 100 and one or more data repositories 108 are shown as separate components, according to other aspects, these components may include a single server and/or repository, servers and/or repositories, one or more cloud-based servers and/or repositories, or any other suitable configuration.

In addition, the system architecture 600 according to various aspects may include a first-party computing system 140 that includes one or more first party servers 640 and a tenant computing system 150 comprising one or more data repositories 158. Although the first party server 640, first party computing system 140, tenant computing system 150, and one or more data repositories 158 are shown as separate components, according to other aspects, these components 170, 670, 150, 158 may include a single server and/or repository, servers and/or repositories, one or more cloud-based servers and/or repositories, or any other suitable configuration.

In addition, the system architecture 600 according to various aspects may include a third-party computing system 170 that includes one or more third party servers 670. Although the third party server 670 and third-party computing system 170 are shown as separate components, according to other aspects, these components 170, 670 may include a single server and/or repository, servers and/or repositories, one or more cloud-based servers and/or repositories, or any other suitable configuration.

In other aspects, the system architecture 600 may include a tenant computing system 160 comprising a data repository 168. Although the tenant computing system 160 and the data repository 168 are shown as separate components, according to other aspects, these components 160, 168 may include a single server and/or repository, servers and/or repositories, one or more cloud-based servers and/or repositories, or any other suitable configuration.

The risk management and mitigation server 604, first party server 640, and/or other components may communicate with, access, and/or the like with each other over one or more networks, such as via a data network 142 (e.g., a public data network, a private data network, etc.) and/or a data network 144 (e.g., a public data network, a private data network, etc.). In some aspects, the first party server 640, the risk management and mitigation server 604, and/or the third party server 670 may provide one or more interfaces that allow the first party computing system 140, the third party computing system 170, and/or the risk management and mitigation computing system 100 to communicate with each other such as one or more suitable application programming interfaces (APIs), direct connections, and/or the like.

Example Computing Hardware

Figure 7:
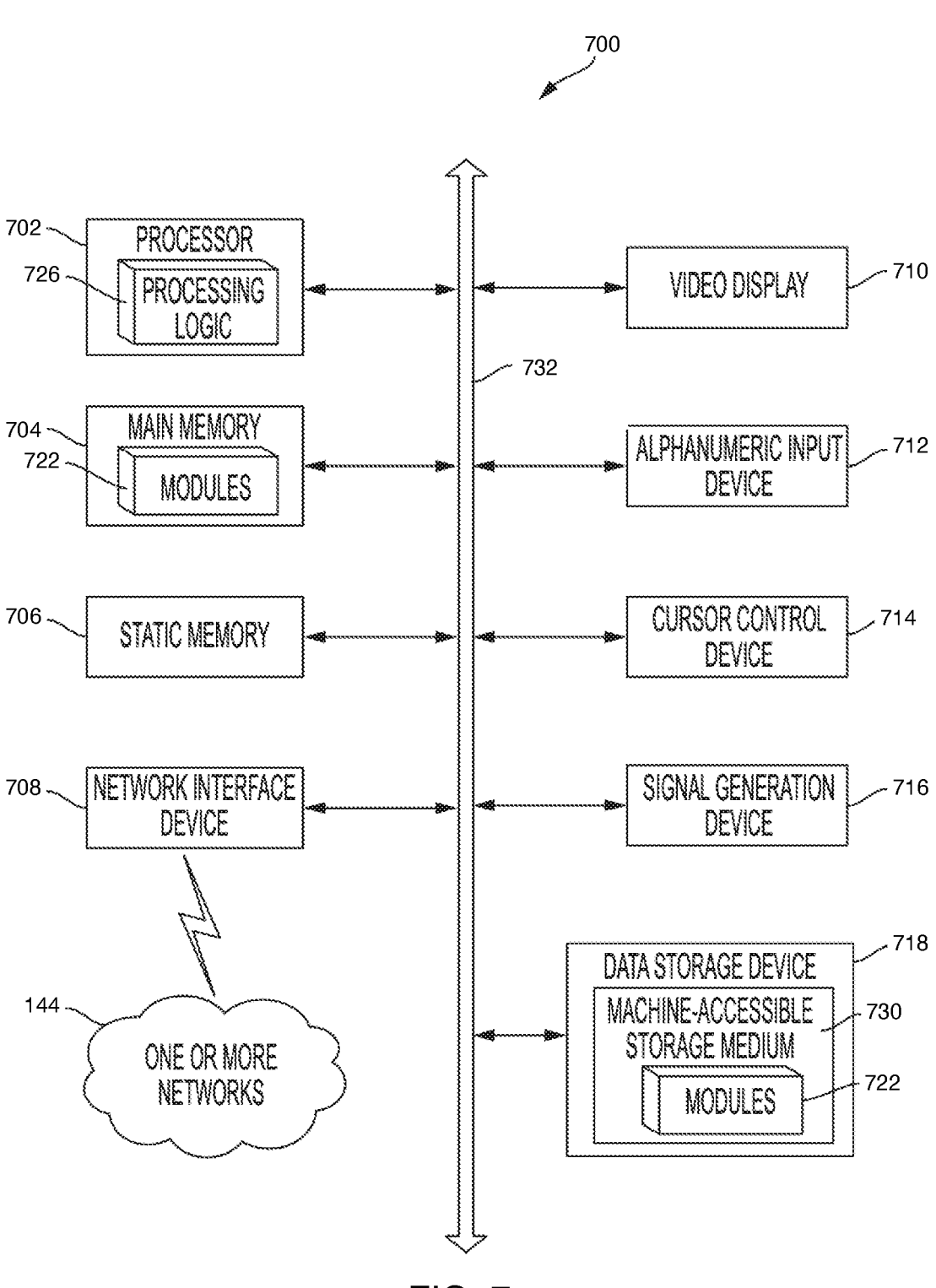
FIG. 7 depicts an example of a computing entity that may be used in accordance with various aspects of the present disclosure.

FIG. 7 illustrates a diagrammatic representation of a computing hardware device 700 that may be used in accordance with various aspects of the disclosure. For example, the hardware device 700 may be computing hardware such as a risk management and mitigation server 604 and/or a first party server 640 as described in FIG. 6. According to particular aspects, the hardware device 700 may be connected (e.g., networked) to one or more other computing entities, storage devices, and/or the like via one or more networks such as, for example, a LAN, an intranet, an extranet, and/or the Internet. As noted above, the hardware device 700 may operate in the capacity of a server and/or a client device in a client-server network environment, or as a peer computing device in a peer-to-peer (or distributed) network environment. According to various aspects, the hardware device 700 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 700 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 700 includes a processor 702, a main memory 704 (e.g., read-only memory (ROM), flash memory, dynamic random-access memory (DRAM) such as synchronous DRAM (SDRAM), Rambus DRAM (RDRAM), and/or the like), a static memory 706 (e.g., flash memory, static random-access memory (SRAM), and/or the like), and a data storage device 718, that communicate with each other via a bus 732.

The processor 702 may represent one or more general-purpose processing devices such as a microprocessor, a central processing unit, and/or the like. According to some aspects, the processor 702 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 702 may be one or more special-purpose processing devices such as an application specific integrated circuit (ASIC), a field programmable gate array (FPGA), a digital signal processor (DSP), network processor, and/or the like. The processor 702 can execute processing logic 726 for performing various operations and/or steps described herein.

The hardware device 700 may further include a network interface device 808, as well as a video display unit 710 (e.g., a liquid crystal display (LCD), a cathode ray tube (CRT), and/or the like), an alphanumeric input device 712 (e.g., a keyboard), a cursor control device 714 (e.g., a mouse, a trackpad), and/or a signal generation device 816 (e.g., a speaker). The hardware device 800 may further include a data storage device 718. The data storage device 718 may include a non-transitory computer-readable storage medium 730 (also known as a non-transitory computer-readable storage medium or a non-transitory computer-readable medium) on which is stored one or more modules 722 (e.g., sets of software instructions) embodying any one or more of the methodologies or functions described herein. For instance, according to particular aspects, the modules 722 include the third party computing system integration module 200, the computing system integration risk analysis module 300, the computing system control recommendation module

400, and the third party computing system control implementation module 500 as described herein. The one or more modules 722 may also reside, completely or at least partially, within main memory 704 and/or within the processor 702 during execution thereof by the hardware device 700—main memory 8704 and processor 702 also constituting computer-accessible storage media. The one or more modules 22 may further be transmitted or received over a network 142 via the network interface device 708.

While the computer-readable storage medium 730 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 700 and that causes the hardware device 700 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed is:

1. A system comprising:
a server computing system comprising a non-transitory computer-readable medium storing instructions and processing hardware communicatively coupled to the non-transitory computer readable medium, wherein the processing hardware is configured to execute the instructions and thereby perform operations comprising:
    accessing tenant computing system risk data for third party computing system functionality to be integrated with or invoked by a first party computing system, the tenant computing system risk data comprising risk data for each of a plurality of tenant computing systems that have previously integrated or invoked the third party computing system functionality;
    identifying particular risks for integrating or invoking the third party computing system functionality based on the tenant computing system risk data, each of the particular risks having a respective normalized risk score for each tenant computing system of the plurality of tenant computing systems;
    accessing tenant computing system control data for the particular risks identified for integrating or invoking the third party computing system functionality;
    determining, based on the tenant computing system control data, a common control set implemented by the plurality of tenant computing systems to mitigate the particular risks for integrating or invoking the third party computing system functionality;
    determining a mitigation weight of each control in the common control set based on the respective normalized risk score for each of the particular risks and the tenant computing system control data; and
    processing the common control set and the mitigation weight using at least one of a rules-based model or a machine-learning model to generate a control recommendation, the control recommendation comprising at least one control from the common control set; and
the first party computing system communicatively coupled to the server computing system, wherein the first party computing system is configured to facilitate implementation of the at least one control identified by the control recommendation related to integrating the third party computing system functionality into the first party computing system or invocation of the third party computing system functionality by the first party computing system.

2. The system of claim 1, wherein the operations further comprise modifying the tenant computing system control data to include new control data for the first party computing system, the new control data indicating the at least one control identified by the control recommendation as a control implemented by the first party computing system for at least one of the particular risks.

3. The system of claim 1, wherein:
the operations further comprise determining a residual risk rating for each of the particular risks based on the respective normalized risk score for each of the particular risks and the mitigation weight of each control in the common control set; and
generating the control recommendation further comprises processing the residual risk rating using at least one of the rules-based model or the machine-learning model to generate the control recommendation.

4. The system of claim 1, wherein:
the operations further comprise determining a control mitigation score for the third party computing system functionality based on a respective tenant control mitigation score for each tenant computing system of the plurality of tenant computing systems; and
generating the control recommendation further comprises processing the control mitigation score for the third party computing system functionality using at least one of the rules-based model or the machine-learning model to generate the control recommendation.

5. The system of claim 1, wherein:
the tenant computing system control data defines:
    for a first tenant computing system of the plurality of tenant computing systems:
    a first risk, a first risk score for the first risk, a first control for the first risk, and a first control score for the first control; and
    for a second tenant computing system of the plurality of tenant computing systems: a second risk, a second risk score for the second risk, a second control for the second risk, and a second control score for the second control;
determining the mitigation weight of each control in the common control set based on the respective normalized risk score for each of the particular risks and the tenant computing system control data comprises comparing the first risk score to the first control score and the second risk score to the second control score to determine a relative control mitigation score between the first control and the second control; and
processing the common control set and the mitigation weight using at least one of the rules-based model or the machine-learning model to generate the control recommendation comprises using the rules-based model to select the control recommendation from the first control or the second control based on the relative control mitigation score.

6. The system of claim 1, wherein:
processing the common control set and the mitigation weight comprises using the rules-based model to generate the control recommendation; and
the rules-based model comprises a set of rules that selects the control recommendation from the common control set based on at least one of a relative mitigation weight of each control in the common control set or a relative adoption rate of each control in the common control set.

7. The system of claim 1, wherein facilitating implementation of the at least one control identified by the control recommendation comprises at least one of facilitating modification of the third party computing system functionality or facilitating disabling of the third party computing system functionality.

8. A method comprising:

identifying, by computing hardware providing a multi-tenant environment, functionality provided by a third party computing system to be integrated into or invoked by a first party computing system authorized to access a tenant of the multi-tenant environment;

identifying, by the computing hardware, particular risks for integrating or invoking the functionality provided by the third party computing system;

accessing, by the computing hardware, tenant computing system control data for the particular risks identified for integrating or invoking the functionality provided by the third party computing system, the tenant computing system control data comprising indicating controls implemented by a plurality of additional computing systems that are authorized to access additional tenants of the multi -tenant environment and that have previously integrated the functionality provided by the third party computing system;

determining, by the computing hardware, a respective normalized risk score for each of the particular risks for each additional computing system of the plurality of additional computing systems;

determining, by the computing hardware based on the tenant computing system control data, a common control set implemented by the plurality of additional computing systems to mitigate risks for integrating or invoking the functionality provided by the third party computing system;

determining, by the computing hardware, a mitigation weight of each control in the common control set based on the respective normalized risk score for each of the particular risks and the tenant computing system control data; and causing, by the computing hardware, at least one of a rules-based model or a machine -learning model to process the common control set and the mitigation weight to generate a control recommendation, the control recommendation comprising at least one control from the common control set, wherein the at least one control identified by the control recommendation is implemented in relation to integrating the functionality provided by the third party computing system into the first party computing system or invoking the third party computing system functionality by the first party computing system.

9. The method of claim 8, wherein:

the method further comprises determining, by the computing hardware, a control mitigation score for the functionality provided by the third party computing system based on a respective tenant control mitigation score for each tenant computing system of the plurality of additional computing systems; and generating the control recommendation further comprises processing the control mitigation score for the functionality provided by the third party computing system using at least one of the rules-based model or the machine-learning model to generate the control recommendation.

10. The method of claim 8, further comprising modifying the tenant computing system control data to include new control data for the first party computing system, the new control data indicating the control recommendation as a control implemented by the first party computing system for at least one of the particular risks.

11. The method of claim 8, wherein:

the method further comprises determining, by the computing hardware, a residual risk rating for each of the particular risks based on the respective normalized risk score for each of the particular risks and mitigation weight of each control in the common control set; and generating the control recommendation further comprises processing the residual risk rating using at least one of the rules-based model or the machine-learning model to generate the control recommendation.

12. The method of claim 8, wherein the rules-based model comprises a set of rules that selects the control recommendation from the common control set based on a relative mitigation weight of each control in the common control set.

13. The method of claim 8, wherein implementation of the at least one control identified by the control recommendation comprises at least one of modification of the functionality provided by the third party computing system, disabling of the functionality provided by the third party computing system, or generating a user interface that includes the at least one control and providing the user interface for display on a user device.

14. The method of claim 8, further comprising modifying, by the computing hardware, the tenant computing system control data to include new control data, the new control data indicating the control recommendation as a control has been implemented by the first party computing system for at least one of the particular risks.

15. A system comprising:

a non-transitory computer-readable medium storing instructions; and processing hardware communicatively coupled to the non-transitory computer-readable medium;

wherein, the processing hardware is configured to execute the instructions and thereby perform operations comprising:

identifying functionality provided by a third party computing system that is to be integrated into or invoked by a first party computing system;

accessing tenant computing system risk data for the functionality provided by the third party computing system, the tenant computing system risk data comprising risk data indicating a first set of risks identified for a first tenant computing system and a second set of risks identified for a second tenant computing system that have previously integrated or invoked the functionality provided by the third party computing system;

accessing tenant computing system control data for the first set of risks and the second set of risks, the tenant computing system control data comprising a first set of controls for the first set of risks and a second set of controls for the second set of risks;

determining, based on the first set of risks and the second set of risks, a common control set implemented by the first tenant computing system and the second tenant computing system to mitigate the first set of risks and the second set of risks;

determining a mitigation weight of each control in the common control set based on a first risk score for the first set of risks, a second risk score for the second set of risks, and the tenant computing system control data;

processing the common control set and the mitigation weight of each control using a rules-based model to generate a control recommendation, the control recommendation comprising at least one control from the common control set; and facilitating implementation of at least one control identified by the control recommendation related to integrating or invoking the functionality provided by the third party computing system into the first party computing system.

16. The system of claim 15, wherein:

the first set of controls and the second set of controls comprise a first common control;

determining the mitigation weight of each control in the common control set comprises determining a first mitigation score for mitigation of the first set of risks by the first common control and a second mitigation score for mitigation of the second set of risks by the first common control; and processing the common control set and the mitigation weight of each control using the rules-based model to generate the control recommendation comprises applying a set of rules defining a rule to select the first common control as the control recommendation for the first set of risks or the second set of risks based on the first mitigation score and the second mitigation score.

17. The system of claim 15, wherein the rules-based model comprises a set of rules that selects the control recommendation from the common control set based on a relative mitigation weight of each control in the common control set.

18. The system of claim 15, wherein:

the operations further comprise generating a graphical user interface by configuring a display element for displaying the control recommendation and at least one of the first set of risks and the second set of risks; and facilitating implementation of the at least one control identified by the control recommendation related to integrating or invoking the functionality provided by the third party computing system into the first party computing system comprises providing the graphical user interface for display on a user device.

19. The system of claim 15, wherein the operations further comprise modifying the tenant computing system control data to include new control data for the first party computing system, the new control data indicating the control recommendation as a control implemented by the first party computing system for at least one of the first set of risks or the second set of risks.

20. The system of claim 15, wherein facilitating implementation of the at least one control identified by the control recommendation comprises at least one of facilitating modification of the functionality provided by the third party computing system or facilitating disabling of the functionality provided by the third party computing system.

* * * * *